US012355710B2

(12) United States Patent
Tao et al.

(10) Patent No.: US 12,355,710 B2
(45) Date of Patent: Jul. 8, 2025

(54) METHOD AND DEVICE OF SHARING CONTENT THROUGH INSTANT MESSAGING

(71) Applicant: HUAWEI TECHNOLOGIES CO., LTD., Shenzhen (CN)

(72) Inventors: Qiang Tao, Beijing (CN); Lei Wang, Nanjing (CN); Weiqing Fang, Munich (DE); Guangyuan Gao, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 72 days.

(21) Appl. No.: 17/927,643

(22) PCT Filed: May 25, 2021

(86) PCT No.: PCT/CN2021/095625
§ 371 (c)(1),
(2) Date: Jun. 20, 2023

(87) PCT Pub. No.: WO2021/238884
PCT Pub. Date: Dec. 2, 2021

(65) Prior Publication Data
US 2023/0308403 A1 Sep. 28, 2023

(30) Foreign Application Priority Data
May 26, 2020 (CN) .......................... 202010454939.0

(51) Int. Cl.
*G06F 15/16* (2006.01)
*G06Q 30/0601* (2023.01)
(Continued)

(52) U.S. Cl.
CPC ......... *H04L 51/04* (2013.01); *G06Q 30/0633* (2013.01); *H04L 51/10* (2013.01)

(58) Field of Classification Search
CPC ......... H04L 51/04; H04L 51/10; H04L 51/00; H04L 51/21; H04L 51/222; G06Q 30/0633; G06Q 30/0601
(Continued)

(56) References Cited

U.S. PATENT DOCUMENTS 7,099,921 B1 * 8/2006 Engstrom ............. H04W 12/08
709/206
9,805,207 B1 * 10/2017 Nijim ...................... G06F 21/62
(Continued)

FOREIGN PATENT DOCUMENTS

| CN | 105450648 A | 3/2016 |
| CN | 106028172 A | 10/2016 |

(Continued)

OTHER PUBLICATIONS

Share-A-Cart, Felix. "Share-A-Cart Introduction and Service Explainer." YouTube, YouTube, Mar. 13, 2020, www.youtube.com/watch?v=_m3XNOa3UAs. (Year: 2020).*

*Primary Examiner* — Kaylee J Huang
(74) *Attorney, Agent, or Firm* — Leydig, Voit & Mayer, Ltd.

(57) ABSTRACT

A first electronic device sends a link of first content to a second electronic device by using a second application, where the first content is content provided by a first application. The second electronic device displays a first dialog interface of a third application corresponding to the second application, where the first dialog interface includes an identity of a user operating the first electronic device and a second option associated with the link of the first content. The second electronic device displays a second interface of a fourth application corresponding to the first application in response to an operation on the second option, where the second interface includes the first content and a third option. In response to an operation on the third option, the second (Continued)

electronic device sends a first message to the first electronic device by using the third application.

10 Claims, 57 Drawing Sheets

(51) Int. Cl.
*H04L 51/04* (2022.01)
*H04L 51/10* (2022.01)

(58) Field of Classification Search
USPC .............................. 709/206, 203, 207, 223
See application file for complete search history.

(56) References Cited

U.S. PATENT DOCUMENTS

| | | | |
|---|---|---|---|
| 10,333,871 B1* | 6/2019 | Lewis | H04L 51/10 |
| 11,418,845 B2* | 8/2022 | Wong | H04L 67/131 |
| 2008/0034038 A1 | 2/2008 | Ciudad et al. | |
| 2008/0182598 A1* | 7/2008 | Bowman | G01C 21/26 |
| | | | 455/466 |
| 2012/0054656 A1* | 3/2012 | Nurmi | G06F 3/0485 |
| | | | 715/769 |
| 2012/0136934 A1* | 5/2012 | Patil | G06Q 10/10 |
| | | | 709/204 |
| 2014/0136621 A1* | 5/2014 | Korst | G06Q 50/01 |
| | | | 709/204 |
| 2014/0331289 A1* | 11/2014 | Li | H04L 63/08 |
| | | | 709/205 |
| 2014/0372540 A1* | 12/2014 | Libin | H04L 12/1822 |
| | | | 709/206 |
| 2017/0214963 A1* | 7/2017 | Di Franco | H04N 21/4227 |
| 2017/0359280 A1* | 12/2017 | Zhang | H04L 51/046 |
| 2019/0261039 A1* | 8/2019 | Woschank | H04N 21/437 |
| 2021/0067815 A1* | 3/2021 | Weegels | H04L 65/1059 |

FOREIGN PATENT DOCUMENTS

| | | |
|---|---|---|
| CN | 106303590 A | 1/2017 |
| CN | 106408384 A | 2/2017 |
| CN | 107544825 A | 1/2018 |
| CN | 108449610 A | 8/2018 |
| CN | 108449620 A | 8/2018 |
| CN | 108829528 A | 11/2018 |
| CN | 109660851 A | 4/2019 |
| CN | 110430474 A | 11/2019 |
| CN | 110889746 A | 3/2020 |
| CN | 112187619 A | 1/2021 |
| WO | 2009149466 A1 | 12/2009 |

\* cited by examiner

Device B

Mobile phone A

Mobile phone B

METHOD AND DEVICE OF SHARING CONTENT THROUGH INSTANT MESSAGING

CROSS-REFERENCE TO RELATED APPLICATIONS

This application is a National Stage of International Application No. PCT/CN2021/095625, filed on May 25, 2021, which claims priority to Chinese Patent Application No. 202010454939.0, filed on May 26, 2020. Both of the aforementioned applications are hereby incorporated by reference in their entireties.

TECHNICAL FIELD

This application relates to the field of communications technologies, and in particular, to an instant messaging method and a device.

BACKGROUND

Currently, an instant messaging application (application or app) such as WeChat may implement instant messaging and data sharing between different terminals by constructing an in-application contact list/address book. However, because in most applications other than the instant messaging application, no in-application contact list/address book is constructed, an instant message can be received and sent only by using the instant messaging application. For example, in scenarios such as sharing a web page of a browser application, sharing a commodity link of a shopping app, and sharing a video link of a video playing software, when a user and a sharing peer need to send messages to each other, the user and the sharing peer still need to switch between a plurality of applications.

Video sharing is used as an example. A first user starts a first application, for example, HUAWEI Video, on a device A, and shares content of the Xth episode of Metropolitan Men and Women that is being played with a second user by using a second application, for example, WeChat. As shown in FIG. 1A-1 and FIG. 1A-2, a device B of the second user receives a HUAWEI Video link from the device A by using WeChat, and the second user taps the video link to enter a HUAWEI Video applet or a HUAWEI Video app to watch a video. In this case, if the second user wants to send a message to the first user, the second user can only exit a video playing interface and return to a WeChat chat interface.

Shopping sharing is used as an example. A first user browses a commodity on Vmall, and shares a commodity in a shopping cart of the first user, for example, a Huawei Band 4 Pro, with a second user by using WeChat. Refer to FIG. 1B-1 and FIG. 1B-2. A device B of the second user receives a commodity link by using WeChat, and the second user taps the link to enter a shopping interface of a Vmall applet or a Vmall app. In this case, the second user and the first user cannot directly communicate with each other on the Vmall app, and certainly cannot share the shopping cart and implement collaborative shopping.

SUMMARY

Embodiments of the present disclosure provide an instant messaging method, a communications system, and an electronic device, content in a first application is shared by using a second application, so that a user can receive and send an instant message on an interface in the first application.

According to a first aspect, an embodiment of the present disclosure provides a communications system, including a first electronic device and a second electronic device, where the first electronic device displays a first interface of a first application, and the first interface includes a first option.

The first electronic device sends a link of first content to the second electronic device by using a second application in response to an operation on the first option, where the first content is content provided by the first application.

The second electronic device displays a first dialog interface of a third application, where the first dialog interface includes a first user identity and a second option, the second option is associated with the link of the first content, the first user identity is used to identify a user operating the first electronic device, and the third application corresponds to the second application.

The second electronic device displays a second interface of a fourth application in response to an operation on the second option, where the second interface includes the first content and a third option, and the fourth application corresponds to the first application.

The second electronic device sends a first message to the first electronic device by using the third application in response to an operation on the third option.

By using the technical solution, content in the first application is shared by using the second application, so that a user operating the second electronic device can send an instant message to the first electronic device on an interface in the first application.

In a possible implementation, the first electronic device displays a third interface of the first application, where the third interface includes prompt information, and the prompt information is used to prompt that a second user has entered.

By using the technical solution, the first user is prompted in time when the second user opens the first content, and a beneficial effect of notifying the user in real time is obtained.

In a possible implementation, the third interface further includes a second user identity and the first message, the second user identity is used to identify the second user, and the second user is a user operating the second electronic device.

By using the technical solution, the first user receives an instant message sent by the second user in the first application in real time. In this way, the first user can perform instant communication with the second user without leaving the first application.

In a possible implementation, the first message is a text message, a voice message, a voice call request, or a video call request.

By using the technical solution, the first user and the second user can receive and send instant messages and perform a voice chat or a video chat in the first application. In this way, when sharing the first content, the first user and the second user can further perform real-time communication, thereby improving user experience of using the devices.

In a possible implementation, that the second option is associated with a link of first content includes: The second option is a card or a control including the link of the first content.

By using the technical solution, the link of the first content is provided for the user in a concise card or control manner.

In a possible implementation, the first application is a video application or an audio application, and the first content is a video or audio.

When the first electronic device sends the link of the first content to the second electronic device by using the second application in response to the operation on the first option, a playing time point of the video or audio is a first time point.

When the second electronic device displays the second interface of the fourth application in response to the operation on the second option, a playing time point of the video or audio is a second time point.

The first time point is the same as the second time point.

By using the technical solution, for video or audio content, the first user controls the playing time point of the video or audio, so that the first user and the second user watch the video or listen to the audio synchronously.

In a possible implementation, the first electronic device displays a fifth interface of the first application, the fifth interface includes the first content, a playing time point of the first content is a third time point, and the third time point is different from the first time point.

The second electronic device displays a sixth interface of the fourth application, the sixth interface includes the first content, a playing time point of the first content is a fourth time point, and the fourth time point is the same as the third time point.

By using the technical solution, for video or audio content, the first user controls fast forwarding or fast rewinding of the video or audio, so that the first user and the second user watch the video or listen to the audio synchronously.

In a possible implementation, the first application is a shopping application, the first content is a commodity, and the second interface further includes a fourth option.

The second electronic device displays a first shopping cart and a second shopping cart in the fourth application in response to an operation on the fourth option. The first shopping cart corresponds to a first user, the second shopping cart corresponds to a second user, and the first user is different from the second user.

By using the technical solution, shopping cart commodities of the first user and the second user are synchronously displayed in the shopping application, so that the first user can view the shopping cart commodities of the second user, and the second user can view the shopping cart commodities of the first user.

In a possible implementation, that the second electronic device displays a first shopping cart and a second shopping cart in the fourth application in response to an operation on the fourth option includes:

The second electronic device further displays a third shopping cart in the fourth application, where commodities in the third shopping cart are a sum of commodities in the first shopping cart and commodities in the second shopping cart.

By using the technical solution, all commodities in the shopping carts of the first user and the second user are displayed in the shopping application, so that the first user and the second user shop together.

In a possible implementation, the first application is a map application, and the first content is navigation information. The second interface of the fourth application further includes the first user identity and a second user identity, the second user identity is used to identify a user operating the second electronic device, the first user identity is further used to indicate a geographical location of the first electronic device, and the second user identity is further used to indicate a geographical location of the second electronic device.

By using the technical solution, navigation information, and geographical location information of the first user and the second user are displayed in the map application in real time. In this way, the first user and the second user can view a location of each other in a process of driving together, and receive and send messages in real time by using the second application. In addition, the users can communicate in real time by using only a conventional mobile phone without using another communications device. This provides the users with good experience of driving in a team.

According to a second aspect, an embodiment of the present disclosure provides an instant messaging method, applied to a second electronic device having a display, where the method includes:

The second electronic device displays a first dialog interface of a third application, where the first dialog interface includes a first user identity and a second option, the second option is associated with a link of first content, the first user identity is used to identify a user operating a first electronic device.

The first content is content provided by a first application for the first electronic device, the link of the first content is sent by the first electronic device to the second electronic device by using a second application, and the third application corresponds to the second application.

The second electronic device displays a second interface of a fourth application in response to an operation on the second option, where the second interface includes the first content and a third option, and the fourth application corresponds to the first application.

The second electronic device sends a first message to the first electronic device by using the third application in response to an operation on the third option.

By using the technical solution, content in the first application is shared by using the second application, so that a user operating the second electronic device can send an instant message to the first electronic device on an interface in the first application.

In a possible implementation, the first message is a text message, a voice message, a voice call request, or a video call request.

By using the technical solution, the first user and the second user can receive and send an instant message and perform a voice chat or a video chat in the first application. In this way, when opening the first content, the second user can further communicate with the first user in real time, thereby improving user experience of using the device.

In a possible implementation, that the second option is associated with the link of the first content includes: The second option is a card or a control including the link of the first content.

By using the technical solution, the link of the first content is provided for the second user in a concise card or control manner.

In a possible implementation, the first application is a video application or an audio application, and the first content is a video or audio.

When the first electronic device sends the link of the first content to the second electronic device by using the second application in response to the operation on the first option, a playing time point of the video or audio is a first time point.

When the second electronic device displays the second interface of the fourth application in response to the operation on the second option, a playing time point of the video or audio is a second time point.

The first time point is the same as the second time point.

By using the technical solution, for video or audio content, the first user controls the playing time of the video or audio, so that the first user and the second user watch the video or listen to the audio synchronously.

In a possible implementation, the second electronic device displays a sixth interface of the fourth application, the sixth interface includes the first content, a playing time point of the first content is a fourth time point, and the fourth time point is the same as a third time point.

The third time point is a playing time point of the first content when the first electronic device displays a fifth interface of the first application, and the third time point is different from the first time point.

By using the technical solution, for video or audio content, the first user controls fast forwarding or fast rewinding of the video or audio, so that the first user and the second user watch the video or listen to the audio synchronously.

In a possible implementation, the first application is a shopping application, the first content is a commodity, and the second interface further includes a fourth option.

The second electronic device displays a first shopping cart and a second shopping cart in the fourth application in response to an operation on the fourth option, where the first shopping cart corresponds to a first user, the second shopping cart corresponds to a second user, and the first user is different from the second user.

By using the technical solution, shopping cart commodities of the first user and the second user are synchronously displayed in the shopping application, so that the second user can view both the shopping cart commodities of the second user and the shopping cart commodities of the first user.

In a possible implementation, that the second electronic device displays a first shopping cart and a second shopping cart in the fourth application in response to an operation on the fourth option includes:

The second electronic device further displays a third shopping cart in the fourth application, where commodities in the third shopping cart are a sum of commodities in the first shopping cart and commodities in the second shopping cart.

By using the technical solution, all commodities in shopping carts of the first user and the second user are displayed in the shopping application, so that the second user and the first user shop together.

In a possible implementation, the first application is a map application, and the first content is navigation information; and the second interface of the fourth application further includes the first user identity and a second user identity, the second user identity is used to identify a user operating the second electronic device, the first user identity is further used to indicate a geographical location of the first electronic device, and the second user identity is further used to indicate a geographical location of the second electronic device.

By using the technical solution, the navigation information, and the geographical location information of the first user and the second user are displayed in the map application in real time. In this way, the second user can view a location of the first user in time in a process of driving with the first user, and receive and send messages in real time by using the second application. In addition, the users can communicate in real time by using only a conventional mobile phone without using another communications device. This provides the users with good experience of driving in a team.

According to another aspect, embodiments of this application provide an electronic device, including one or more processors and a memory. The memory stores code. When the code is executed by the electronic device, the electronic device performs the instant messaging method performed by the electronic device in any possible implementation of the second aspect.

According to another aspect, an embodiment of the present disclosure provides a computer storage medium, including computer instructions. When the computer instructions are run on an electronic device, the electronic device performs the instant messaging method in any possible implementation of the second aspect.

According to another aspect, an embodiment of the present disclosure provides a computer program product. When the computer program product is run on a computer, the computer performs the instant messaging method in any possible implementation of the second aspect.

BRIEF DESCRIPTION OF DRAWINGS

FIG. 3A to FIG. 3M are schematic diagrams of a group of interfaces according to an embodiment of the present disclosure;

DESCRIPTION OF EMBODIMENTS

The following describes technical solutions in embodiments of the present disclosure with reference to accompanying drawings in embodiments of the present disclosure. In description in embodiments of the present disclosure, "I" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in descriptions in embodiments of the present disclosure, "a plurality of" means two or more.

The following terms "first" and "second" are merely intended for a purpose of description, and shall not be understood as implying or implying relative importance or implicitly indicating a quantity of indicated technical features. Therefore, a feature limited by "first" or "second" may explicitly or implicitly include one or more of the features. In the descriptions of embodiments of this application, unless otherwise specified, "a plurality of" means two or more.

Figure 2A:
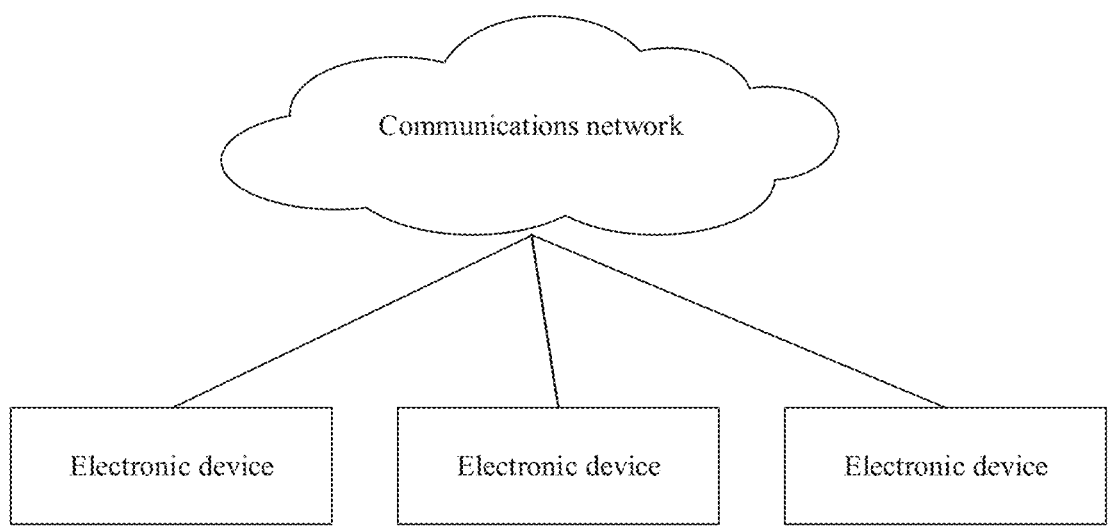
FIG. 2A is a schematic diagram of an architecture of a communications system according to an embodiment of the present disclosure.

An embodiment of the present disclosure provides an instant messaging method, which may be applied to a communications system (which may also be referred to as a content sharing system) 100 shown in FIG. 2A. As shown in FIG. 2A, the communications system 200 may include N (N is an integer greater than 1) electronic devices. The N electronic devices may be interconnected through a communications network.

For example, the communications network may be a wired network, or may be a wireless network. For example, the communications network may be a local area network (LAN), or may be a wide area network (WAN), for example, the Internet. The communications network may be implemented by using any known network communications protocol. The network communications protocol may be various wired or wireless communications protocols, such as Ethernet, a universal serial bus (USB), a (FIREWIRE), a global system for mobile communications (GSM), a general packet radio service (GPRS), code division multiple access (CDMA), wideband code division multiple access (WCDMA), time-division code division multiple access (TD-SCDMA), long term evolution (LTE), Bluetooth, wireless fidelity (Wi-Fi), NFC, a voice over Internet protocol (VoIP), a communications protocol that supports a network slicing architecture, or any other suitable communications protocol.

For example, in some embodiments, after logging in to an account (for example, a Huawei account) of each electronic device in the communications system 200, the electronic devices may be interconnected by using one or more servers, and the foregoing servers may alternatively be implemented by using a cloud. In some other embodiments, a Wi-Fi connection may be established between the electronic devices in the communications system 200 by using a Wi-Fi protocol.

This embodiment of the present disclosure is applicable to sharing, by a first electronic device, content in a first application with a second electronic device, for example, sharing scenarios shown in FIG. 1A-1 to FIG. 1B-2. Content sharing is completed by using a second application installed on the first electronic device and the second electronic device each, where the second application is an instant messaging application. The second application may be an application pre-installed before a device is delivered from a factory, for example, a Meetime application of Huawei, or may be a third-party application downloaded or installed by a user after the user purchases the device, for example, WeChat. The second application may create a background message channel for each sharing, and the first application may use the channel to send and receive a message, and perform a voice call or a video call between the first electronic device and the second electronic device. Based on original content sharing, the second application establishes a communication connection for both sharing parties, and the user can perform communication based on the communication connection without leaving the first application.

The instant messaging method provided in embodiments of the present disclosure may be applied to electronic devices such as a mobile phone, a tablet computer, a wearable device, a vehicle-mounted device, an augmented reality (AR)/virtual reality (VR) device, a notebook computer, an ultra-mobile personal computer (UMPC), a netbook, and a personal digital assistant (PDA). This is not limited in embodiments of the present disclosure.

Figure 2B:
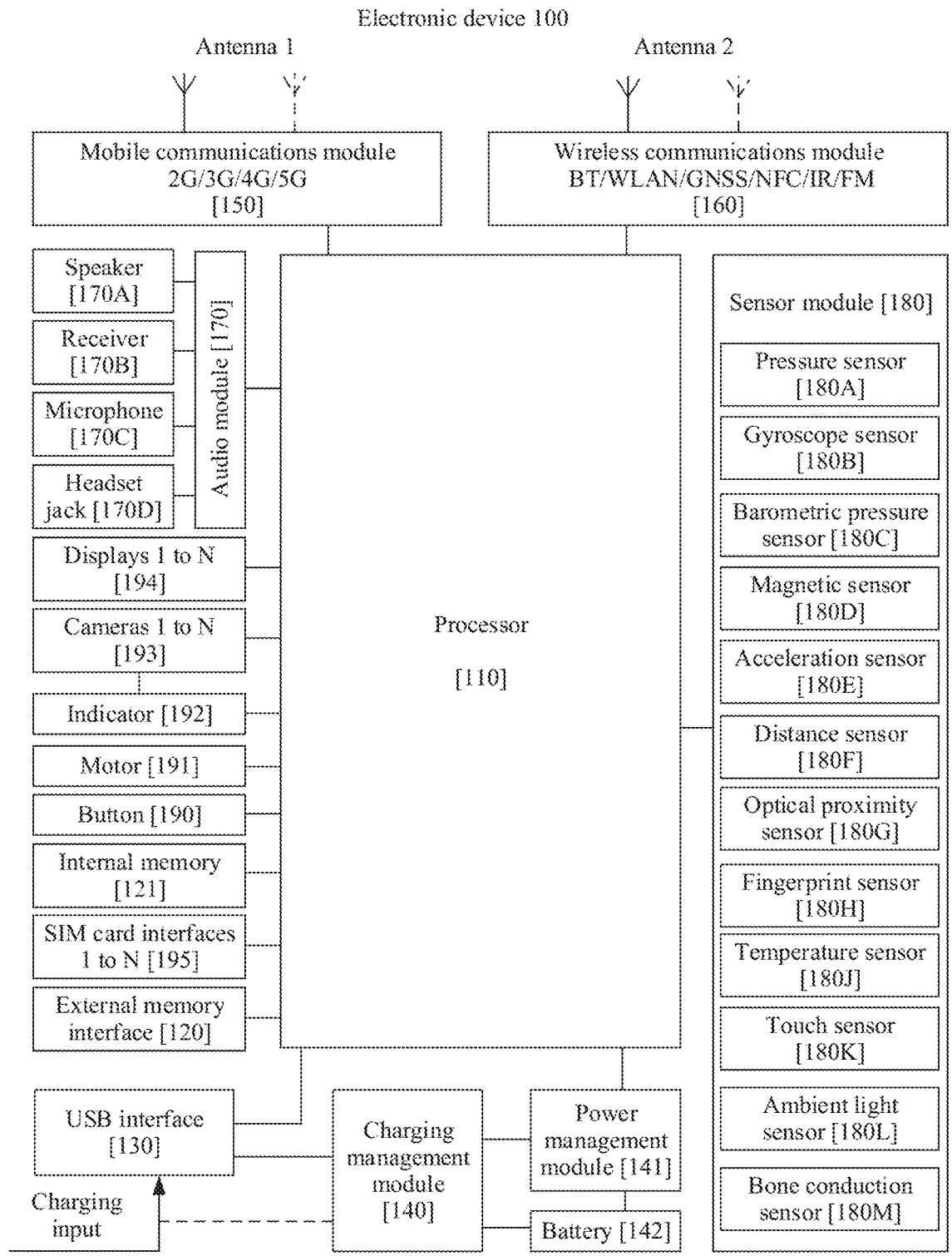
FIG. 2B is a schematic diagram of a hardware structure of an electronic device according to an embodiment of the present disclosure.

For example, FIG. 2B is a schematic diagram of a structure of an electronic device 100.

The electronic device 100 may include a processor 110, an external memory interface 120, an internal memory 121, a universal serial bus (USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this application does not constitute a specific limitation on the electronic device 100. In some other embodiments of this application, the electronic device 100 may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, and/or a neural-network processing unit (NPU). Different processing units may be independent components, or may be integrated into one or more processors.

The controller may generate an operation control signal based on instruction operation code and a time sequence signal, to complete control of instruction reading and instruction execution.

A memory may be further disposed in the processor 110, and is configured to store instructions and data. In some embodiments, the memory in the processor 110 is a cache memory. The memory may store instructions or data that has been used or cyclically used by the processor 110. If the processor 110 needs to use the instructions or the data again, the processor may directly invoke the instructions or the data from the memory. This avoids repeated access, shortens a waiting time of the processor 110, and improves system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The charging management module 140 is configured to receive a charging input from the charger. The charger may be a wireless charger or a wired charger. In some embodiments of wired charging, the charging management module 140 may receive a charging input of a wired charger through the USB interface 130. In some embodiments of wireless charging, the charging management module 140 may receive a wireless charging input through a wireless charging coil of the electronic device 100. The charging management module 140 can supply power to the electronic device by using the power management module 141 while charging the battery 142.

The power management module 141 is configured to connect the battery 142 and the charging management module 140 to the processor 110. The power management module 141 receives an input from the battery 142 and/or the charging management module 140, and supplies power to the processor 110, the internal memory 121, the display 194, the camera 193, the wireless communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same component.

A wireless communications function of the electronic device 100 may be implemented by using the antenna 1, the antenna 2, the mobile communications module 150, the wireless communications module 160, the modem processor, the baseband processor, and the like.

The antenna 1 and the antenna 2 are configured to: transmit and receive electromagnetic wave signals. Each antenna in the electronic device 100 may be configured to cover one or more communications frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communications module 150 may provide a wireless communication solution that includes 2G/3G/4G/5G or the like and that is applied to the electronic device 100. The mobile communications module 150 may include at least one filter, a switch, a power amplifier, a low noise amplifier (LNA), and the like. The mobile communications module 150 may receive an electromagnetic wave through the antenna 1, perform processing such as filtering or amplification on the received electromagnetic wave, and transmit the electromagnetic wave to the modem processor for demodulation. The mobile communications module 150 may further amplify a signal modulated by the modem processor, and convert the signal into an electromagnetic wave for radiation through the antenna 1. In some embodiments, at least some function modules in the mobile communications module 150 may be disposed in the processor 110. In some embodiments, at least some function modules in the mobile communications module 150 may be disposed in a same component as at least some modules in the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by an audio device (which is not limited to the speaker 170A, the receiver 170B, or the like), or displays an image or a video by the display 194. In some embodiments, the modem processor may be an independent component. In some other embodiments, the modem processor may be independent of the processor 110, and is disposed in a same device as the mobile communications module 150 or another function module.

The wireless communications module 160 may provide a wireless communication solution that is applied to the electronic device 100, and that includes a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, or the like. The wireless communications module 160 may be one or more components integrating at least one communications processor module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave for radiation through the antenna 2.

In some embodiments, the antenna 1 and the mobile communications module 150 in the electronic device 100 are coupled, and the antenna 2 and the wireless communications module 160 in the electronic device 100 are coupled, so that the electronic device 100 can communicate with a network and another device by using a wireless communications technology. The wireless communications technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a beidou navigation satellite system (BDS), a quasi-zenith satellite system (QZSS), and/or a satellite based augmentation system (SBAS).

Figures 1, 1A:
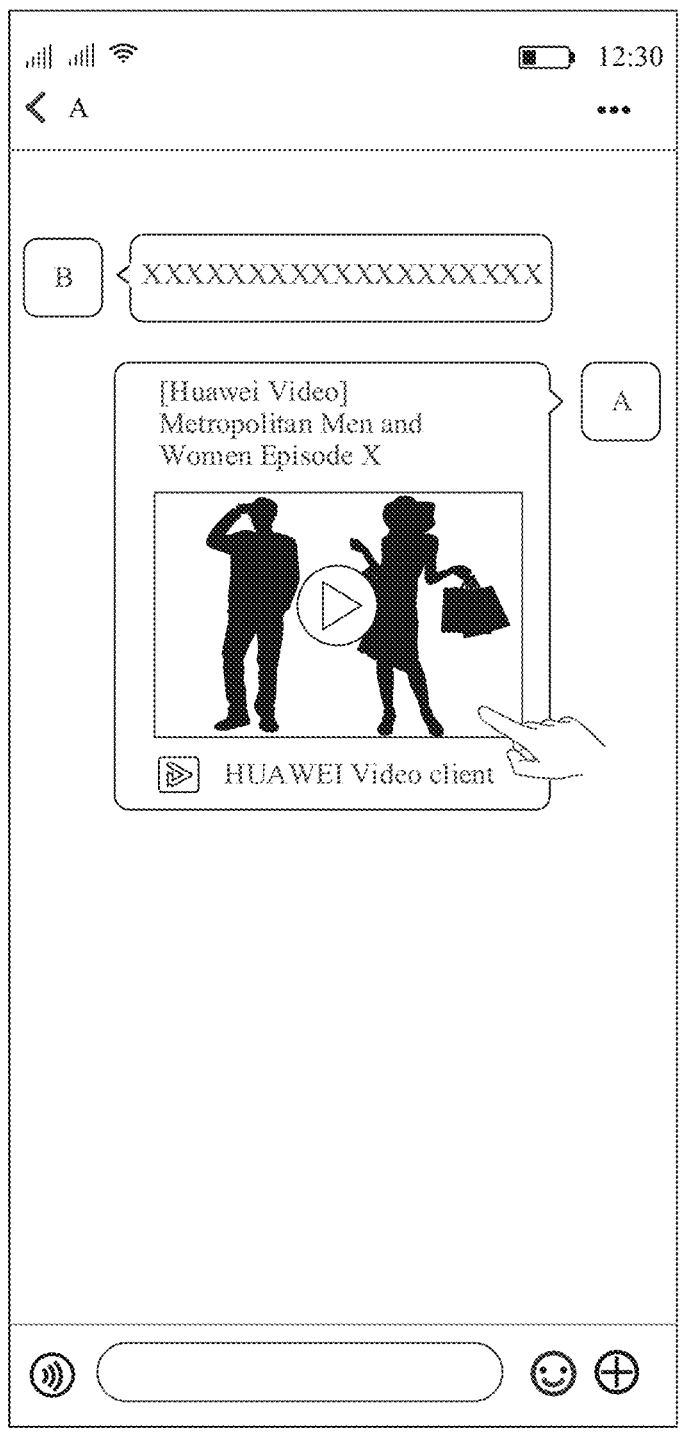
FIG. 1A-1 to FIG. 1B-2 show sharing scenarios in the conventional technology.
Figures 1, 1A, 2:
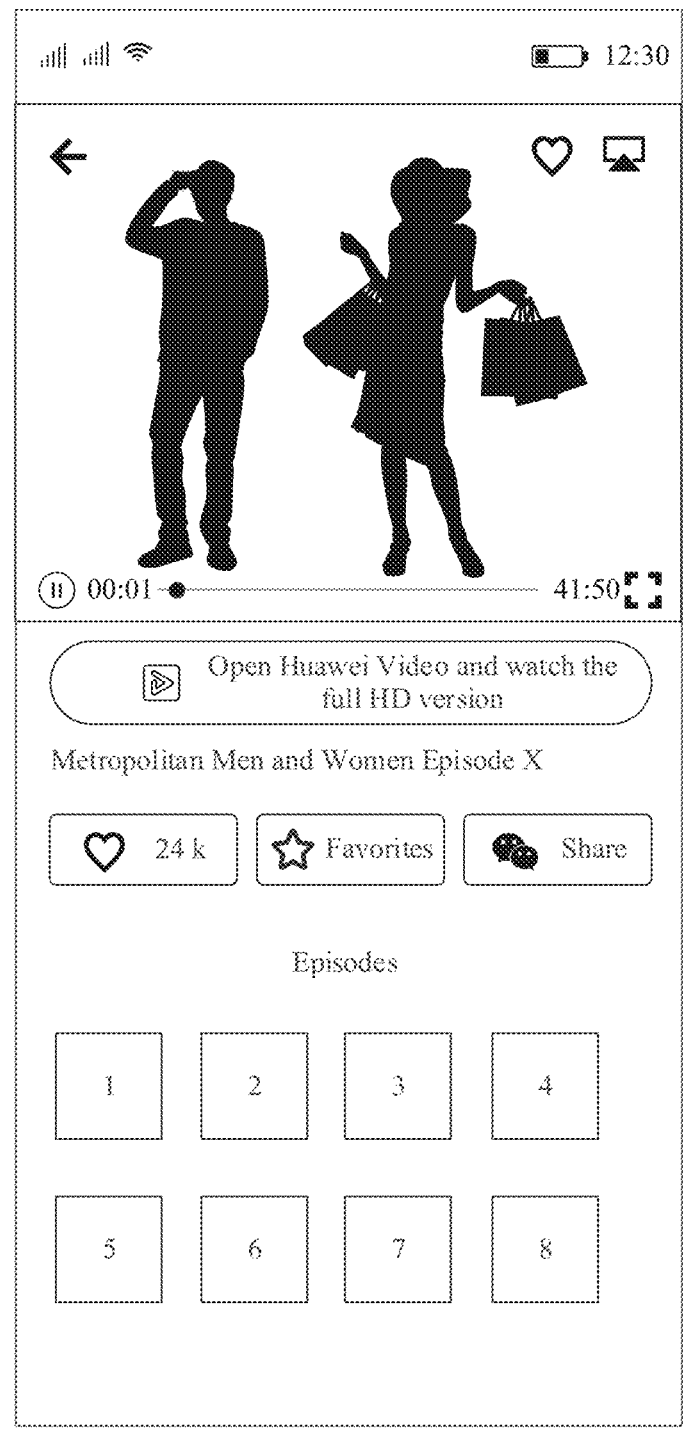
Figures 1, 1B:
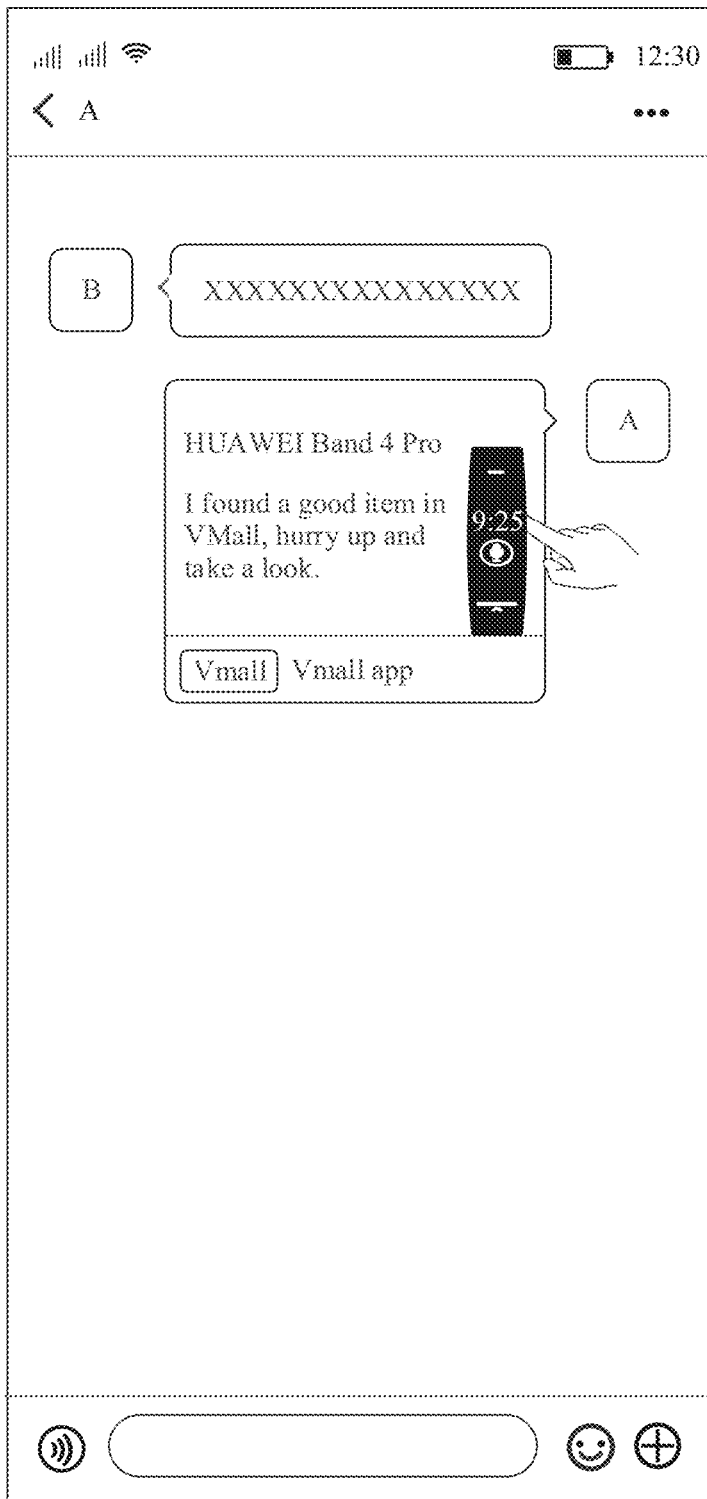
Figures 1, 1B, 2:

The electronic device in this embodiment of the present disclosure may send, by using the mobile communications module 150 and through the antenna 1, various messages and voice signals to another electronic device in the communications system 200 shown in FIG. 2, or receive various messages and voice signals sent in the communications system 200. The electronic device in this embodiment of the present disclosure may also receive and send, by using the wireless communications module 160 and through the antenna 2, various messages and voice signals from another electronic device in the communications system 200.

The electronic device 100 may implement a display function by using the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs, which execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, a quantum dot light emitting diode (QLED), or the like. In some embodiments, the electronic device 100 may include one or N displays 194, where N is a positive integer greater than 1.

The electronic device 100 may implement a photographing function by using the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (CCD) or a complementary metal-oxide-semiconductor (CMOS) phototransistor. The light-sensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transformation on frequency energy.

The video codec is configured to compress or decompress a digital video. The electronic device 100 may support one or more video codecs. In this way, the electronic device 100 may play back or record videos in a plurality of coding formats, for example, moving picture experts group (MPEG)-1, MPEG-2, MPEG-3, and MPEG-4.

The NPU is a neural-network (NN) computing processor. The NPU quickly processes input information by referring to a structure of a biological neural network, for example, a transfer mode between human brain neurons, and may further continuously perform self-learning. Applications such as intelligent cognition of the electronic device 100 may be implemented through the NPU, for example, image recognition, facial recognition, speech recognition, and text understanding.

The external memory interface 120 may be used to connect to an external storage card, for example, a micro SD card, to extend a storage capability of the electronic device 100. The external memory card communicates with the processor 110 through the external memory interface 120, to implement a data storage function. For example, files such as music and videos are stored in the external storage card.

The internal memory 121 may be configured to store computer-executable program code. The executable program code includes instructions. The internal memory 121 may include a program storage area and a data storage area. The program storage area may store an operating system, an application required by at least one function (for example, a voice playing function or an image playing function), and the like. The data storage area may store data (such as audio data and an address book) created during use of the electronic device 100, and the like. In addition, the internal memory 121 may include a high-speed random access memory, or may include a nonvolatile memory, for example, at least one magnetic disk storage device, a flash memory, or a universal flash storage (UFS). The processor 110 runs instructions stored in the internal memory 121 and/or instructions stored in the memory disposed in the processor, to perform various function applications and data processing of the electronic device 100.

The electronic device 100 may implement an audio function such as music playing and recording by using the audio module 170, the speaker 170A, the receiver 170B, the microphone 170C, the headset jack 170D, the application processor, and the like.

The audio module 170 is configured to convert digital audio information into an analog audio signal for output, and is also configured to convert analog audio input into a digital audio signal. The audio module 170 may be further configured to code and decode an audio signal. In some embodiments, the audio module 170 may be disposed in the processor 110, or some functional modules in the audio module 170 are disposed in the processor 110.

The speaker 170A, also referred to as a "loudspeaker", is configured to convert an audio electrical signal into a sound signal. The electronic device 100 may be used to listen to music or answer a call in a hands-free mode over the speaker 170A.

The receiver 170B, also referred to as an "earpiece", is configured to convert an electrical audio signal into a sound signal. When a call is answered or speech information is received through the electronic device 100, the receiver 170B may be put close to a human ear to listen to a voice.

The microphone 170C, also referred to as a "mike" or a "microphone", is configured to convert a sound signal into an electrical signal. When making a call or sending a voice message, a user may make a sound near the microphone 170C through the mouth of the user, to input a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, implement noise reduction, and identify a sound source, to implement a directional recording function and the like.

The headset jack 170D is configured to connect to a wired headset. The headset jack 170D may be a USB interface 130, or may be a 3.5 mm open mobile terminal platform (OMTP) standard interface or cellular telecommunications industry association of the USA (CTIA) standard interface.

The button 190 includes a power button, a volume button, and the like. The button 190 may be a mechanical button, or may be a touch button. The electronic device 100 may receive a button input, and generate a button signal input related to a user setting and function control of the electronic device 100.

The motor 191 may generate a vibration prompt. The motor 191 may be configured to provide an incoming call vibration prompt and a touch vibration feedback. For example, touch operations performed on different applications (for example, photographing and audio playing) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to come into contact with or be separated from the electronic device 100. The electronic device 100 interacts with a network through the SIM card, to implement functions such as conversation and data communication. In some embodiments, the electronic device 100 uses an eSIM, that is, an embedded SIM card. The eSIM card may be embedded into the electronic device 100, and cannot be separated from the electronic device 100.

The following describes a software system architecture provided in an embodiment of this application.

Figure 2C:
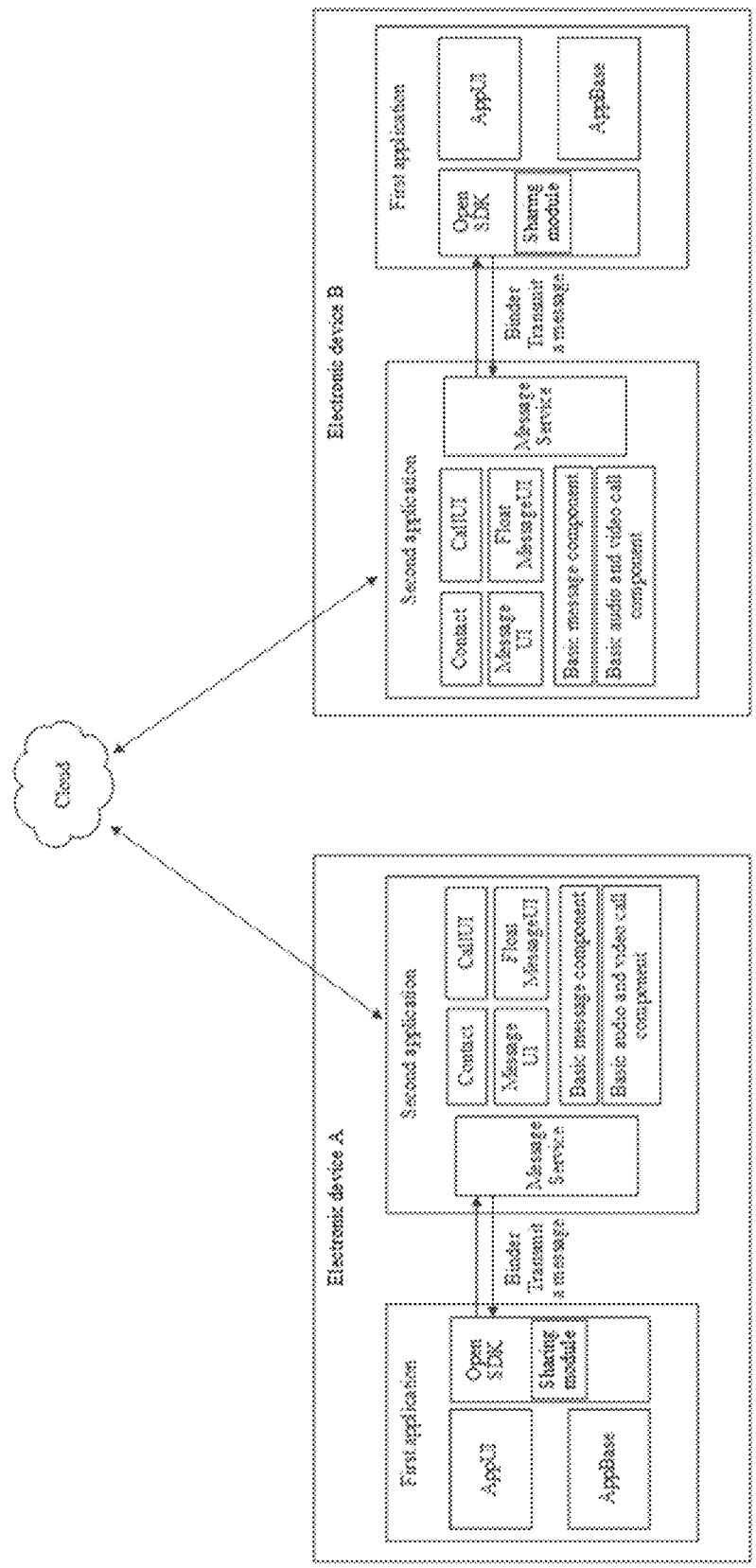
FIG. 2C is a diagram of a software system architecture according to an embodiment of the present disclosure.

Refer to FIG. 2C, FIG. 2C is a diagram of a software architecture of a communications system according to an embodiment of this application. The communications system may include two or more electronic devices. FIG. 2C shows an example of an electronic device A (referred to as a device A for short below) and an electronic device B (referred to as a device B for short below).

As shown in FIG. 2C, the device A and the device B each may include a first application and a second application.

The first application may be an application pre-installed before the device is delivered from a factory, for example, a video application of Huawei, or may be a third-party application downloaded on the device. The first application includes an open software development kit (SDK), a root directory of the application (AppBase), and an application interface (AppUi). The open SDK includes a sharing module, and the sharing module provides two sharing modes: a common sharing mode and a parallel sharing mode, which respectively correspond to two application programming interfaces (API). The first application invokes the common sharing mode API, and only common sharing can be implemented. After the parallel sharing mode API is invoked and content is shared, the second application establishes a background message channel for the first applications on the two devices to perform instant communication.

The second application is an instant messaging application. Similarly, the second application may be an application pre-installed before the device is delivered from a factory, for example, MeeTime of Huawei, or may be a third-party application downloaded on the device, for example, WeChat. MeeTime is a social networking application that supports mobile operating systems on mobile devices such as a smartphone and a tablet computer, and is an instant messaging application delivered with a Huawei device. The second application may include a message service (Message Service) component, a contact (Contact) module, a call interface (CallUI) module, a message interface (MessageUI) module, a float message interface (Float MessageUI) module, a basic message component, and a basic audio and video call component. The second application may further include an activity (activity) module, a multimedia effect (mediaeffect) module, and the like. The module or the component in the second application is not limited in this embodiment of this application. The second application of the device A communicates with the second application of the device B through a cloud.

A message is transmitted between the open SDK of the first application and the Message Service component of the second application through Binder. For example, the first application may share content with the Message Service component of the second application by using a sharing API. A message transmission manner is not limited to a Binder mechanism. A message between the first application and the second application can be transmitted in any inter-process communication manner, for example, a pipe, a signal and a trace, a socket, a packet queue (Message), a shared memory, and a semaphore. A message transmission manner of cross-process communication is not limited in this embodiment of this application.

The following describes a working process of the software system with reference to an example of a content sharing scenario.

When the first application of the device A receives an operation of sharing content by the user by using the second application, the first application invokes the parallel sharing mode API by using the open SDK, and sends the content to the second application. The Message Service component of the second application parses received message content, and determines, by using a subsequent mParallelShare field, that the parallel sharing mode is used. The second application creates a cross-process message channel between the second application and the first application based on the parallel sharing mode. For example, the Binder mechanism may be used for message transmission. In addition, the Message Service component further encapsulates message content other than the mParallelShare field into a card, displays the card in a chat window of the MessageUI module, and sends the message by using the basic message component.

Figure 3A:
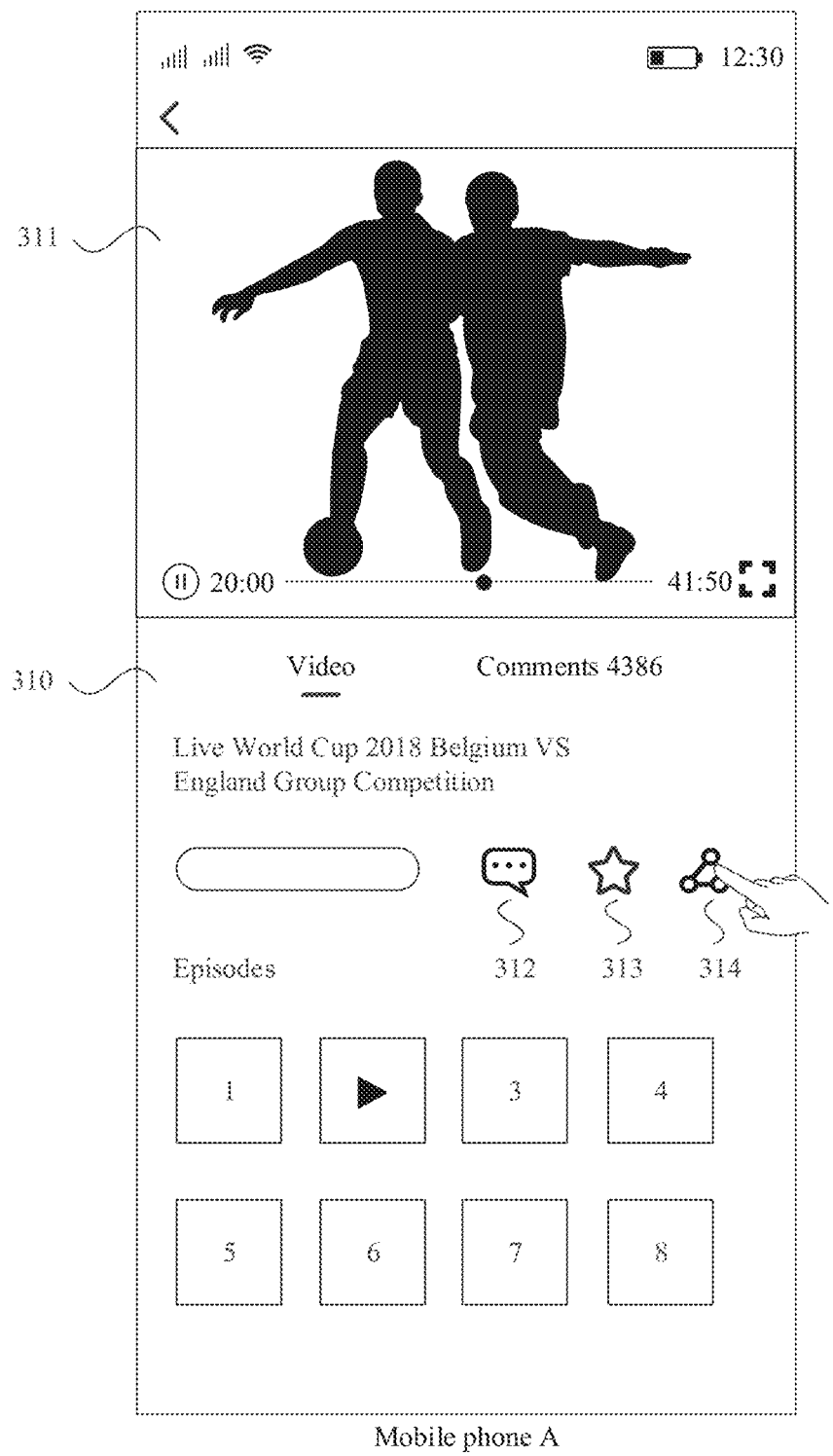
Figure 3B:
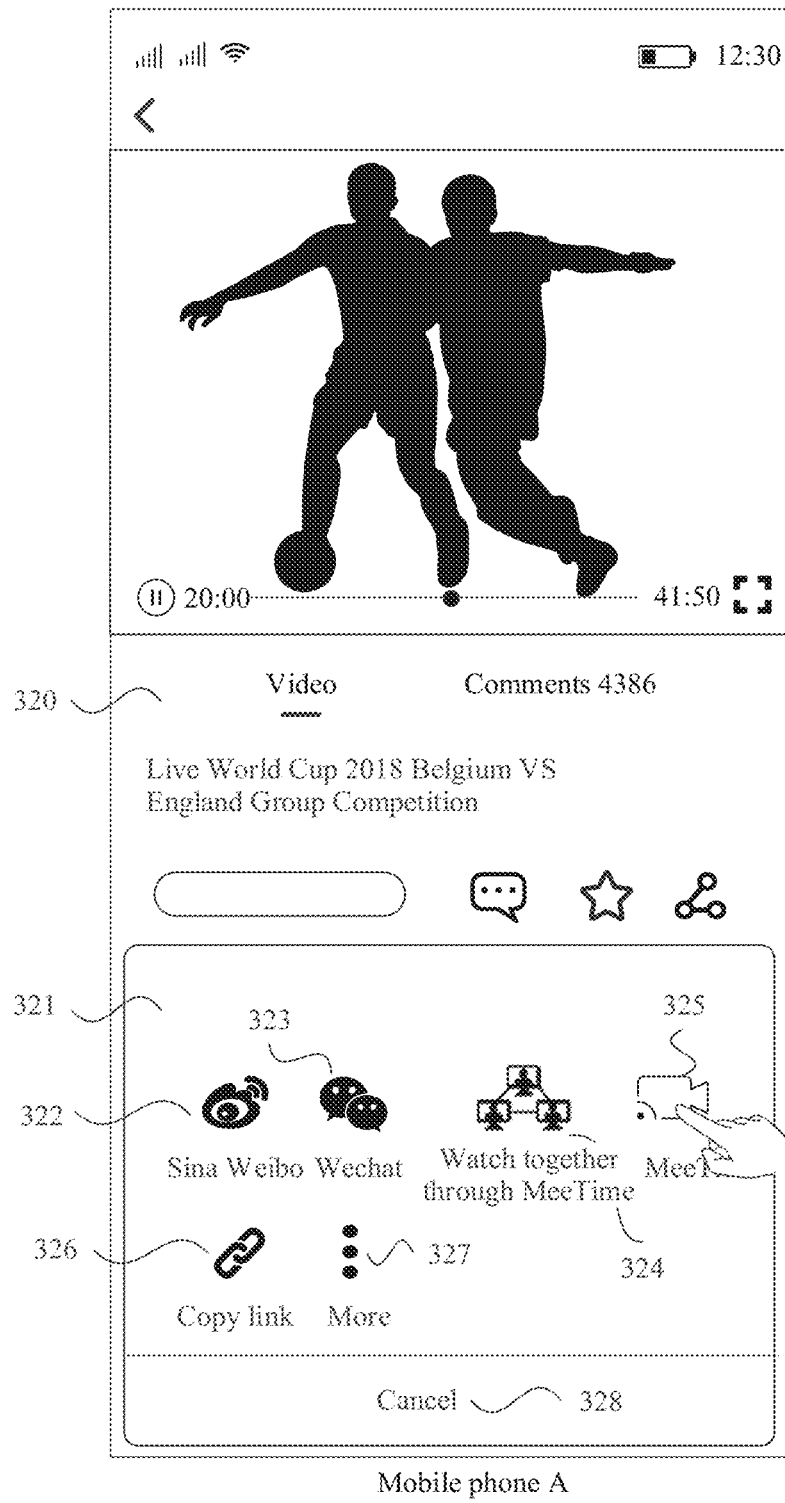
Figure 3C:
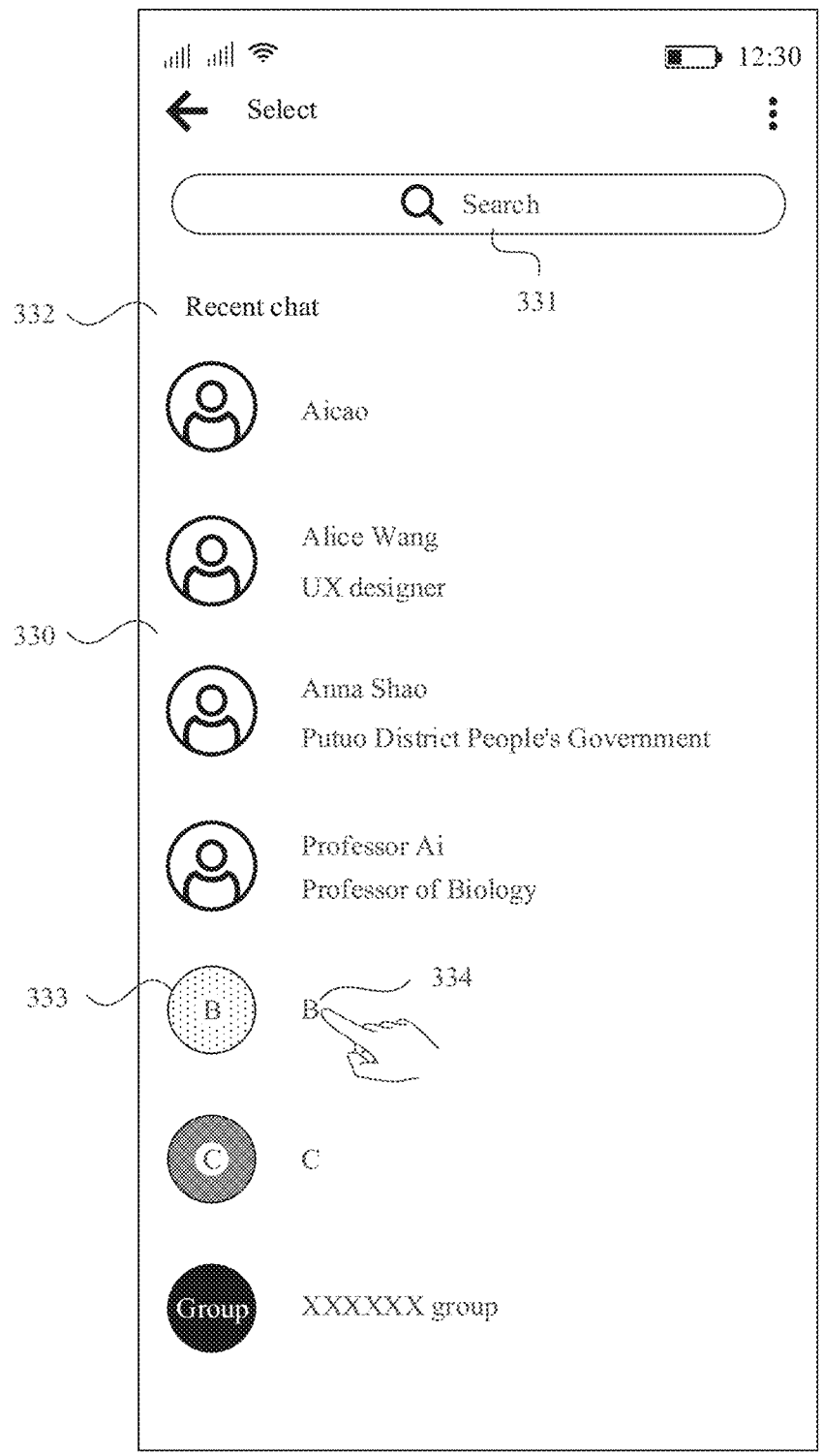
Figure 3D:
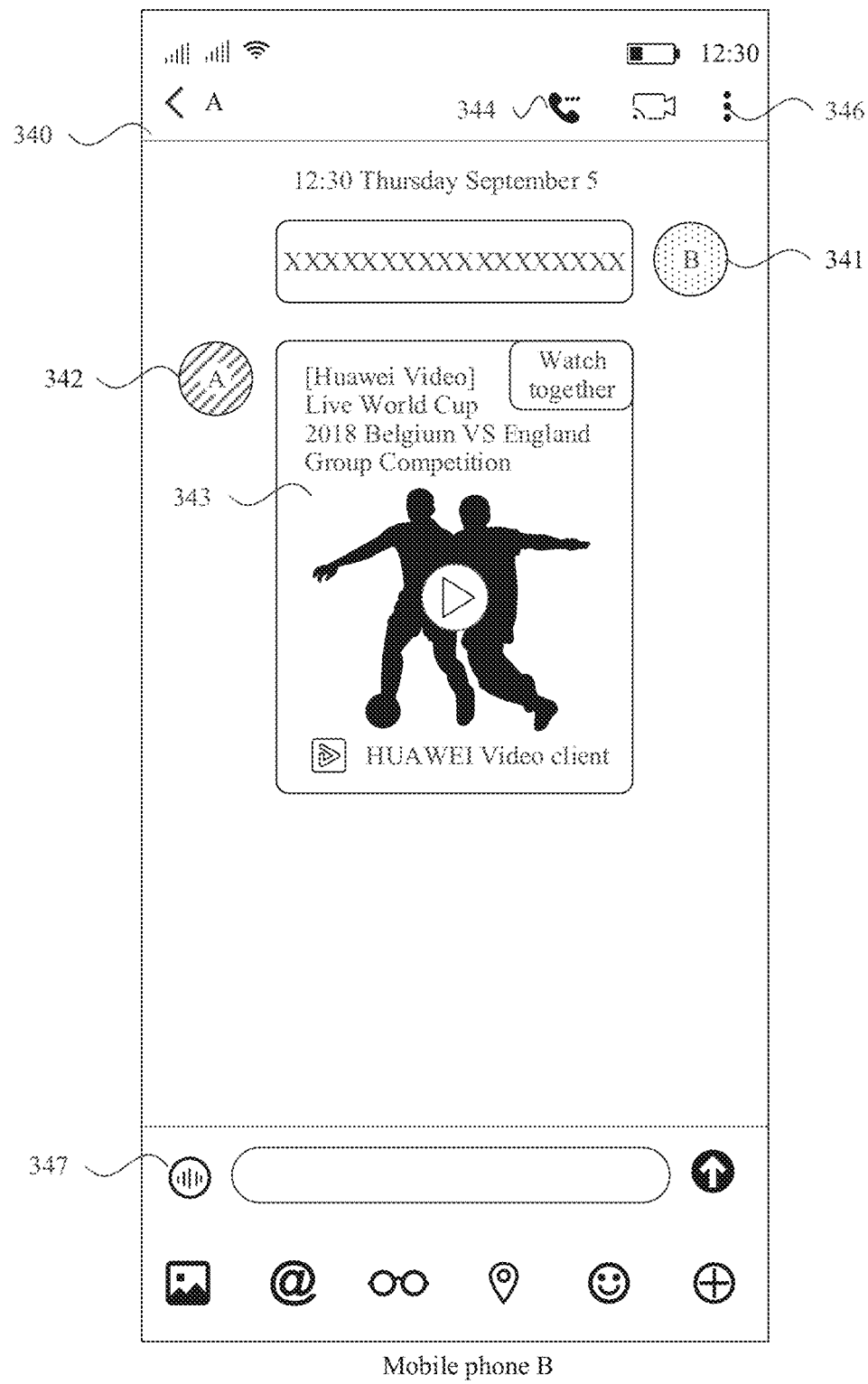

After receiving the message, the second application of the device B displays a card in a chat window of the MessageUI module, for example, a video link card 343 in FIG. 3D, that is, the content of the device A is shared to the device B. The second application of the device A sends a channel establishment message to the second application of the device B by using the basic message component. The second application of the device B receives the channel establishment message, and the MessageUI module refreshes the message card to display a parallel sharing entry, for example, a control 351 in FIG. 3E. The user taps the parallel sharing entry displayed by the device B, and the second application of the device B starts the corresponding first application on the device B. The first application of the device B further determines that the parallel sharing mode is used, and invokes the parallel sharing mode API by using the open SDK to set a HwParallelShareChannel object. The second application creates a cross-process message channel between the second application and the first application of the device B based on the object.

The device A internally establishes a cross-process message channel between the second application and the first application. This indicates that the second application allocates a background message channel to the first application, and a background message of the second application may be received and sent through a message API (not shown in the figure) of the open SDK. The also applies to the device B. Through a cross-process message channel between the second application and the first application of the device B, a message in the second application of the device B may be transmitted to the first application.

The second application of the device A and the second application of the device B forward messages including shared content and a background message through the cloud. After the device A and the device B each establish the background message channel, the second application provides Float MessageUI, that is, a float message interface, and the user can perform messaging by using the second application through the UI without leaving the first application. In addition, the first application may send specific application data through the background message channel, for example, currently played video information, progress information, and shopping cart information, to implement a specific user scenario.

The following describes another software system architecture provided in an embodiment of this application.

Figure 2D:
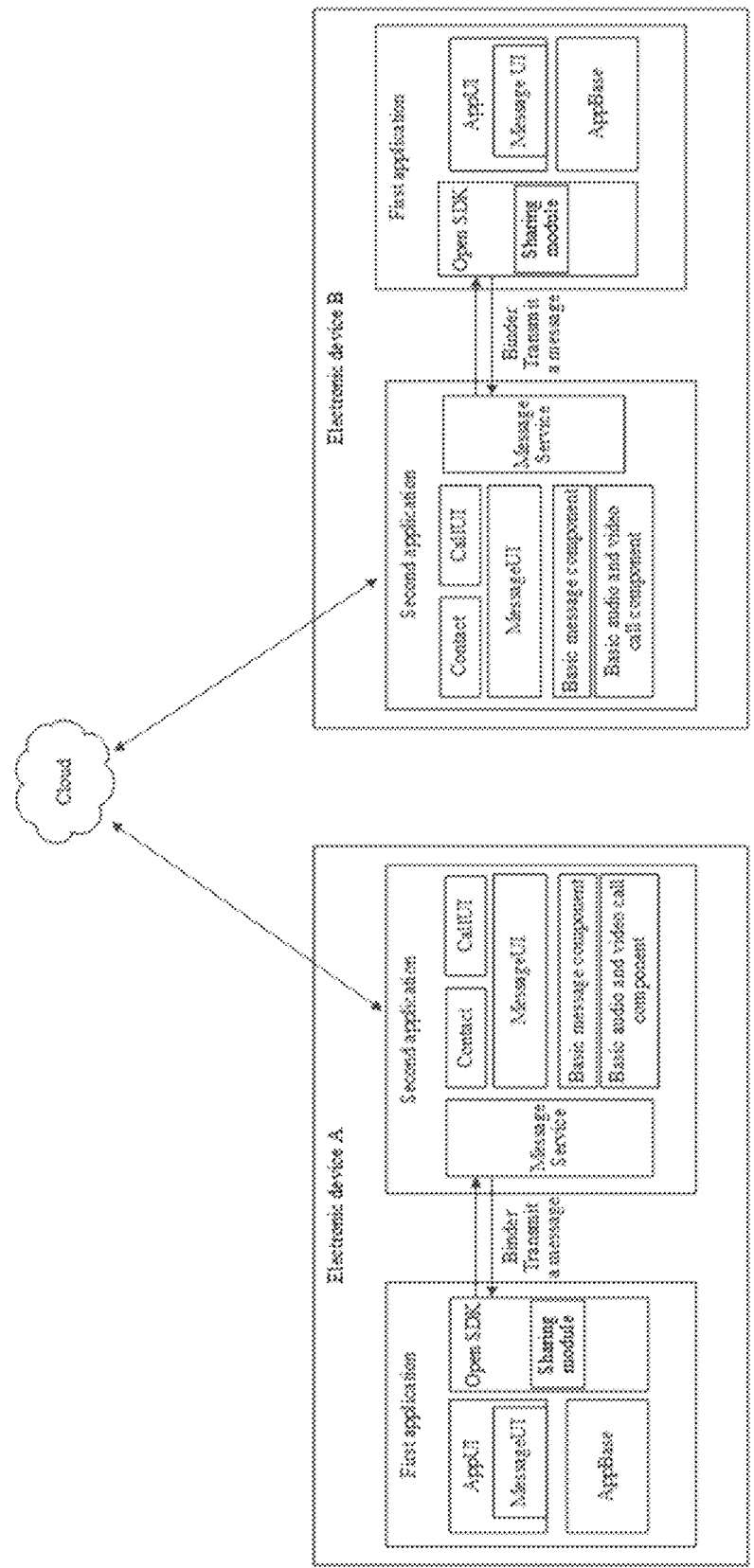
FIG. 2D is a diagram of another software system architecture according to an embodiment of the present disclosure.

Refer to FIG. 2D. FIG. 2D is a diagram of another software system architecture provided in an embodiment of this application. The software system may include two or more electronic devices. FIG. 2D shows an example of an electronic device A (referred to as a device A for short below) and an electronic device B (referred to as a device B for short below). The device A and the device B each may include a first application and a second application.

The first application includes an open SDK, a root directory of the application (AppBase), and an application interface (AppUi). The open SDK and the AppBase are the same as the open SDK and the AppBase of the first application shown in FIG. 2C. Different from that of the first application shown in FIG. 2C, the application interface (AppUi) of the first application shown in FIG. 2D includes MessageUI that is used to provide a message input window on an interface of the first application, so that a user inputs a text or a voice message.

The second application includes a message service (Message Service) component, a contact module, a call interface (CallUI) module, a message interface (MessageUI) module, a basic message component, and a basic audio and video call component. Different from the second application shown in FIG. 2C, the second application shown in FIG. 2D no longer includes a Float MessageUI module.

Most message transmission manners and content sharing processes of cross-process communication between the open SDK of the first application and the message service component of the second application are the same as those shown in FIG. 2C. Details are not described herein again. The following describes only differences between the two.

After the device A and the device B each establish a background message channel, the first application provides MessageUI, that is, the message input window. After a user of the device A inputs a text or voice message, the first application sends the input message to the Message Service component of the second application through the message channel, and then forwards the input message to the basic message component of the second application of the device B by using the basic message component of the second application. Then, the device B sends the message to the first application of the device B by using the Message Service component of the second application and through the message channel, and MessageUI provided by the first application displays the message.

With reference to an application scenario, the following describes a content sharing process in a related technology of this application by using an example in which the electronic device is a mobile phone.

For example, the first application is a video application, the second application is MeeTime, and a video link is shared in the video application through MeeTime.

First, a user A needs to open a user interface (also referred to as a UI interface) of a video application on a mobile phone A.

FIG. 3A shows an example of a user interface 310 of a video application that is displayed by an electronic device such as a smartphone. The video application is one or more applications that provide video content for a user of a mobile device such as a smartphone or a tablet computer, which may also be referred to as "video software". The user can watch, download, or upload videos by using the video application. The video application may be a video application delivered with a device, for example, Huawei Video shown in FIG. 3A, or a video application that is released by a third party and that needs to be downloaded and installed by a user, for example, iQIYI or Youku.

In a possible implementation, this embodiment of the present disclosure may also be applicable to an application that provides audio content for a user, and this application is referred to as an audio application for short. The audio application may be an audio application delivered with a device, for example, Huawei Music, or an audio application that is released by a third party and that needs to be downloaded and installed by a user, for example, NetEase Cloud Music, Kugou Music, or QQ Music.

As shown in FIG. 3A, the user interface 310 of the video application includes video content 311 that is being played by the mobile phone A, a comment button 312, a favorites button 313, and a share button 314. The video content 311 may have a title, for example, "Live World Cup 2018 Belgium VS England Group Competition". The comment button 312 is used to trigger opening of a user comment area. The favorites button 313 may be used to trigger adding the video to a video favorites folder. The share button 314 may be used to trigger opening of a video sharing interface.

The user A taps the share button on the user interface to open the video sharing interface. The mobile phone A may receive an input operation (for example, a tap) performed by a user on the share button 314 in FIG. 3A. In response to the input operation, the mobile phone A may display a video sharing interface 320 shown in FIG. 3B.

As shown in FIG. 3B, the video sharing interface 320 includes a share card 321, video content that is being played, and the like. The share card 321 includes a Sina Weibo button 322, a WeChat button 323, a watch together through MeeTime button 324, a MeeTime button 325, a copy link button 326, a more button 327, and a cancel button 328. The Sina Weibo button 322 may be used to trigger opening of a Sina Weibo sharing interface. The WeChat button 323 may be used to trigger opening of a WeChat sharing interface. The watch together through MeeTime button 324 may be used to trigger opening of a watch-together sharing interface of MeeTime. The MeeTime button 325 may be used to trigger opening of a sharing interface of MeeTime. The copy link button 326 may be used to copy a video link to a clipboard. The more button 327 may be used to trigger enabling of more functions related to sharing. The cancel button 328 may be used to cancel this sharing.

The watch together through MeeTime button 324 can provide a first sharing mode, and the MeeTime button 325 can provide a second sharing mode. The first sharing mode is parallel sharing, and is used to share a video link with a MeeTime contact. The shared MeeTime contact opens a video link card, and synchronously watches a video with a sharing party. The second sharing mode is common sharing, and is used to share a video link to a MeeTime contact. Similar to that shown in FIG. 1A-1 and FIG. 1A-2, the shared MeeTime contact opens a video link card to watch a video from the beginning.

The user A taps a MeeTime button on the video sharing interface to open a MeeTime sharing interface. The mobile phone A may receive an input operation (for example, a tap) performed by the user on the watch together through MeeTime button 324 or the MeeTime button 325 in FIG. 3B. In response to the input operation, the mobile phone A may display an interface 330 shown in FIG. 3C.

As shown in FIG. 3C, the interface 330 includes a search button 331 and a recent chat contacts list 332. The search button 331 may be used to quickly search for a contact in MeeTime. The recent chat contacts list 332 includes a contact recently having a chat by using the mobile phone A through MeeTime, and each contact includes a contact profile picture and a nickname, for example, a profile picture button 333 of a user B and a nickname button 334 of the user B.

The user A selects the profile picture button or the nickname button of the user B and shares a video link to the user B. The mobile phone A may receive an input operation (for example, a tap) performed by the user on the profile picture button 333 or the nickname button 334 of the user B in FIG. 3C. In response to the input operation, the mobile phone A shares a video link of "Live World Cup 2018 Belgium VS England Group Competition" with a mobile phone B. After the sharing is completed, if the user A chooses to stay in the video application to continue watching played video content, the mobile phone A displays a video playing interface.

For example, after the user A selects the watch together through MeeTime button 324 to share a video with the user B, the user B starts MeeTime on the mobile phone B, selects the user A, and enters a chat interface with the user A. A MeeTime chat interface 340 shown in FIG. 3D or a MeeTime chat interface 350 shown in FIG. 3E-1 may be displayed.

As shown in FIG. 3D, the MeeTime chat interface 340 includes a profile picture button 341 of the user B, a profile picture button 342 of the user A, a video link card 343, a call button 344, a more button 346, an input box 345, a play button 348, and a voice input button 347. The profile picture button 341 of the user B and the profile picture button 342 of the user A may be used to trigger opening of user information displaying interfaces. The video link card 343 may be used to trigger opening of a shared video link. Optionally, a "watch together" icon is displayed on the card to prompt the user to synchronously watch a video with the user A by taping the card. The call button 344 may be used to trigger opening of a call interface with the user A. The more button 346 may be used to trigger enabling of more functions related to MeeTime. The input box 345 may be used to trigger enabling of inputting a text message. The voice input button 347 may be used to trigger enabling of inputting a voice message. The user taps the play button 348 of the video link card 343, and the user B opens the video link card to synchronously watch a video with the user A.

Figures 1, 3E:
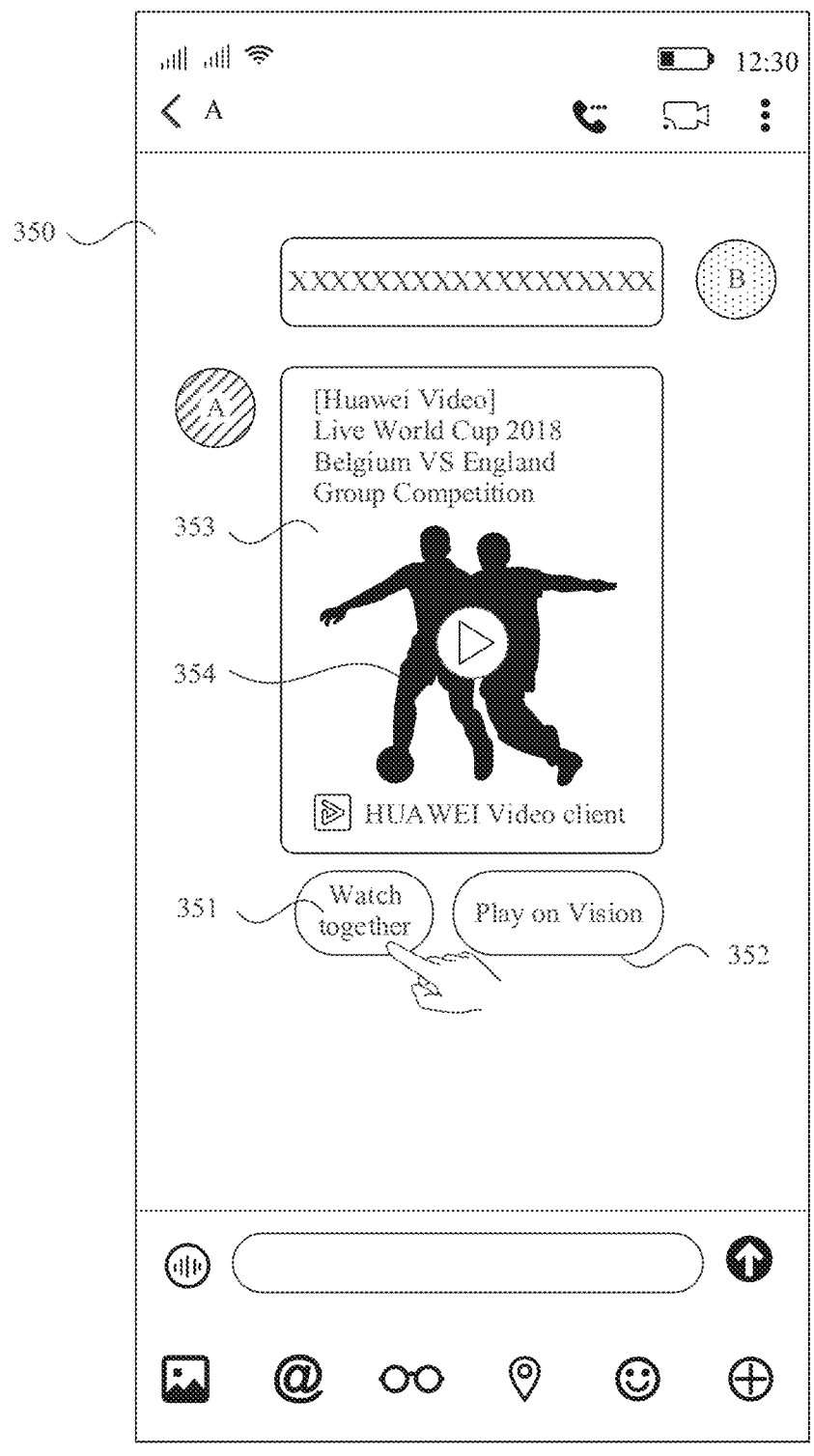
Figures 2, 3E:
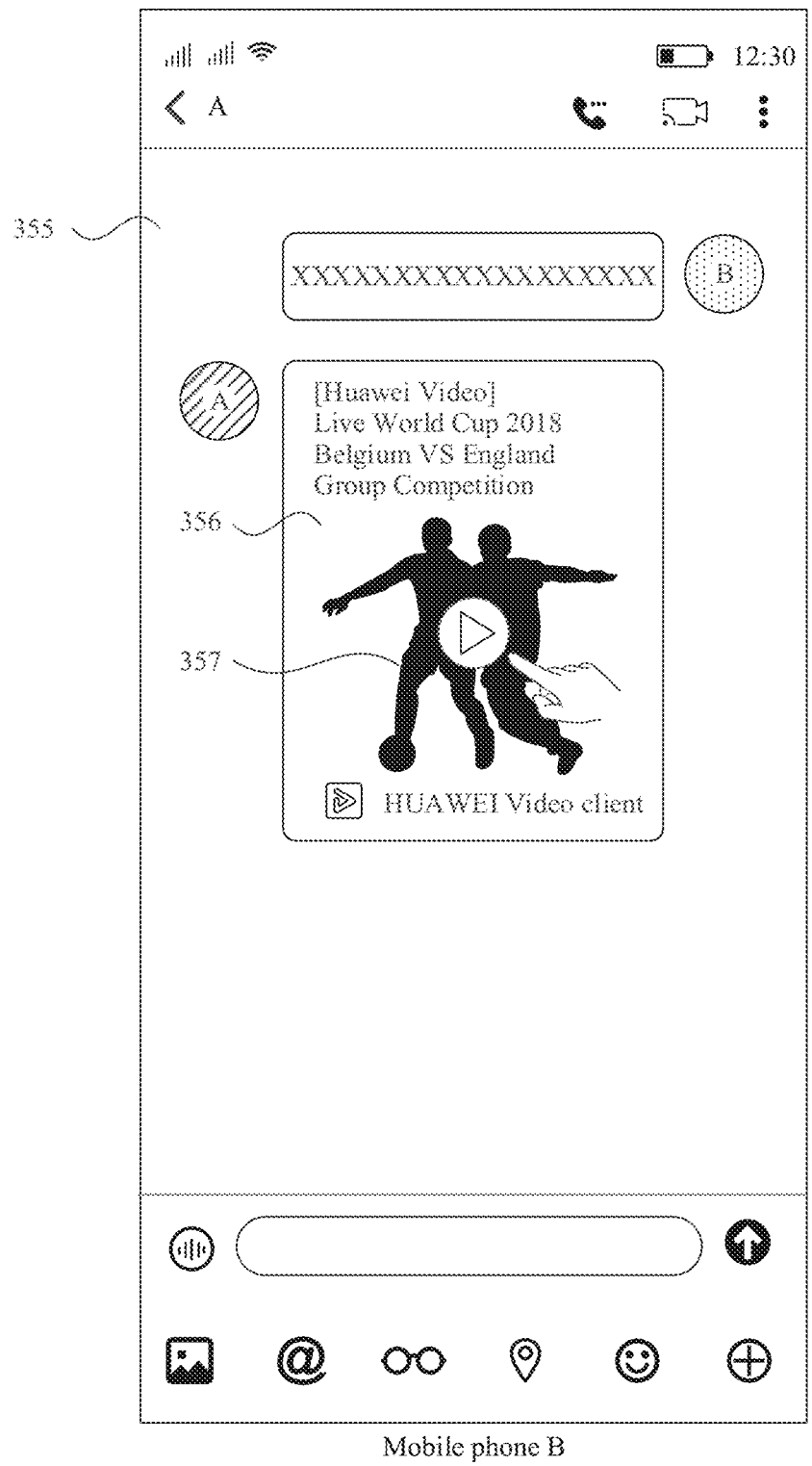

As shown in FIG. 3E-1, the MeeTime chat interface 350 includes a profile picture button of the user B, a profile picture button of the user A, a video link card 353, a call button, a more button, an input box, a play button 354, and a voice input button. The video link card 353 may be used to trigger opening of a shared video link. A control 351 is displayed below the video link card 353, and the control 351 is used to display a parallel sharing entry, for example, "Watch together". Optionally, a control 352 may be further included below the video link card 353. The control 352 is used to display a projection entry, for example, "Play on Vision". After the user taps the control 352, video playing content is projected to Huawei Vision for playing. If the user taps the play button 354 of the video link card 353, the user opens the video link to watch a video from the beginning. If the user taps the control 351, the user opens the video link to watch the video synchronously with the user A.

For example, after the user A selects the MeeTime button 325 to share a video with the user B, the user B starts MeeTime on the mobile phone B, selects the user A, and enters a chat interface with the user A. The MeeTime chat interface 350 shown in FIG. 3E-1 or a MeeTime chat interface 355 shown in FIG. 3E-2 may be displayed.

As shown in FIG. 3E-2, the MeeTime chat interface 355 includes a profile picture button of the user B, a profile picture button of the user A, a video link card 356, a call button, a more button, an input box, a play button 357, and a voice input button. The video link card 356 may be used to trigger opening of a shared video link. If the user taps the play button 357 of the video link card 356, the user opens the video link to watch a video from the beginning.

The mobile phone B may receive an input operation (for example, a tap) performed by the user on the play button in FIG. 3D or the control 351 in FIG. 3E. In response to the input operation, MeeTime of the mobile phone B automatically starts a video application, and opens a video playing interface 360 shown in FIG. 3F.

Figure 3F:
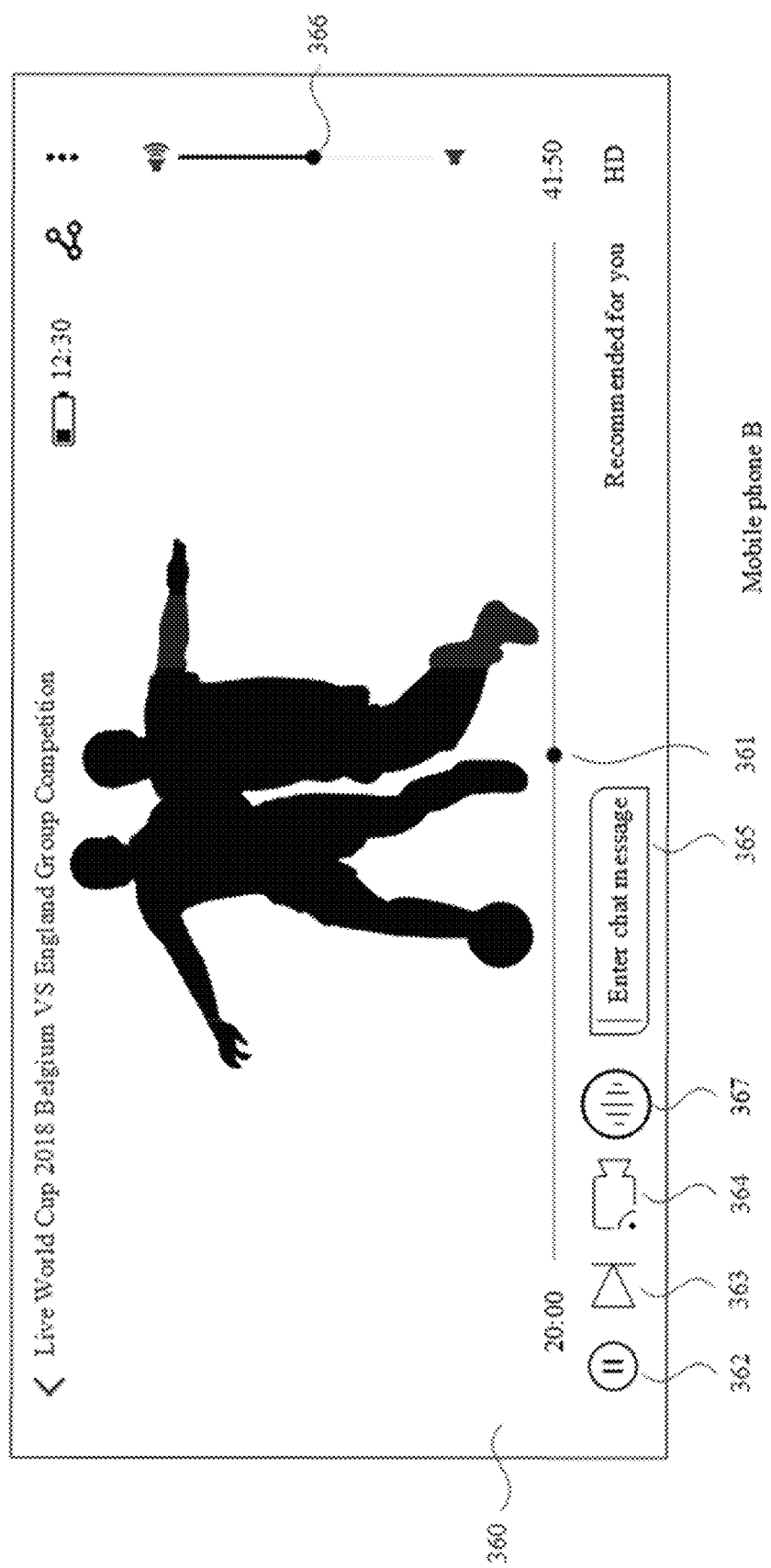

As shown in FIG. 3F, the video playing interface 360 includes a video progress control 361, a pause button 362, a next episode button 363, a MeeTime button 364, a message input box control 365, a volume control 366, and a voice input button 367. The video progress control 361 may be used to indicate current video playing progress, and the user can drag the control 361 to change the video playing progress. As shown in FIG. 3F, duration of a currently played video whose title is "Live World Cup 2018 Belgium VS England Group Competition" is 41 minutes and 50 seconds, current playing progress is 20 minutes and 00 seconds, and the control 361 indicates a location corresponding to the $20^{th}$ minute in the middle of the progress bar. The pause button 362 may be used to trigger to temporarily stop current video playing. The next episode button 363 may be used to trigger opening of a next video. The MeeTime button 364 may be used to trigger enabling of a voice chat function or a video chat function provided by MeeTime. The message input box control 365 may be used to trigger opening of a message input interface. The volume control 366 may be used to indicate a current volume, and the user can drag the control 366 to increase or decrease the volume.

The voice input button 367 may be used to trigger enabling of inputting a voice message.

When the mobile phone B opens the video playing interface 360 shown in FIG. 3F, the video playing progress is video playing progress of the video sharing interface 320 shown in FIG. 3B. To be specific, when the user B chooses to synchronously watch a video shared by the user A, after starting the video application, the mobile phone B automatically adjusts the video play progress to be consistent with the video play progress of the mobile phone A. In this embodiment, when the user A shares the video, the playing progress is 20 minutes 00 seconds. Therefore, the video playing progress of the mobile phone B automatically jumps to 20 minutes 00 seconds. Optionally, a video playing volume of the mobile phone B is also consistent with a playing volume of the mobile phone A.

After the mobile phone B opens the video playing interface 360 shown in FIG. 3F, the mobile phone B sends a message to the mobile phone A, to indicate that the user B has chosen to synchronously watch the video shared by the user A and has started the video playing interface. Optionally, the message sent by the mobile phone B to the mobile phone A may be "The user B has entered the projection hall". After receiving the message, the mobile phone A displays the message on a video playing interface 370.

Figure 3G:
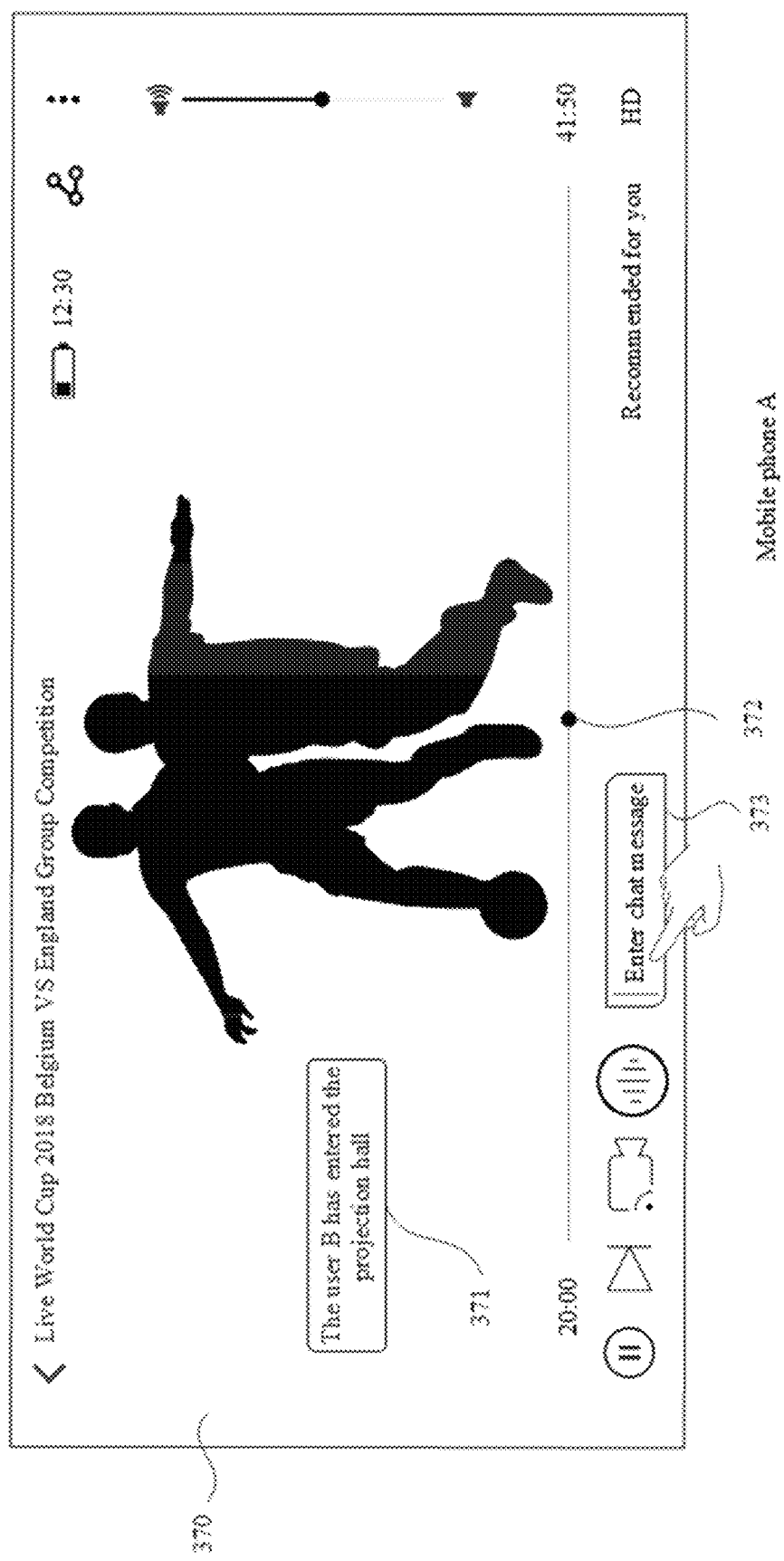

As shown in FIG. 3G, the mobile phone A displays a message notification indicating that the user B has entered the projection hall. The video playing interface 370 of the mobile phone A displays a message prompt 371. For example, content of the message prompt is "The user B has entered the projection hall". The video playing interface 370 of the mobile phone A also includes a video progress control 372, a pause button, a next episode button, a MeeTime button, a message input box control 373, and a volume control. Functions of the foregoing buttons or controls are the same as those of the buttons or controls in the video playing interface 360 of the mobile phone B, and details are not described herein again.

The user A taps the message input box control. A message input interface is entered.

The mobile phone A may receive an input operation (for example, a tap) of the user on the control 373 in FIG. 3G. In response to the input operation, the mobile phone A opens a message input interface 380 shown in FIG. 3H.

Figure 3H:
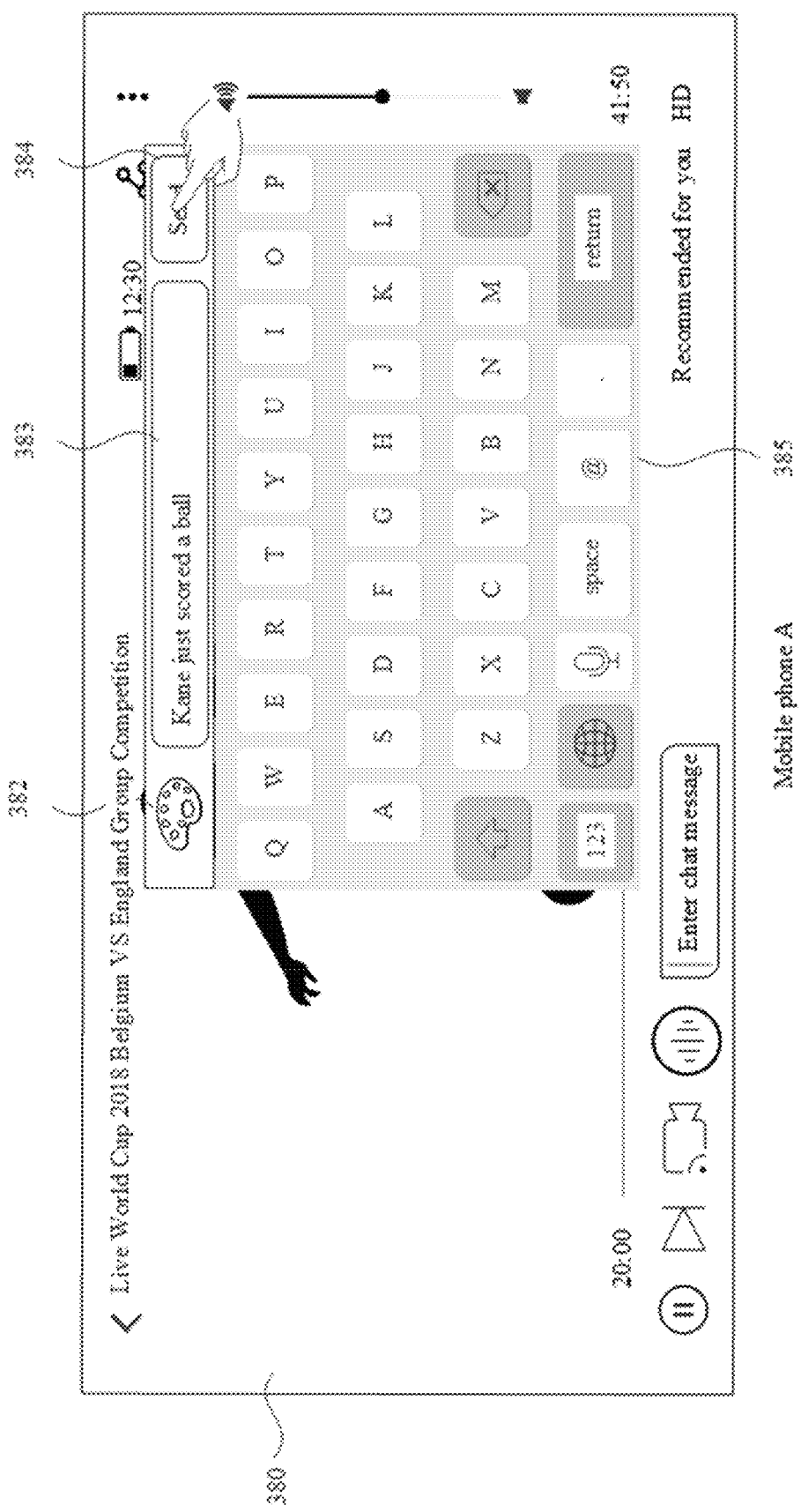
Figure 31:
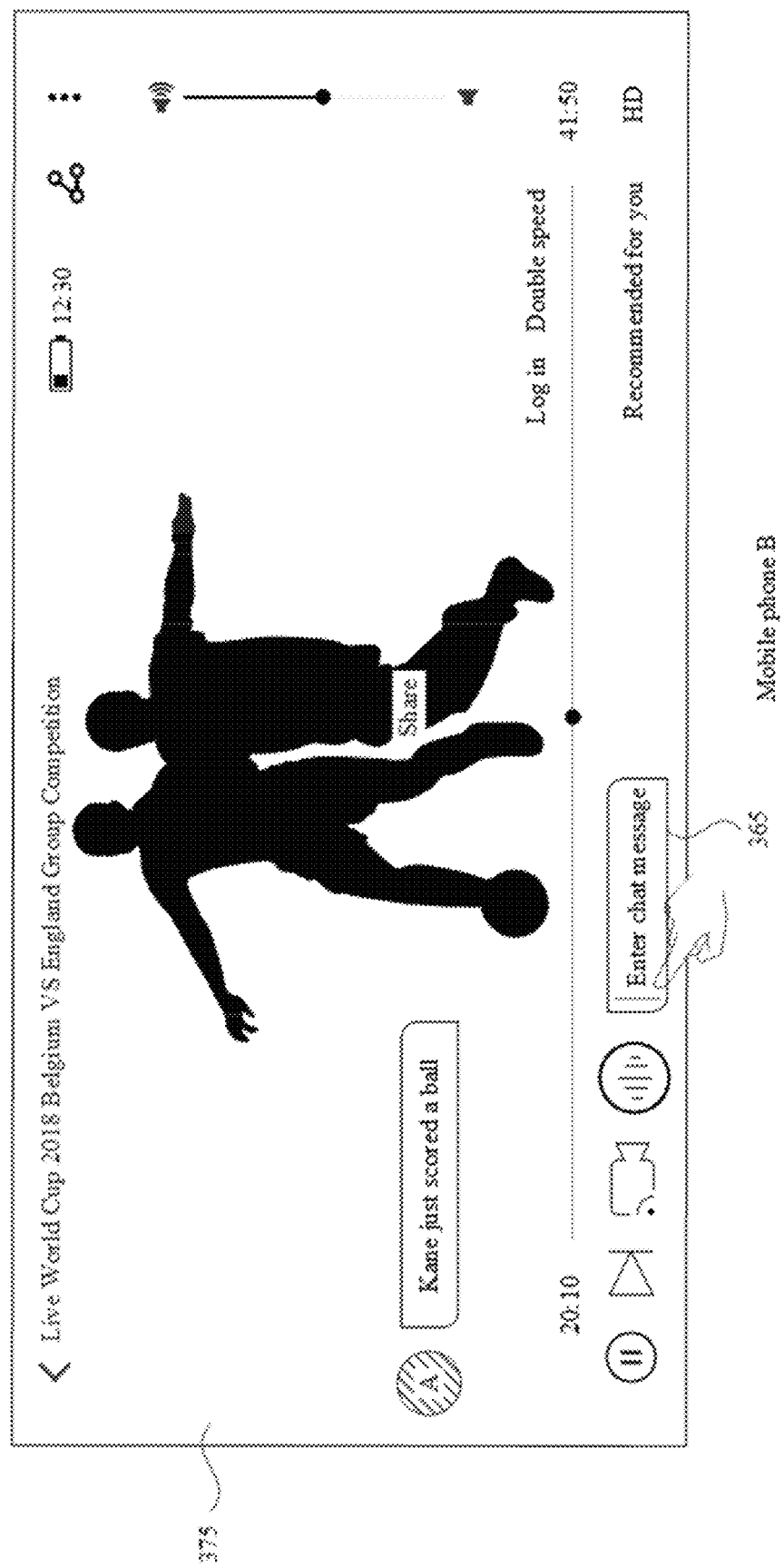

As shown in FIG. 3H, the message input interface 380 includes a palette button 382, a message input box 383, a message sending control 384, and a keyboard control 385. The palette button 382 may be used to control a color of an input message, a display location of the input message in the playing interface, and the like. The message input box 383 may be used to display text selected and entered by the user by using the keyboard control 385, for example, "Kane just scored a ball". After the user taps the message sending control 384 after completing the input, the message input interface 380 may display chat message content, for example, the profile picture or the nickname of the user A, and a text message that the user chooses to send.

After the chat message is sent to the mobile phone B by using the mobile phone A, the message content is also synchronously displayed on the video playing interface of the mobile phone B, including the profile picture or nickname of the user A and the text message that the user A chooses to send. Refer to a video playing interface 375 in FIG. 3I. When the user B needs to reply to or comment on the text message sent by the mobile phone A, the mobile phone B may receive an input operation (for example, a tap) on a control 365 in FIG. 3I. In response to the input operation, the mobile phone B opens a message input interface 390 shown in FIG. 3J.

Figure 3J:
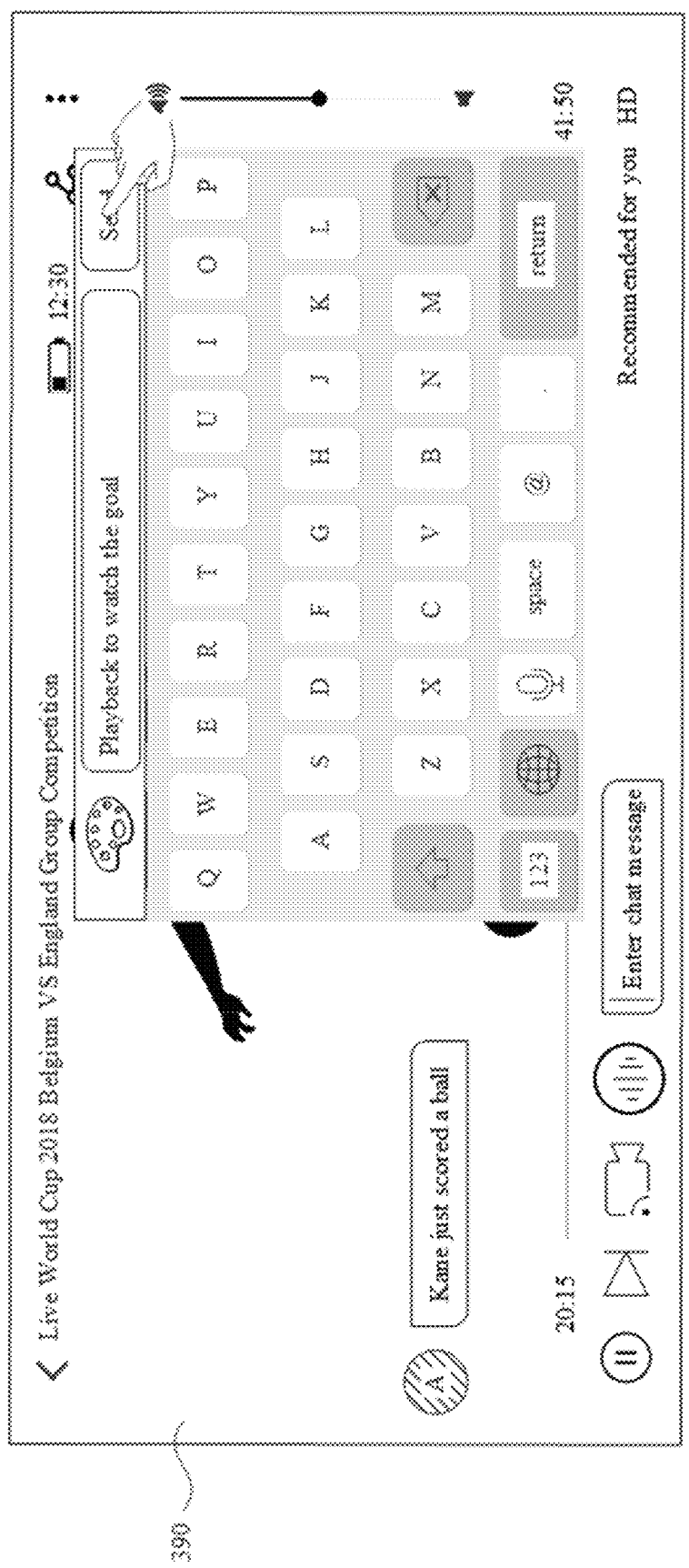
Figure 3K:
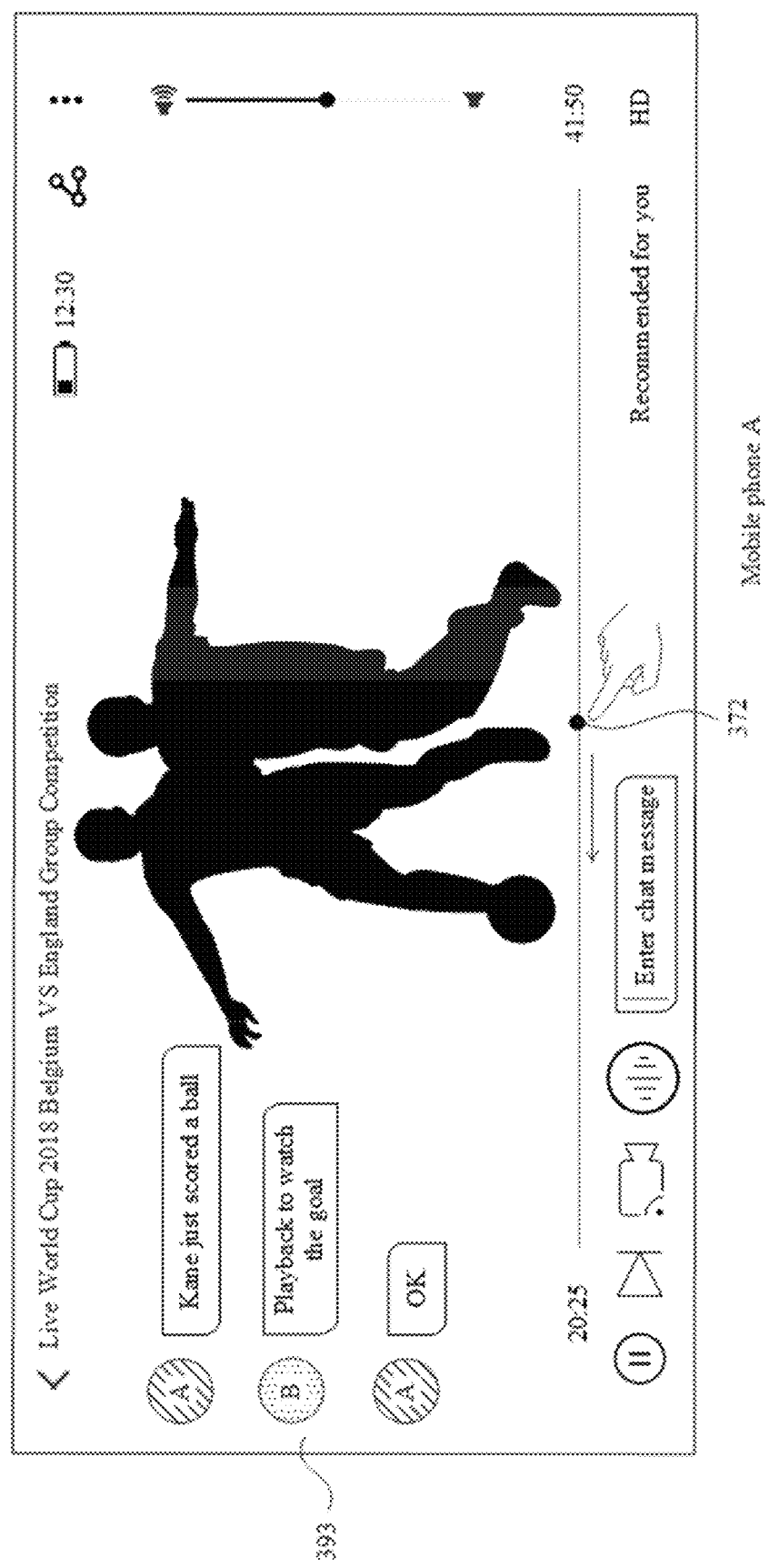

As shown in FIG. 3J, the message input interface 390 includes a palette button, a message input box, a message sending control, and a keyboard control. Functions of the foregoing buttons or controls are the same as those of the buttons or controls on the message input interface 380 of the mobile phone A, and details are not described herein again. The user B inputs text by using a keyboard control, for example, "Playback to watch the goal". After completing the input, the user taps the message sending control, and the message input interface 390 displays chat message content, including the profile picture or nickname of the user B and the text message that the user B chooses to send. The content is displayed on a video playing interface 393 of the mobile phone A. Refer to FIG. 3K.

The user A continues to input "OK", and the text information is displayed on the video playing interface 393 of the mobile phone A.

Subsequently, the user A moves a video progress control 372 along an arrow direction shown in FIG. 3K, and can control video playing progress. The mobile phone A may receive an input operation (for example, dragging or releasing) performed by the user A on the video progress control 372, and enter, in response to the input operation, a video playing interface 394 shown in FIG. 3L.

Figure 3L:
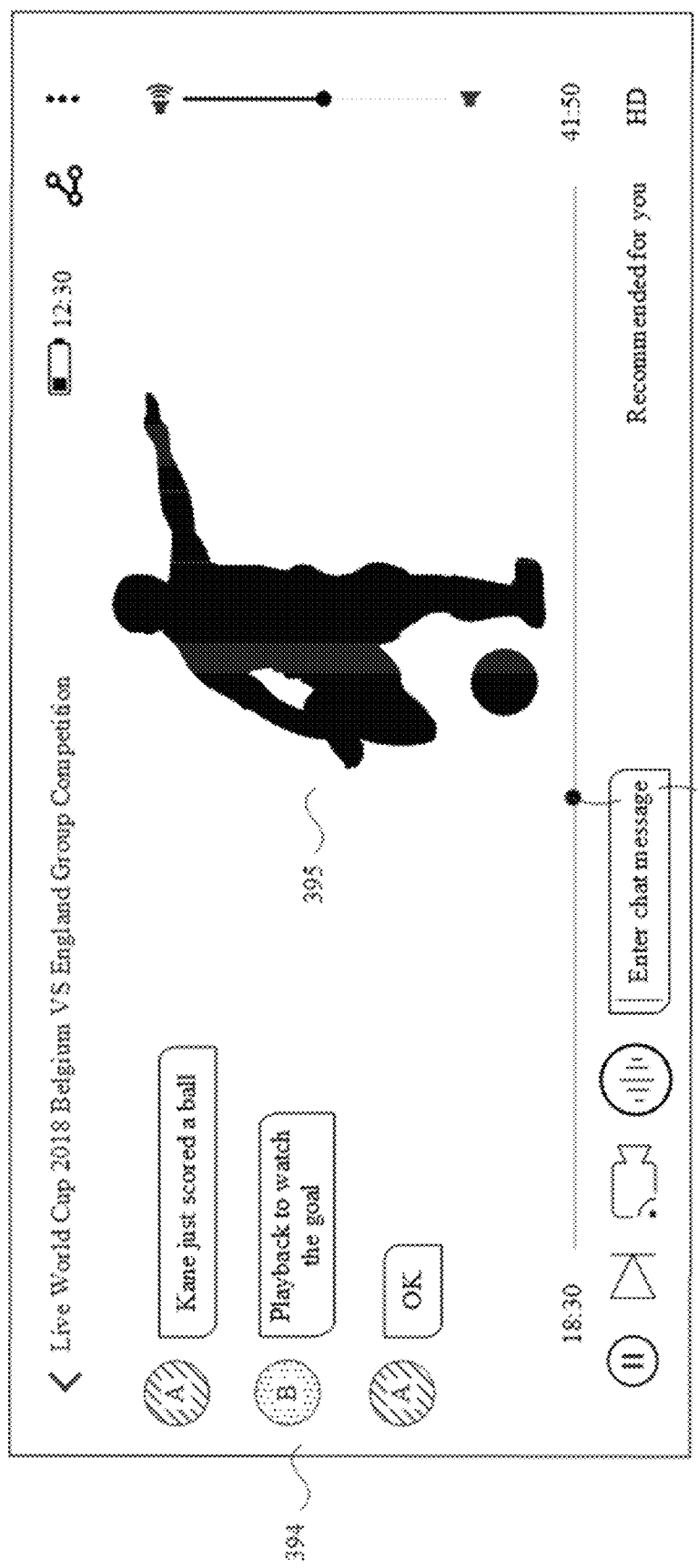

As shown in FIG. 3L, the video playing interface 394 includes new video playing content 395 and the video progress control 372. The video playing content 395 may be different from the video content 311 played at the $20^{th}$ minute, for example, a picture of a goal of Kane. The video progress control 372 is displayed at a location of the $18^{th}$ minute and $30^{th}$ second of the video progress bar.

Figure 3M:
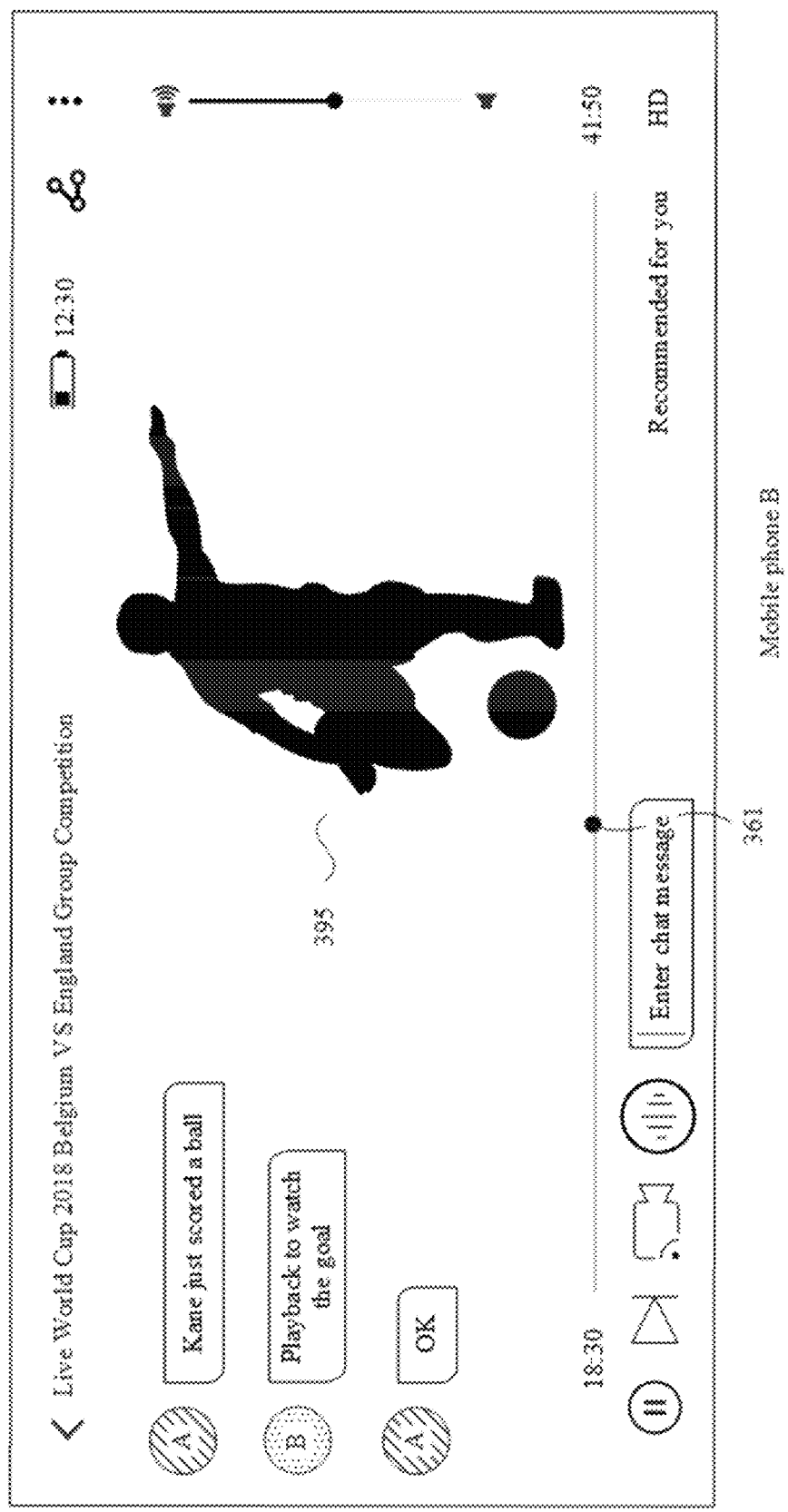

The video application of the mobile phone A sends information indicating that the user rewinds the video to MeeTime of the mobile phone B, MeeTime of the mobile phone B sends the message to the video application of the mobile phone B, and the mobile phone B parses the message and controls the video to rewind to the location of the $18^{th}$ minute and $30^{th}$ second of the video, as shown in FIG. 3M. The video playing interface of the mobile phone B also displays the video playing content 395, and the video progress control 361 of the mobile phone B is also displayed at the location of the $18^{th}$ minute and $30^{th}$ second of the video progress bar.

In a possible implementation, chatting between the user A and the user B in a video playing process is performed in the AppUI module provided by the video application. For example, a diagram of a software system architecture shown in FIG. 2D is used. An application interface (AppUi) of a video application includes MessageUI, used to provide a message input window on an interface of the video application, so that a user inputs a text or voice message. The message input box control 373, the voice input button, the message input interface 380, the palette button 382, the message input box 383, the message sending control 384, and the keyboard control 385 of the mobile phone A, the message input box control 365, the voice input button 367, the message input interface 390, the palette button, the message input box, the message sending control, and the keyboard control of the mobile phone B, and the displayed voice or text messages input by the user A and the user B that are shown in FIG. 3F to FIG. 3M are provided by the video application, for example, Huawei Video.

In a possible implementation, for chatting between the user A and the user B in a video playing process, a chat user interface may also be provided by MeeTime, and real-time voice chatting may be performed. For example, a diagram of a software system architecture shown in FIG. 2C is used. MeeTime includes the float message interface (Float MessageUI) module, used to provide a message input window on an interface of the video application, so that a user inputs a text or a voice message. The MeeTime button, the message input box control 373, the voice input button, the message input interface 380, the palette button 382, the message input box 383, the message sending control 384, and the keyboard control 385 of the mobile phone A, the MeeTime button 364, the message input box control 365, the voice input button 367, the message input interface 390, the palette button, the message input box, the message sending control, and the keyboard control of the mobile phone B, and the displayed voice or text message input by the user A and the user B that are shown in FIG. 3F to FIG. 3M are provided by MeeTime.

In some embodiments, when the user A opens the MeeTime sharing interface in the video application, the mobile phone A may share, after receiving a group selected by the user, a link of a played video to the group selected by the user.

Figure 4A:
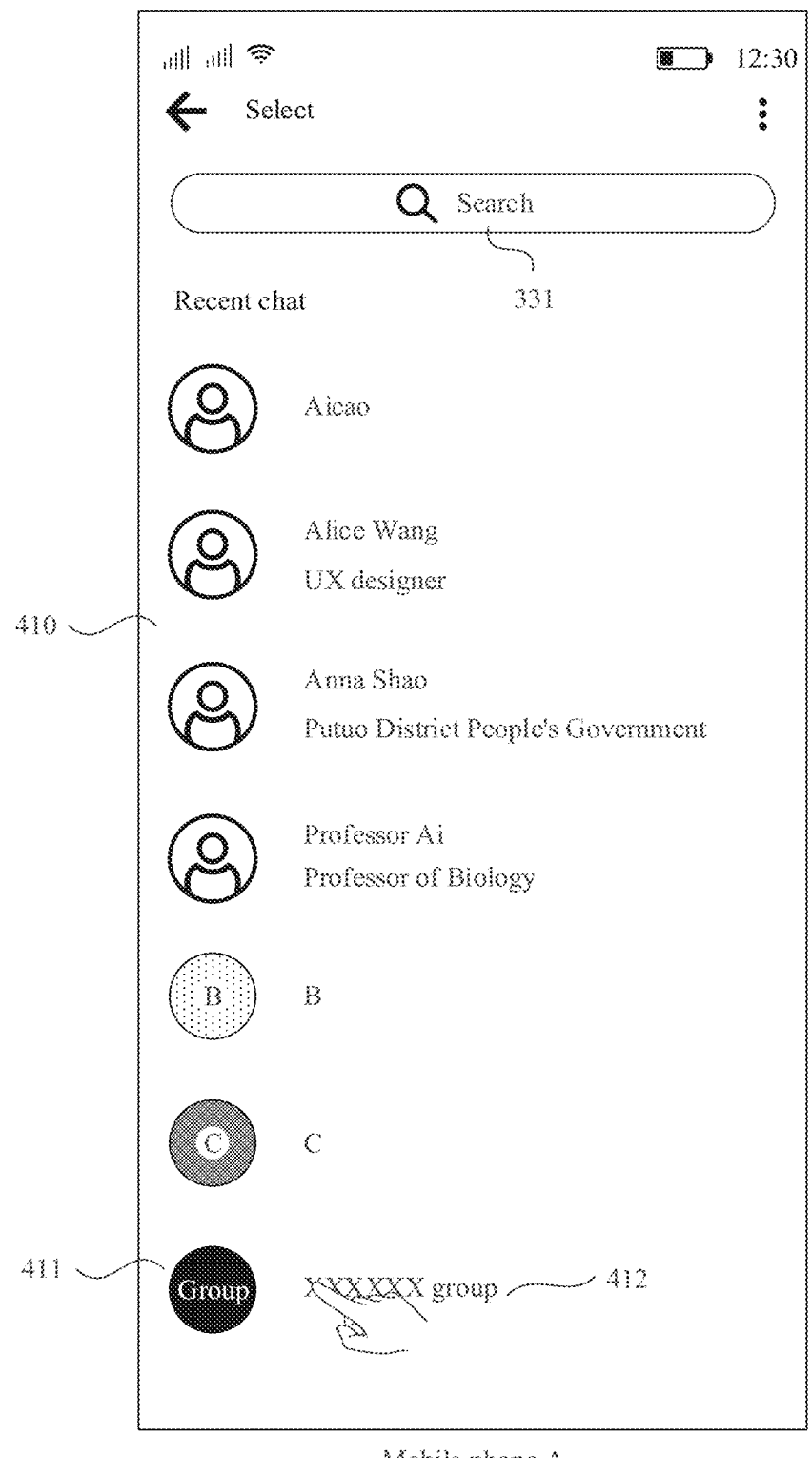
FIG. 4A to FIG. 4H are schematic diagrams of another group of interfaces according to an embodiment of the present disclosure.

For example, as shown in FIG. 4A, the user A opens a MeeTime sharing interface 410 in the video application, and selects a group 412 whose group name is "group". The mobile phone A may receive an input operation (for example, a tap) of the user for the group 412. In response to the input operation, members in the group receive a video link shared by the user A.

Figure 4B:
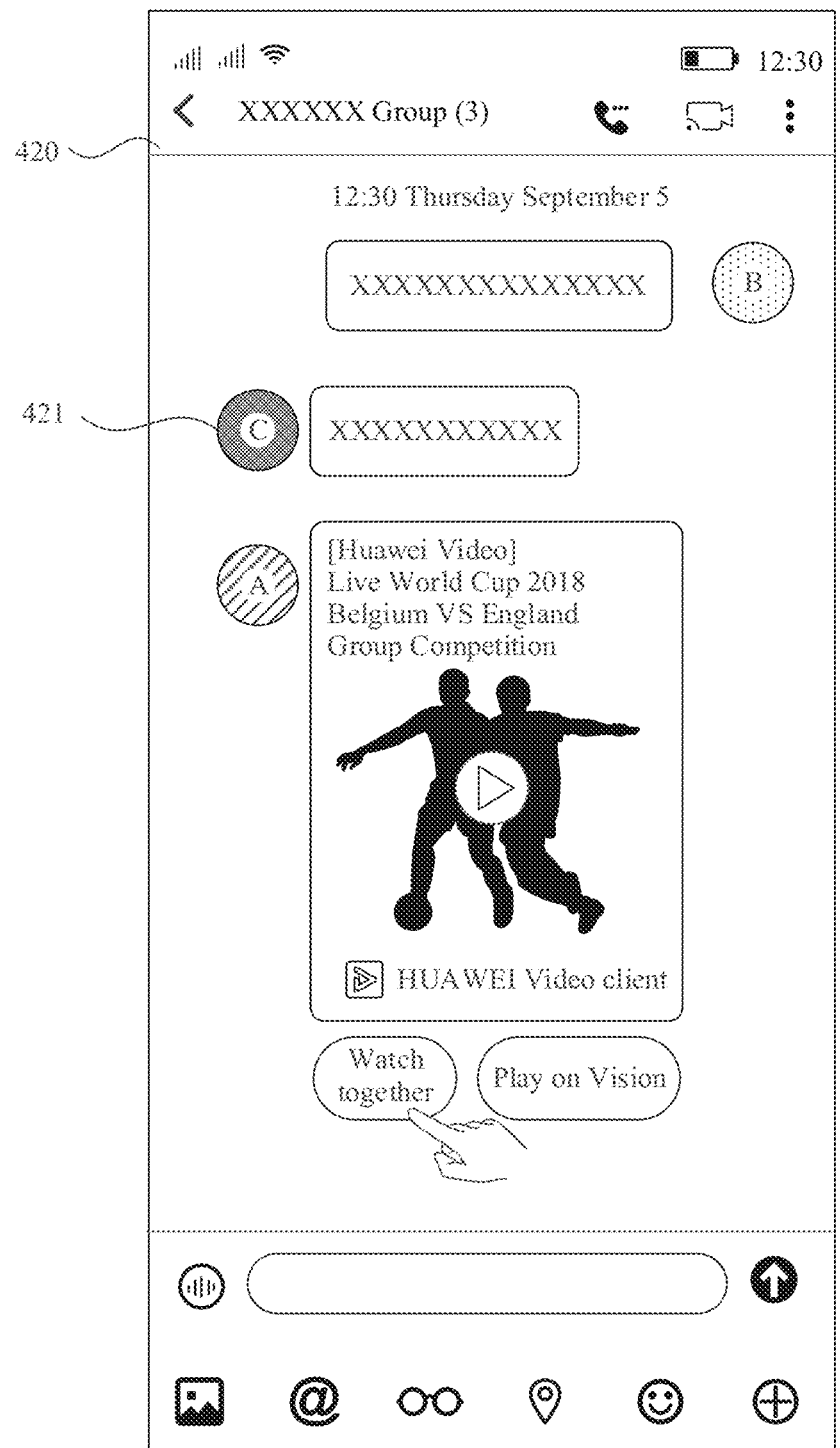

For example, as shown in FIG. 4B, the mobile phone B may display a MeeTime chat interface 420. The MeeTime chat interface 420 includes a profile picture button of the user A, a profile picture button of the user B, a profile picture button 421 of a user C, a video link card, a call button, a MeeTime button, a more button, a voice input button, a parallel sharing entry, Play on Vision, and the like. The profile picture button 421 of the user C may be used to trigger opening of user information. A mobile phone C may also display a corresponding MeeTime chat interface. The user B and the user C may separately tap the parallel sharing entry to watch a video with the user A, or may choose not to tap the entry to access the video.

Figure 4C:
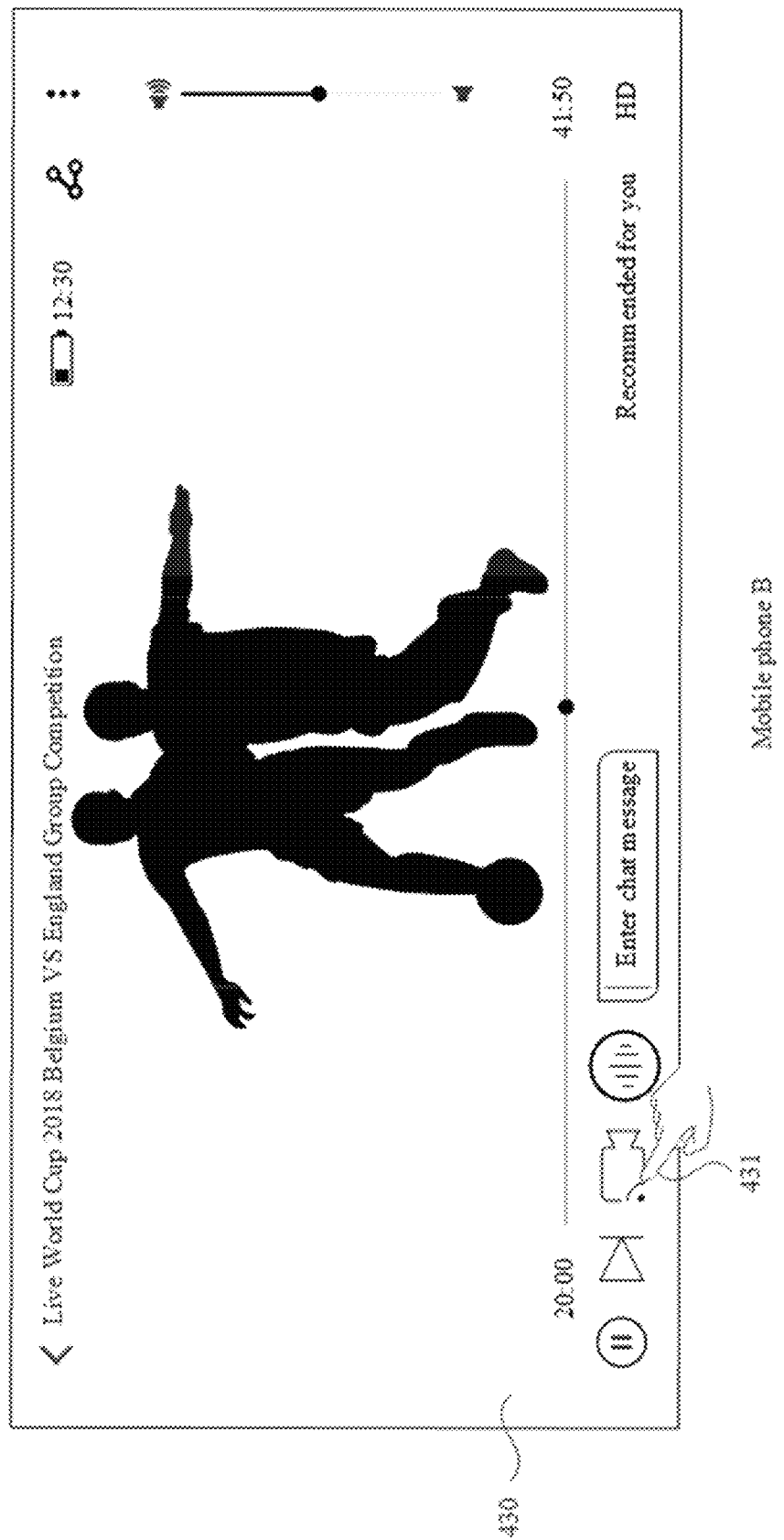

For example, as shown in FIG. 4C, the user B in the group 412 taps a parallel sharing entry to watch a video together with the user A. The mobile phone B presents a video playing interface 430. Video playing progress, a current volume, and the like are the same as those of the mobile phone A and are controlled by the mobile phone A. The user A and the user B can interact and chat on the video playing interface 430.

Figure 4D:
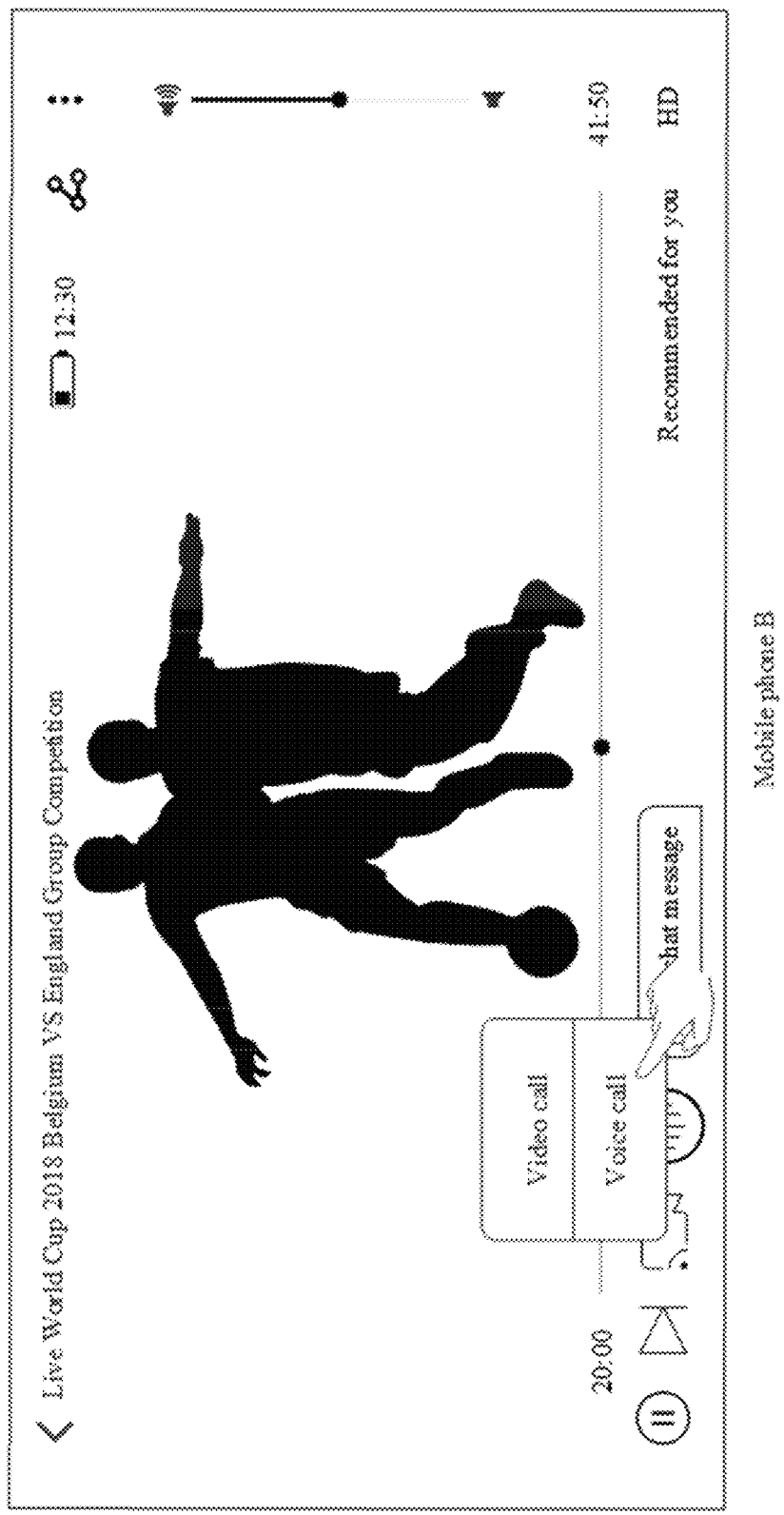
Figure 4E:
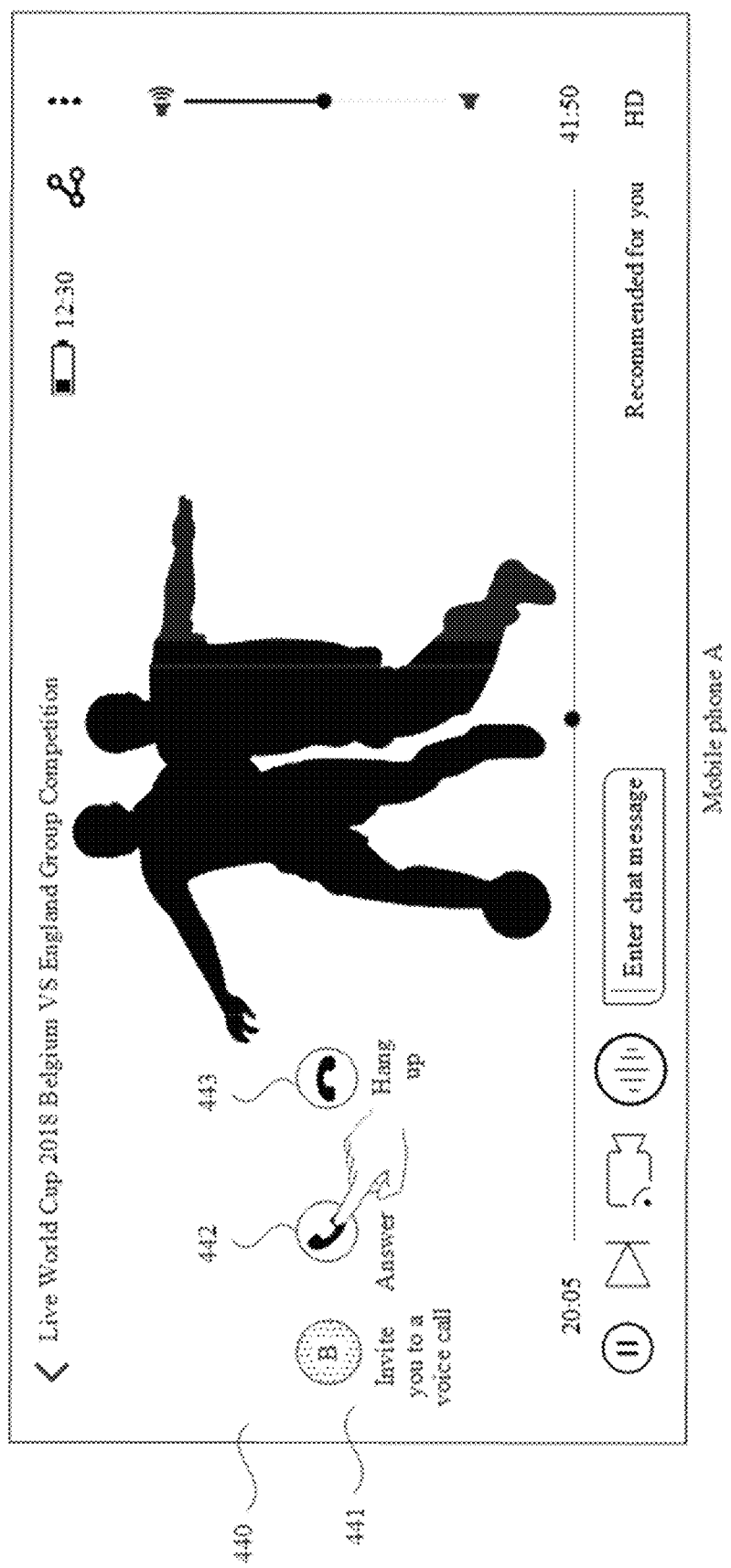

In addition, as shown in FIG. 4C, a MeeTime button 431 is provided on the video playing interface 430, to trigger enabling of a voice chat or video chat function provided by MeeTime. The user B taps or presses and holds the MeeTime button 431, and video call and voice call options shown in FIG. 4D appear. After the user selects the voice call option, as shown in FIG. 4E, the mobile phone A displays a voice call interface 440. If the user taps "Video Call", a video chat window may be opened, and float on the current video playing interface, to present a picture-in-picture effect. The user may change a size of the video chat window, or hide the video chat window.

As shown in FIG. 4E, the voice call interface 440 includes a profile picture 441 of the user B, an answer button 442, and a hang-up button 443. The profile picture 441 of the user B can be used to prompt that the user B "invites you to a voice call". The answer button 442 may be configured to trigger establishment of a voice call connection. The hang-up button 443 may be used to hang up a voice call. Optionally, the voice call interface 440 may further include a mute button. A location and size of the voice call interface including the profile picture 441 of the user B, the answer button 442, and the hang-up button 443 may be changed, and the voice window can be automatically hidden.

If the user A chooses "Answer", a voice call connection is established between the mobile phone A and the mobile phone B. In this case, the user A and the user B can watch a video while having a voice call. For example, the user B requests, by voice, the user A to play back a goal of Kane just now, and the user A drags a video progress bar, as shown in FIG. 4F and FIG. 4G, both the user A and the user B can watch a shooting moment of Kane.

Figure 4F:
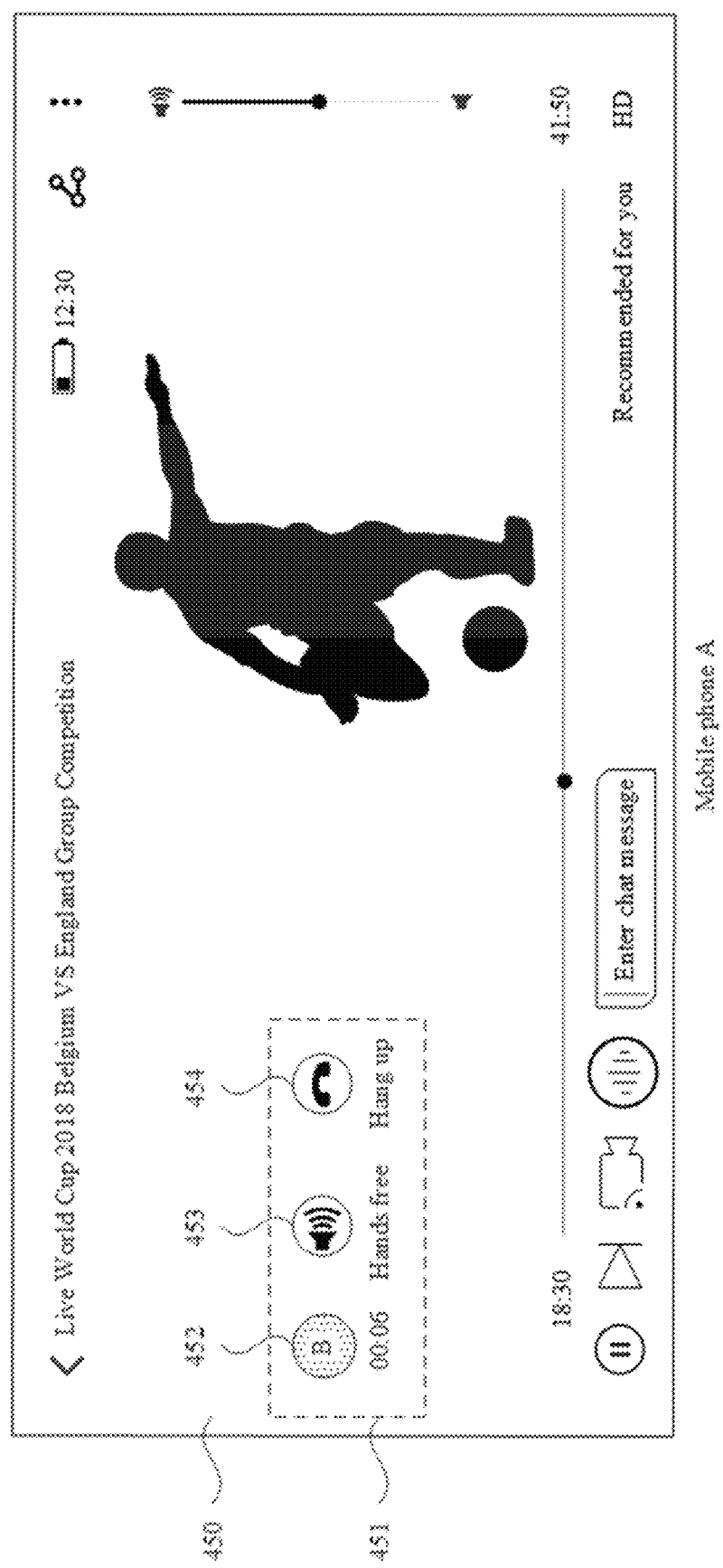

As shown in FIG. 4F, a voice call interface 450 includes a voice chat window 451, and the voice chat window 451 includes a profile picture 452 of the user B, a hands-free button 453, and a hang-up button 454. The profile picture 452 of the user B may be used to prompt an object that has a voice call with the user A and a call time, for example, 00:06 seconds shown in FIG. 4F. The hands-free button 453 may be used to trigger enabling of a hands-free function of the voice call. If the user enables the hands-free function, a commentary sound of the football game is temporarily reduced. Alternatively, the user has projected the mobile phone A to Huawei Vision for playing. After a voice connection is established, the mobile phone A temporarily reduces a commentary sound of the football game, so that the user can perform a voice chat. The hang-up button 454 may be used to hang up the voice call. Optionally, the voice call interface 450 may further include a mute button. A location and a size of the voice chat window 451 may be changed, and the voice chat window 451 may be automatically hidden.

Figure 4G:
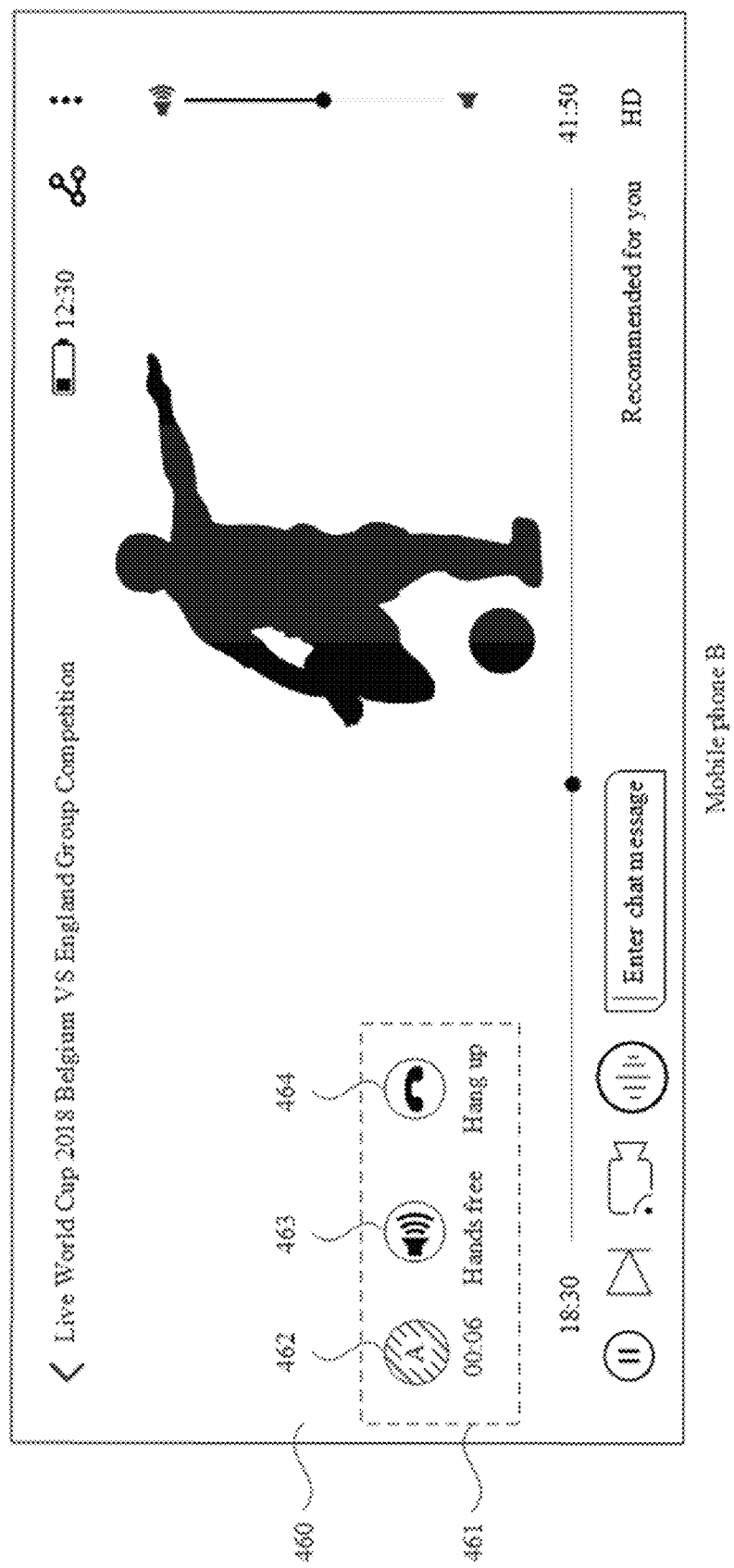

As shown in FIG. 4G, a voice call interface 460 includes a voice chat window 461, and the voice chat window 461 includes a profile picture 462 of the user A, a hands-free button 463, and a hang-up button 464. The profile picture 462 of the user A may be used to prompt an object that has a voice call with the user B and a call time, for example, 00:06 seconds shown in FIG. 4G. Functions of the hands-free button 463 and the hang-up button 464 are similar to those of the hands-free button 453 and the hang-up button 454 shown in FIG. 4F, and details are not described herein again.

Figure 4H:
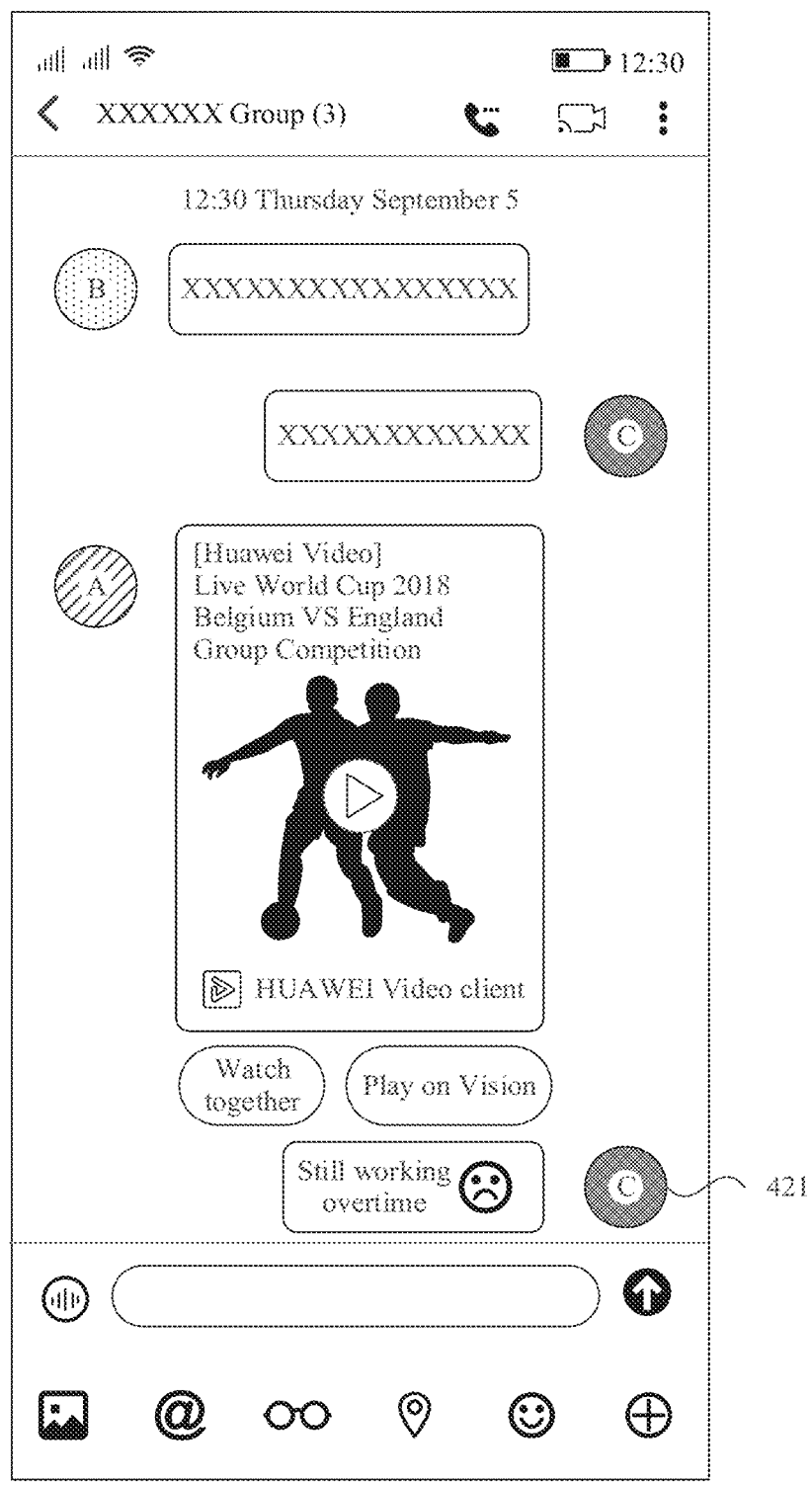

For example, as shown in FIG. 4H, the user C in the group 412 does not tap a parallel sharing entry, the mobile phone C still presents a MeeTime chat interface, and the user C receives and sends messages on the chat interface.

The following describes a specific operation sequence diagram with reference to an application scenario of video sharing.

Figure 5:
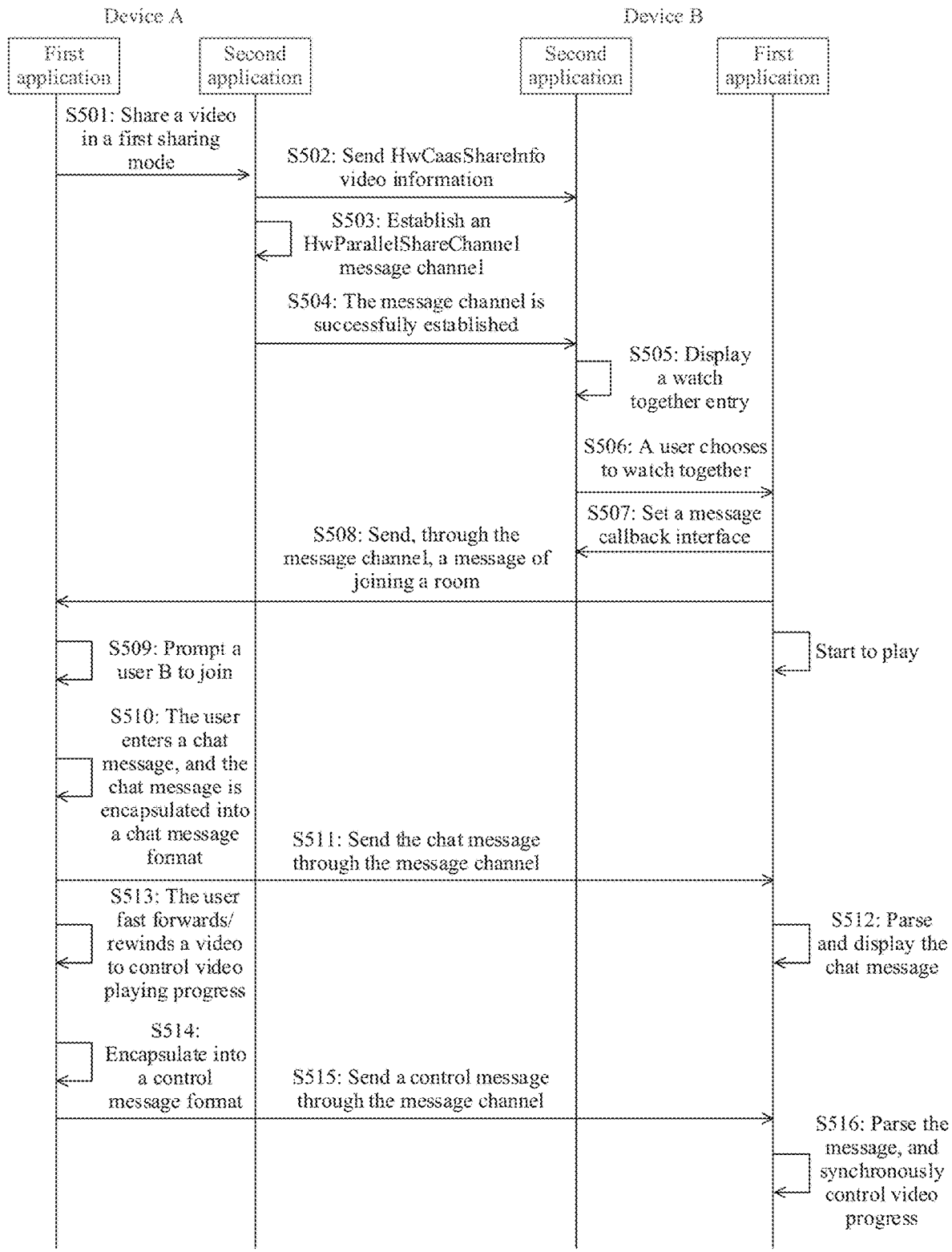
FIG. 5A and FIG. 5B are an operation sequence diagram of video sharing according to an embodiment of the present disclosure.

Refer to FIG. 5A and FIG. 5B. FIG. 5A and FIG. 5B show an operation sequence diagram of video sharing. Devices involved in the method flowchart include a device A and a device interacting with the device A. The interaction device may be the device B or the device C shown in FIG. 4, and the devices A to C interact with each other through the communications network shown in FIG. 1. For example, for the devices A to C, refer to the system architecture shown in FIG. 2C. A first application shown in FIG. 5A may be a video application, and a second application may be an instant messaging application such as MeeTime.

As shown in FIG. 5A and FIG. 5B, the method includes the following steps.

S501: Share a video in a first sharing mode.

For example, the device A may receive an input operation (for example, tapping a share button) of sharing first content by a user. In response to the input operation, the device A displays a content sharing interface. For the content sharing interface, refer to the video sharing interface 320 shown in FIG. 3B. Sharing the video in the first sharing mode may be that a user A taps the watch together through MeeTime button 324 shown in FIG. 3B to share the video with a user operating the device B.

The first application invokes a parallel sharing API by using an integrated open SDK (for a structure of first application software of the device A, refer to FIG. 2C). The first application enables, by invoking the API, a device operating system to execute a command of the application. The parallel sharing API includes an interface, and the interface includes targetScene (targetScene), a HwCaasShareInfo (HwCaasShareInfo) function, and a HwParallelShareChannel (HwParallelShareChannel) function. TargetScene (targetScene) is used to indicate a scenario object such as a sent message.

S502: Send HwCaasShareInfo video information.

The video information is HwCaasShareInfo (HwCaasShareInfo) carried by the parallel sharing API.

HwCaasShareInfo (HwCaasShareInfo) includes:
mParallelShare (mParallelShare: 0: common sharing; 1: parallel sharing)
mMakeCall (mMakeCall: whether to enable the voice call function. 0: no; 1: yes);
mShareType (mShareType: shopping, news/webpage, short video, long video, music, and text);
mShareInfo (mShareInfo: message content, title, content, and the like);
mThumbBitmap (mThumbBitmap: a thumbnail);
mPackageInfo (mPackageInfo: an application name and an application icon);
mWebUrl (mWebUrl: an h5 page URl);
mAppUrl (mAppUrl: an app Page URl);
mStreamUrl (mStreamUrl: an online playing URl of streaming media); and
mExtraInfo (mExtraInfo: other message content, current video playing progress, current location information, current music progress information, and current shopping cart information, and the like).

After receiving message content shared by the first application by invoking a sharing API, a Message Service component of the second application in the device A parses the message content, and determines, based on the mParallelShare field, whether the parallel sharing mode is used. In addition, other message content in a first message is encapsulated into a card, and the card is displayed in a chat window of a MessageUI module. The second application sends the first message to the device B by using a basic message component. After receiving the message, the device B may display a card in the second application, for example, the video link card 343 shown in FIG. 3D.

S503: Establish a HwParallelShareChannel message channel.

If the second application in the device A determines that the parallel sharing mode is used, the second application in the device A creates a cross-process message channel between the second application and the first application in the device A. The cross-process message channel is implemented through HwParallelShareChannel. HwParallelShareChannel is used to receive and send data between the first application and the second application, and is set when the parallel sharing API is invoked, to establish the cross-process message channel between the first application and the second application. A channel function is defined to include sending and receiving AppMessage and sending and receiving ChatMessage. The application information includes mIdIcon, mIdDescription, and message content. The chat message includes a profile picture, a nickname, a plain text, a voice, a video, an image, a small file, a preset label, and a geographical location.

S504: The message channel is successfully established.

After the cross-process message channel between the second application and the first application in the device A is established, the second application sends a channel establishment message to the second application in the device B by using the basic message component.

S505: Display a watch together entry.

The second application of the device B receives the channel establishment message, and a MessageUI module refreshes a message card to display the watch together entry, for example, the control 351 in FIG. 3E or "Watch together" on the video link card 343 in FIG. 3D.

S506: The user chooses to watch together.

For example, the user taps the watch together entry, for example, the control 351 in FIG. 3E or the play button of the video link card 343 in FIG. 3D, and the MessageUI module of the device B automatically opens the corresponding first application based on mAppUrl information.

S507: Set a message callback interface.

For example, after the video application is started, a sharing mode mParallelShare and other information mExtraInfo in the first message are parsed out.

First, whether the sharing mode is the first sharing mode is determined. If the sharing mode is the parallel sharing mode, an object HwParallelShareChannel is set to the second application through the API of the open SDK. The second application establishes a message channel between the second application and the video application by using the HwParallelShareChannel object, and records a correspondence between the message channel and a chat window threadID.

Second, information in mExtraInfo is parsed, where the information is filled by the video application of the device A and parsed by the video application of the device B. Format content of the information is defined by the video application, and may be defined as the following format for reference:

currentTime: 20.0;
currentVolume: 65;
To be specific, a current playing time point is 20 minutes, and a current playing volume is 65%.

Finally, first content is played in the video application, and a playing parameter is a parameter obtained through parsing. For example, the video playing interface 360 shown in FIG. 3F is displayed.

S508: Send, through the message channel, a message of joining a room.

The device B sends, by using a sendAppMessage method of the parallel sharing channel (HwParallelShareChannel) object, the message of joining a room. A message content mMessageInfo format is defined by the video application, and may be defined as the following format for reference: JoinRoom: 1. The message is sent to the Message Service component of the second application. The Message Service component determines that the message is AppMessage, and forwards the message to the device A by using the basic message component. After receiving the message, the second application of the device A determines that the message is AppMessage, and forwards the message to the corresponding first application by using onAppMessageReceive of the parallel sharing channel (HwParallelShareChannel).

S509: Prompt the user B to join.

After receiving the message, the first application of the device A parses mMessageInfo as a joining room message, refreshes the video playing interface, and reminds the user to enter a projection hall. For example, the message prompt 371 in FIG. 3G is displayed.

S510: The user A enters a chat message, and the chat message is encapsulated into a chat message format.

The user A uses the sendChatMessage method of the HwParallelShareChannel object to send the chat message and fills content in the chat message format.

S511: Send the chat message through the message channel.

After receiving the message, the second application determines that the message is chatMessage, parses the message content, refreshes a message UI MessageUI, and forwards the message to the device B by using the basic message component. After receiving the message, the device B determines that the message is chatMessage, refreshes a message UI MessageUI, and forwards the message to the corresponding video application by using the onChatMessageReceive method of the HwParallelShareChannel object.

S512: Parse and display the chat message.

After receiving chatMessage, the video application parses chatMessage and refreshes the UI to display the chat message.

S513: The user fast forwards/rewinds the video to control video playing progress.

S514: Encapsulate into a control message format.

The video application encapsulates a video fast-forward message by using AppChannelMessage. A format of message content mMessageInfo is defined by the video application, and may be defined as the following format for reference:

aforward: 30 s;//Fast forward for 30 s.

S515: Send the control message through the message channel.

S516: Parse the message, and synchronously control video progress.

Figure 6:
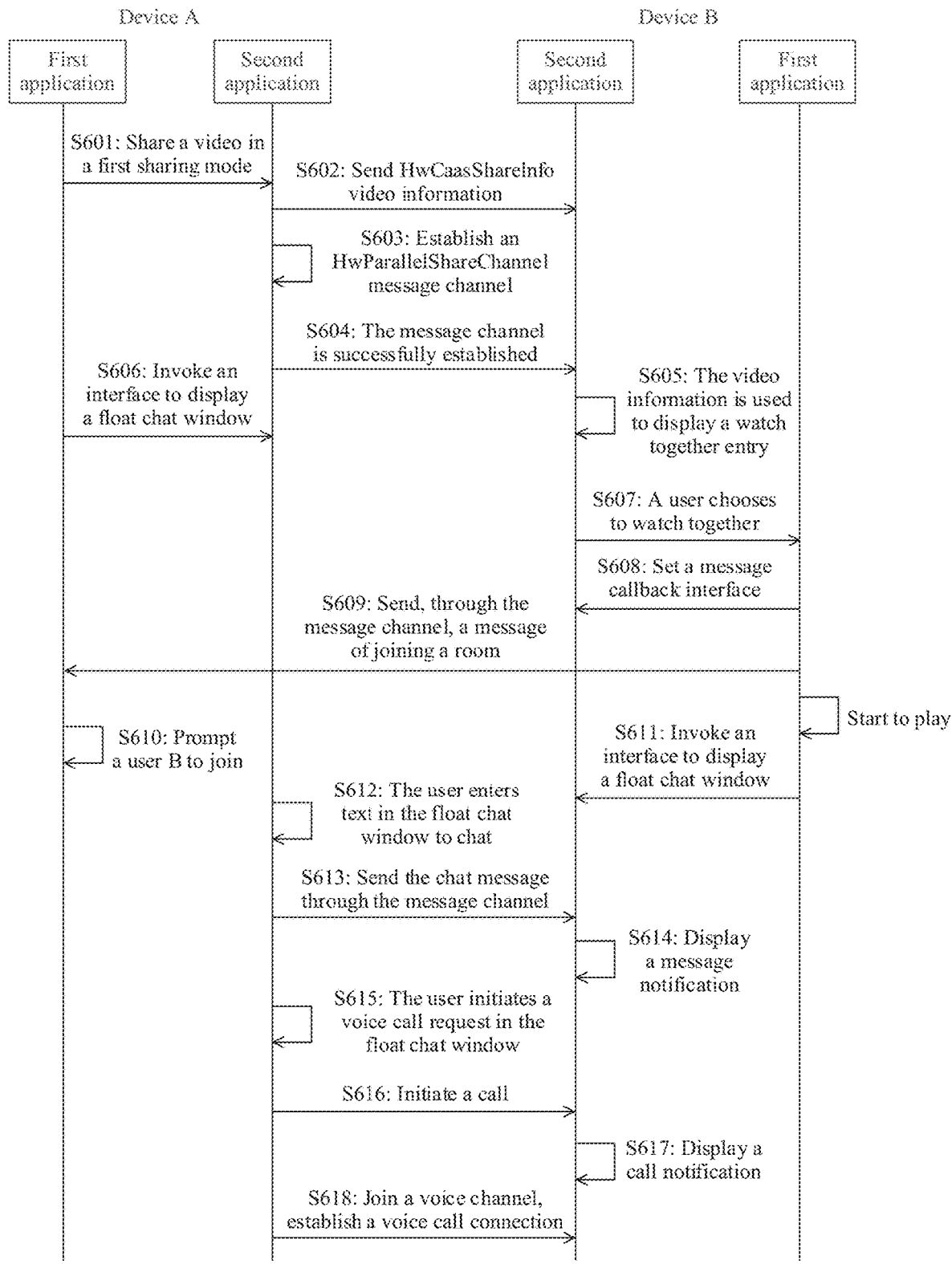
FIG. 6A and FIG. 6B are another operation sequence diagram of video sharing according to an embodiment of the present disclosure.

In some embodiments, two sharing parties chat in a video playing process, a chat user interface is provided by MeeTime, and real-time voice chat may be performed. For example, FIG. 6A and FIG. 6B are a specific operation sequence diagram of voice chatting. For the device A and the device B, refer to the system architecture shown in FIG. 2D. A first application shown in FIG. 6A may be a video application, and a second application may be an instant messaging application such as MeeTime. Steps S601 to S605 in which the device A shares a video with the device B through MeeTime are the same as steps S501 to S505 in FIG. 5A, and steps S607 to S610 are the same as steps S506 to S509 in FIG. 5A and FIG. 5B. Therefore, steps in FIG. 6A and FIG. 6B that are the same as those in FIG. 5A and FIG. 5B are not described herein again.

S606: The video application of the device A invokes an API interface provided by MeeTime, and sets to display a float chat window. A process of setting to display the float chat window is as follows:

public void showChatUI(true) { }.

S611: The device B receives the shared video, and after the user taps the watch together entry to start the video application, the video application invokes an API interface provided by the second application, and sets to display a float chat window. A specific process of setting to display the float chat window is the same as that in step 606.

S612: A Float MessageUI module of the second application provides a float chat interface, and a user enters a chat message on the interface and sends the chat message.

S613: The chat message input by using the device A is sent to the device B by using a basic message component of the second application.

S614: A float chat interface of the device B displays a new message notification, and the user may view, reply to, and the like on the floating chat interface provided by Float MessageUI.

S615: The user enables a voice call in the Float MessageUI module of the device A, and initiates a voice call request. After the request is initiated, CallUI, namely, a call UI can be displayed. The Float MessageUI module can also be directly refreshed to display a call status.

S616: The voice call request is sent to the device B by using a basic audio and video call component of the device A.

S617: The device B displays a call/incoming call notification.

S618: After the user answers the request at a device B end, the audio and video call component establishes a voice channel, and both parties enter a same voice channel, to establish a voice call connection and perform a real-time call. The user can hang up the call through CallUI.

In a possible implementation, a function of making a voice call when watching a video together may be initiated on a float chat interface, or may be directly initiated when sharing a video. To be specific, when a parallel sharing API is invoked, whether to start a voice call is specified in ShareInfo. If a voice call is started, both a voice call and a float UI are started, and a flag is sent to the peer party. After the peer party parses the flag, a float incoming call UI is synchronously displayed.

In the foregoing embodiment of video sharing, providing the API interface by the second application supports all first applications in constructing instant messaging capabilities thereof through the message channel. Through the instant message channel, the first application allows the user to send chat information, to implement an instant chat function of the first application. The first application may also send service information of the first application through the message channel such as video progress information to watch a video synchronously. The service information is encapsulated according to a specific format and then sent through the message channel, and is received by the first application of the receiving party and parsed into the service information. In addition, the message channel supports a plurality of formats such as text, picture, music, video, web page, and application. Embodiments of this application resolve existing problems such as a mobile device side can only share a video connection by using a message, an instant messaging capability cannot be obtained after sharing, a friend cannot be invited to watch a video together, and a chat cannot be performed in a process of watching a video in full screen.

A process of content sharing in a related technology of this application is described by using an example in which a first application is a shopping application, a second application is MeeTime, and a commodity link is shared in the shopping application through MeeTime.

Figure 7A:
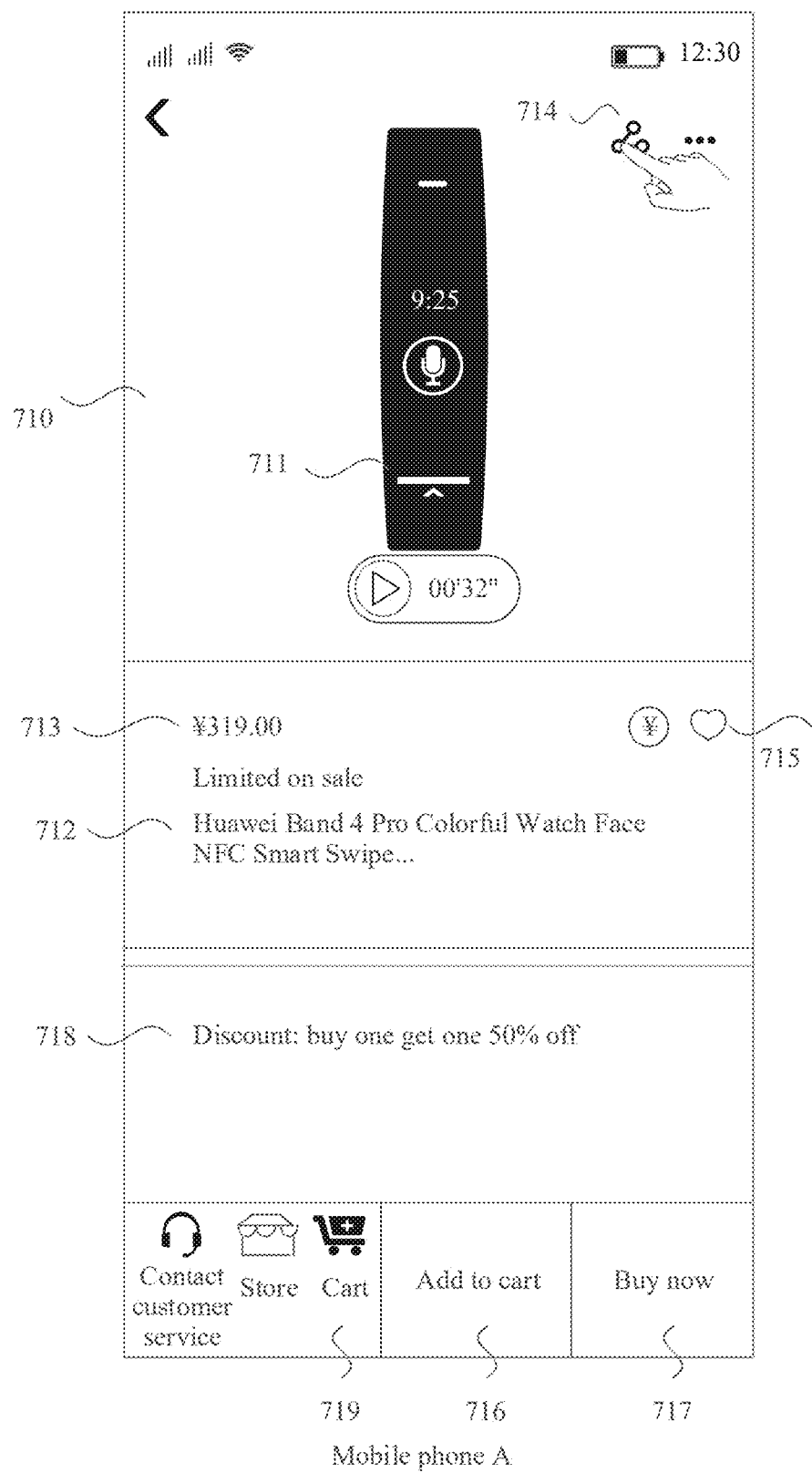
FIG. 7A to FIG. 7K are schematic diagrams of another group of interfaces according to an embodiment of the present disclosure.

FIG. 7A shows an example of a user interface 710 of a shopping application that is displayed by an electronic device such as a smartphone. The shopping application is one or more application programs that are on a mobile device such as a smartphone or a tablet computer and that provide a user with online commodity purchase, and may also be referred to as "shopping software", "online shopping application", or "mall application". A user can search for, browse, or purchase commodities provided in the shopping application. The shopping application may be a shopping application delivered with a device, for example, Huawei Vmall shown in FIG. 7A, or may be a shopping application that is released by a third party and that needs to be downloaded and installed by a user, for example, Jingdong, Taobao, Tmall, or YHD.

As shown in FIG. 7A, the user interface 710 of the video application includes a commodity picture 711 that is being browsed by using the device A, a commodity name 712, a commodity price 713, a share button 714, a favorites button 715, an add-to-cart button 716, a buy now button 717, a commodity discount 718, and a shopping cart button 719. There may be one or more commodity pictures 711. Alternatively, the commodity picture 711 may include a commodity introduction video. The commodity name 712 is used to display a commodity brand, a category, a function, and the like, for example, "Huawei Band 4 Pro Colorful Watch Face NFC Smart Swipe . . . ". The commodity price 713 may be used to identify a selling price of the commodity. The share button 714 may be used to trigger opening of a commodity sharing interface. The favorites button 715 is used to trigger a function of adding the commodity to personal favorites. The add-to-cart button 716 may be used to trigger adding the commodity to a shopping cart of a current user. The buy now button 717 may be used to trigger an operation of buying the commodity immediately. The commodity discount 718 may be used to display a current or subsequent discount activity of the commodity, for example, "Get second piece at half price". The shopping cart button 719 may be used to trigger entering of a shopping cart interface of the user.

The device A may receive an input operation (for example, a tap) performed by the user on the share button 714 in FIG. 7A. In response to the input operation, the device A may display a commodity sharing interface 720 shown in FIG. 7B.

Figure 7B:

As shown in FIG. 7B, the commodity sharing interface 720 includes a share card 721, a Sina Weibo button 722, a WeChat button 723, a Moments button 724, a MeeTime button 725, a copy link button 726, a more button 727, and a cancel button 728. The share card 721 is used to display a plurality of buttons that can be shared and a cancel button. The Sina Weibo button 722 may be used to trigger opening of a Sina Weibo sharing interface. The WeChat button 723 may be used to trigger opening of a WeChat sharing interface. The Moments button 724 may be used to trigger a WeChat Moments posting interface. The MeeTime button 725 may be used to trigger opening of a sharing interface of MeeTime, Meetime is the foregoing second application. The copy link button 726 may be used to copy a video link to a clipboard. The more button 727 may be used to trigger enabling of more functions related to sharing. The cancel button 728 may be used to cancel this sharing.

The device A may receive an input operation (for example, a tap) performed by the user on the MeeTime button 725 in FIG. 7B. In response to the input operation, the device A may display a MeeTime sharing interface 730 shown in FIG. 7C.

Figure 7C:
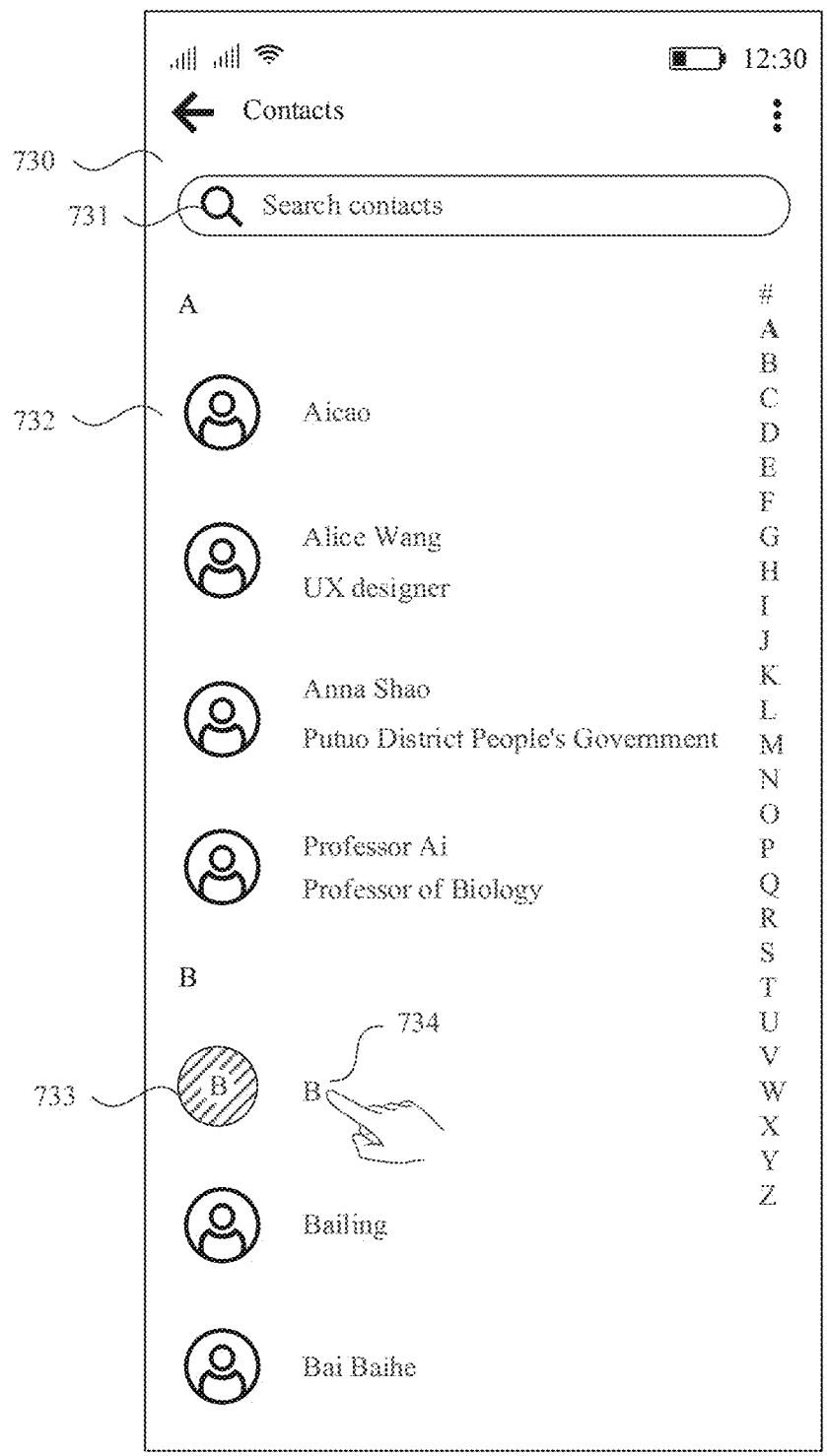

As shown in FIG. 7C, the MeeTime sharing interface 730 includes a search button 731 and a contacts list 732. The search button 331 may be used to quickly search for a contact in MeeTime. The contacts list 732 includes contacts in MeeTime of the device A, and each contact includes a contact profile picture and a nickname, for example, a profile picture button 733 of a user B and a nickname button 734 of the user B.

The device A may receive an input operation (for example, a tap) performed by the user on the profile picture button 733 or the nickname button 734 of the user B in FIG. 7C. In response to the input operation, the user B receives a commodity link shared by a user A. The user B starts MeeTime on the device B, and selects the user A. A MeeTime chat interface 740 shown in FIG. 7D may be displayed.

Figure 7D:
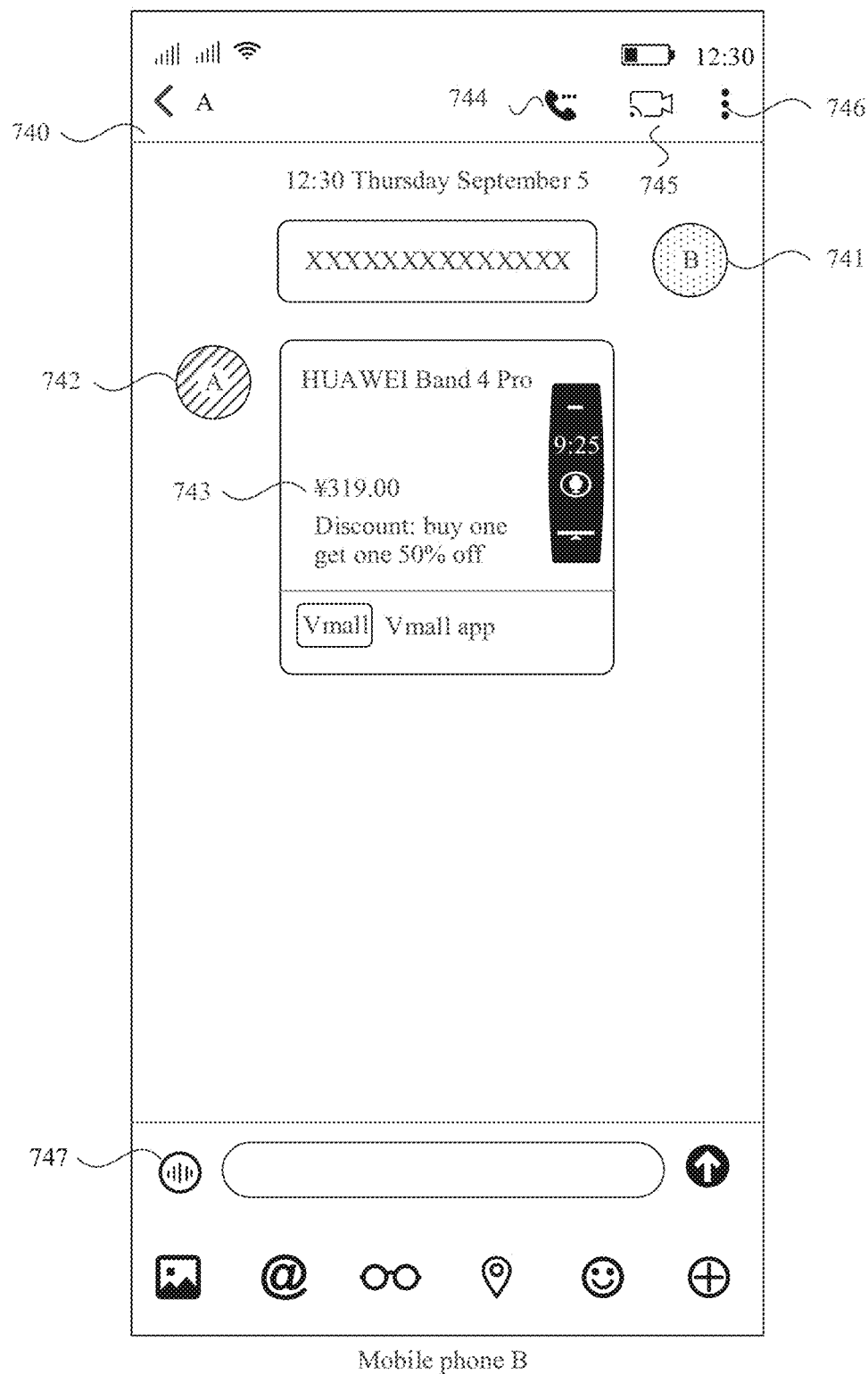

As shown in FIG. 7D, the MeeTime chat interface 740 includes a profile picture button 741 of the user B, a profile picture button 742 of the user A, a commodity link card 743, a call button 744, a MeeTime button 745, a more button 746, and a voice input button 747. The profile picture button 741 of the user B and the profile picture button 742 of the user A may be used to trigger opening of user information. The commodity link card 743 may be used to trigger opening of a shared commodity link. The call button 744 may be used to trigger opening of a call interface with the user A. The MeeTime button 745 may be used to trigger enabling of a voice chat function or a video chat function provided by MeeTime. The more button 746 may be used to trigger enabling of more functions related to MeeTime. The voice input button 747 may be used to trigger enabling of inputting a voice message.

Optionally, after creating a background message channel between the shopping application and a second application, the device A sends a channel establishment message to a second application of the device B by using a basic message component. The second application of the device B receives the channel establishment message, and a MessageUI module refreshes a message card to display a parallel sharing entry. For example, refer to a commodity link card 753 in FIG. 7E.

Figure 7E:
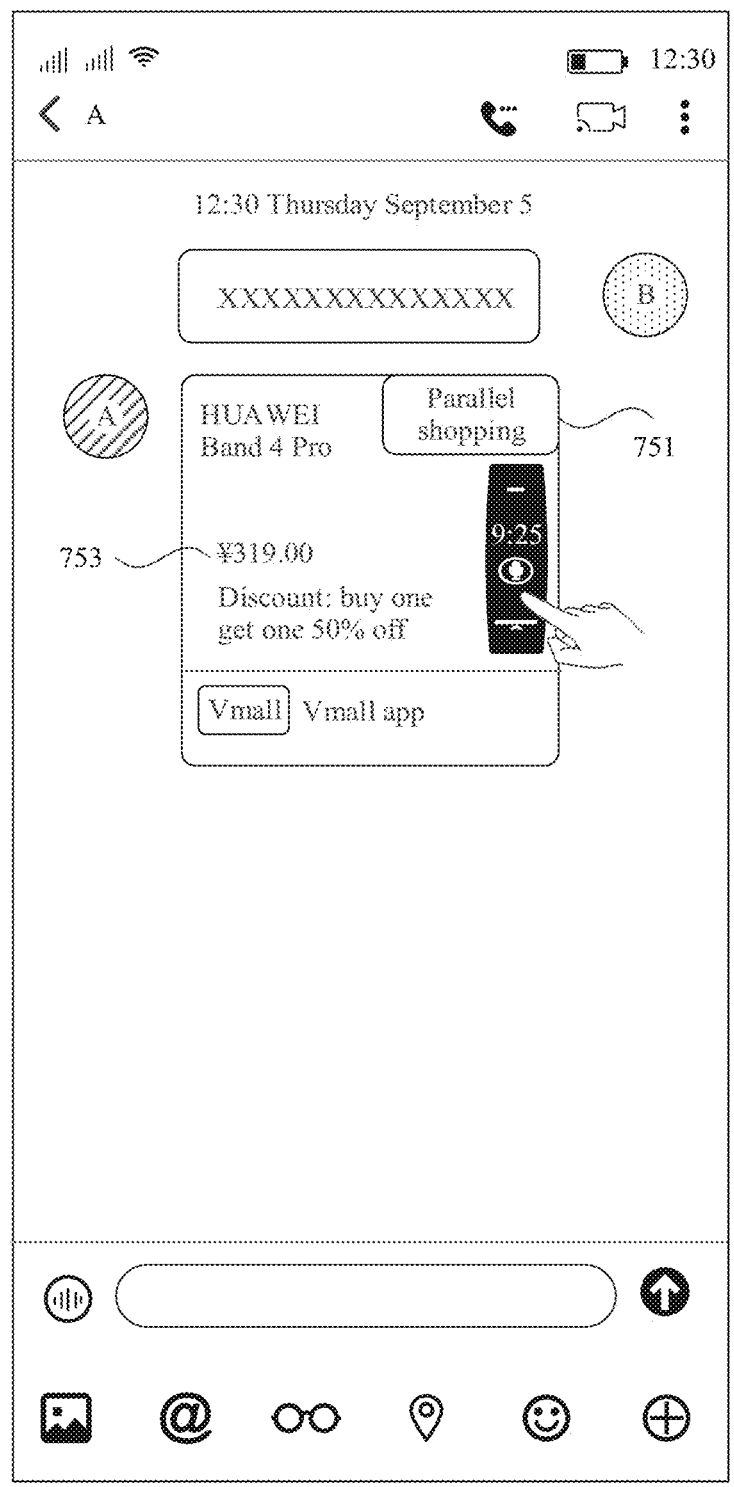

As shown in FIG. 7E, the commodity link card 753 may display an identity 751. The identity 751 is used to prompt the user to click the current commodity link card to join "parallel shopping". It may be understood that the identity 751 may be alternatively displayed near the commodity link card 753 in a form of a control. A specific display location and structure of the parallel sharing entry are not limited in this application.

The device B may receive an input operation (for example, a tap) performed by the user on the commodity link card 753 in FIG. 7E. In response to the input operation, MeeTime of the device B automatically starts the shopping application, and opens a commodity browsing interface 760 shown in FIG. 7F.

Figure 7F:
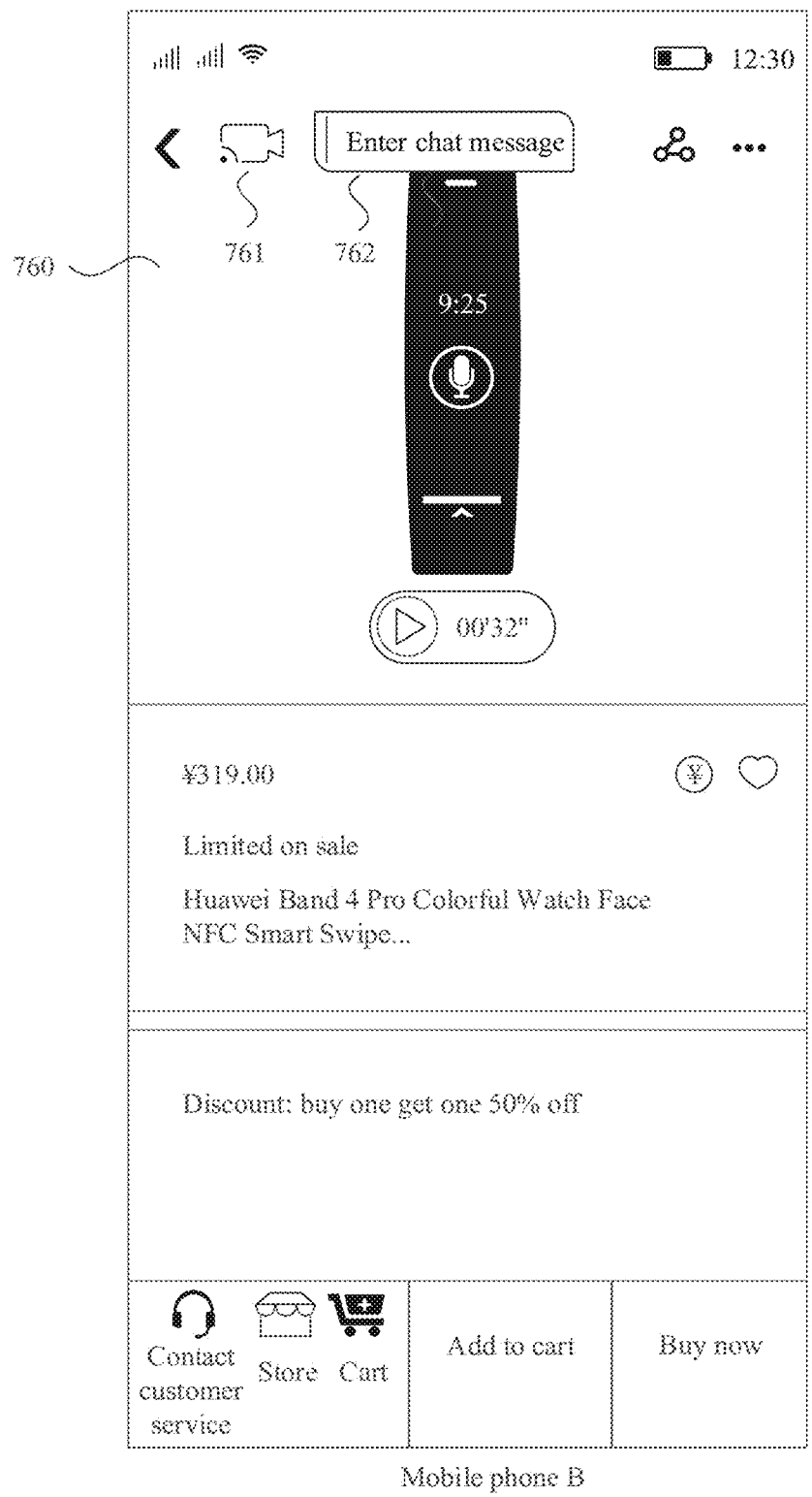

As shown in FIG. 7F, the commodity browsing interface 760 includes a MeeTime button 761, a message input box control 762, and commodity information similar to that in FIG. 7A. The MeeTime button 761 is used to trigger enabling of a voice chat function or a video chat function provided by MeeTime. The message input box control 762 may be used to trigger opening of a message input interface. For example, the user B taps or presses and holds the MeeTime button, and video call and voice call options appear. After the user selects the voice call option, the device A prompts that the user B "invites you to a voice call", and provides "Answer" and "Hang up" options. After the user A chooses "Answer", a voice call is set up between the device A and the device B.

After the device B opens the commodity browsing interface 760 shown in FIG. 7F, the device B sends, to the device A, a message indicating that the user B has entered a chat room. After receiving the message, the device A displays a message notification on an interface 710.

Figure 7G:

As shown in FIG. 7G, an interface 710 of the device A displays a message notification 771. For example, message content in the notification is "The user B has joined parallel shopping". In addition, the interface 710 also includes a MeeTime button and a message input box control. Functions of the MeeTime button and the message input box control are the same as functions of the button and the control shown in FIG. 7F, and details are not described herein again.

Optionally, the user A and the user B perform message input chatting by using the message input box control, or perform real-time voice chatting triggered by using the MeeTime button, and confirm to purchase the commodity. After the user A and the user B separately add the commodity shown in FIG. 7A to the shopping cart, a mobile phone A displays a shopping cart interface shown in FIG. 7H-1 to FIG. 7H-3.

Figure 7H:
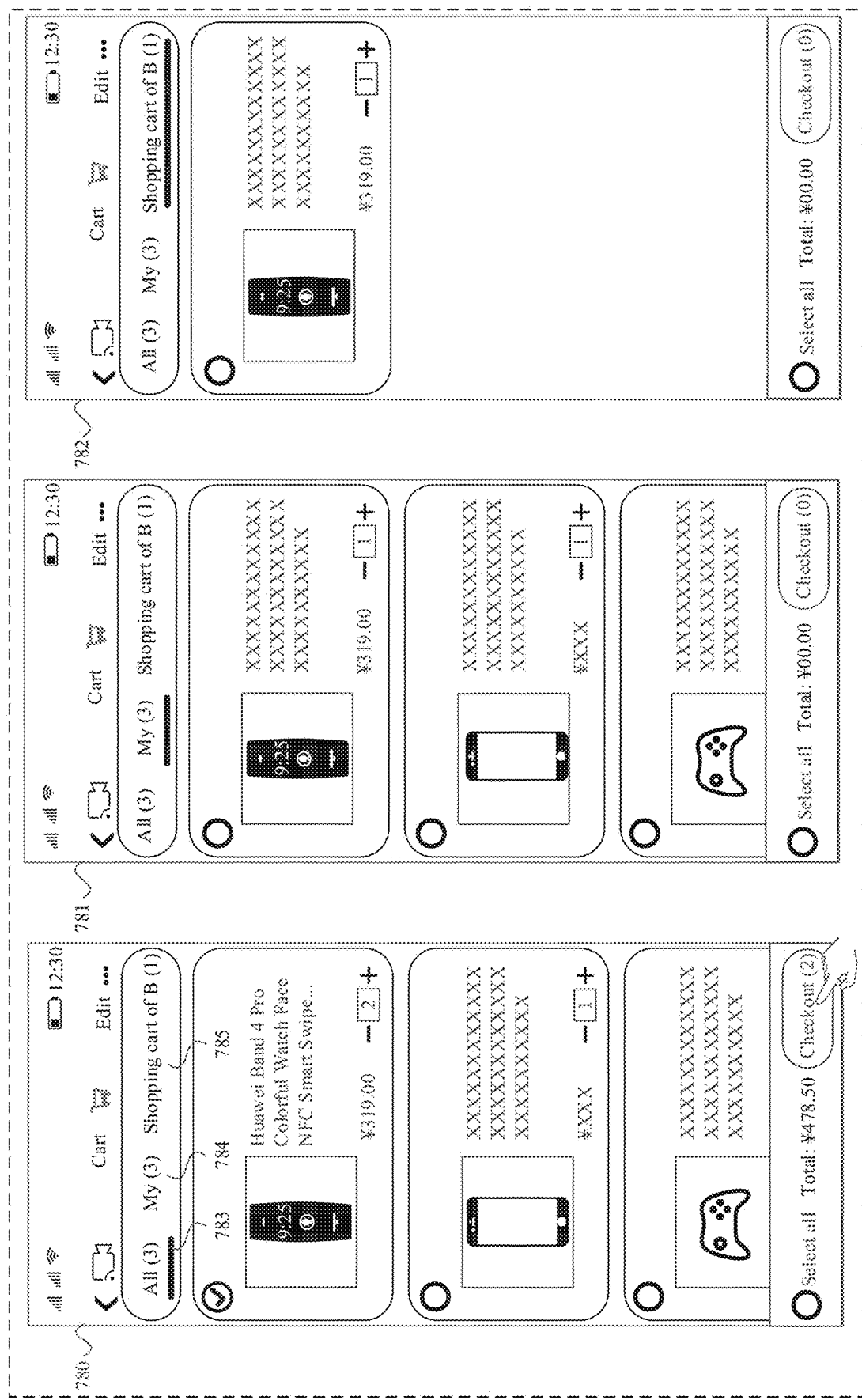

As shown in FIG. 7H-1 to FIG. 7H-3, shopping carts displayed by a shopping application in the mobile phone A include an "All shopping carts" interface 380, a "My shopping cart" interface 381, and a "Shopping cart of B" interface 382. The user clicks the "All", "My", or "Shopping cart of B" icon on the interface to switch a displayed shopping cart interface. The selected icon is underlined to identify the displayed shopping cart interface. For example, the "All shopping carts" interface 380 includes an "All" icon 383, a "My" icon 784, and a "Shopping cart of B" icon 785, and the "All" icon 383 is marked with an underline, to prompt the user that all offerings in the shopping cart of the user A and the user B are currently displayed. Correspondingly, the "My shopping cart" interface 381 currently displays commodities in the shopping cart of the user A, for example, one band, one mobile phone, and one game handle. The Shopping cart of B interface 382 displays commodities in the shopping cart of the user B, for example, a band.

Correspondingly, the shopping carts displayed by the shopping application of the mobile phone B include an "All shopping carts" interface, a "My shopping cart" interface, and a "Shopping cart of A" interface. "My shopping cart" contains commodities in the shopping cart of the user B, and the shopping cart of A contains commodities in the shopping cart of the user A, the "All shopping carts" interface is a sum of the commodities in the shopping cart of the user A and the commodities in the shopping cart of the user B.

For example, the user A selects two Huawei bands in the "All shopping carts" interface 780, and the "All shopping carts" interface 780 correspondingly refreshes a "total" amount at the bottom of the page. The user clicks a "Checkout" button. After the payment is successful, an order payment success page shown in FIG. 7J is displayed. As shown in FIG. 7K, a user interface of the device B displays a message notification "The user A has purchased commodities XXX for you". Optionally, after receiving the message notification, the shopping application in the device B may clear the band just added to the shopping cart, and display prompt information "Your shopping cart is empty".

Optionally, Vmall provides free shipping on orders over CNY 99. If the user A purchases a band for CNY 99, the free shipping can be provided. If the user B does not want to purchase the band shared by the user A but wants to purchase a game handle for CNY 39, the free shipping cannot be provided. Therefore, the user A and the user B perform message input chatting by using a message input box control, or perform real-time voice chatting triggered by using a MeeTime button. The user A selects a band and adds the band to a shopping cart, and the user B selects a game handle and adds the game handle to the shopping cart. The mobile phone A displays shopping cart interfaces shown in FIG. 7I-1 to FIG. 7I-3.

Figure 7I:
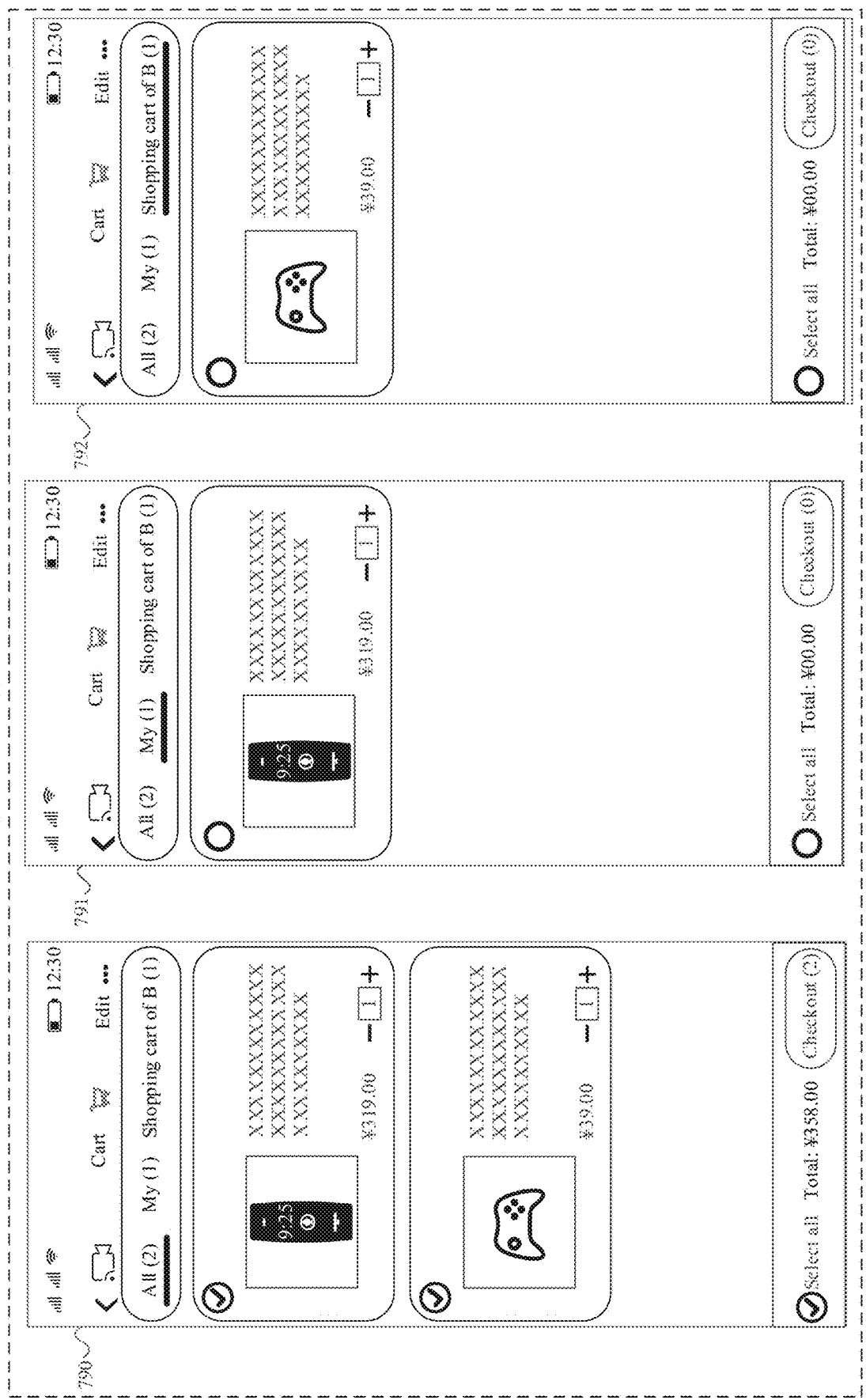
Figure 7J:
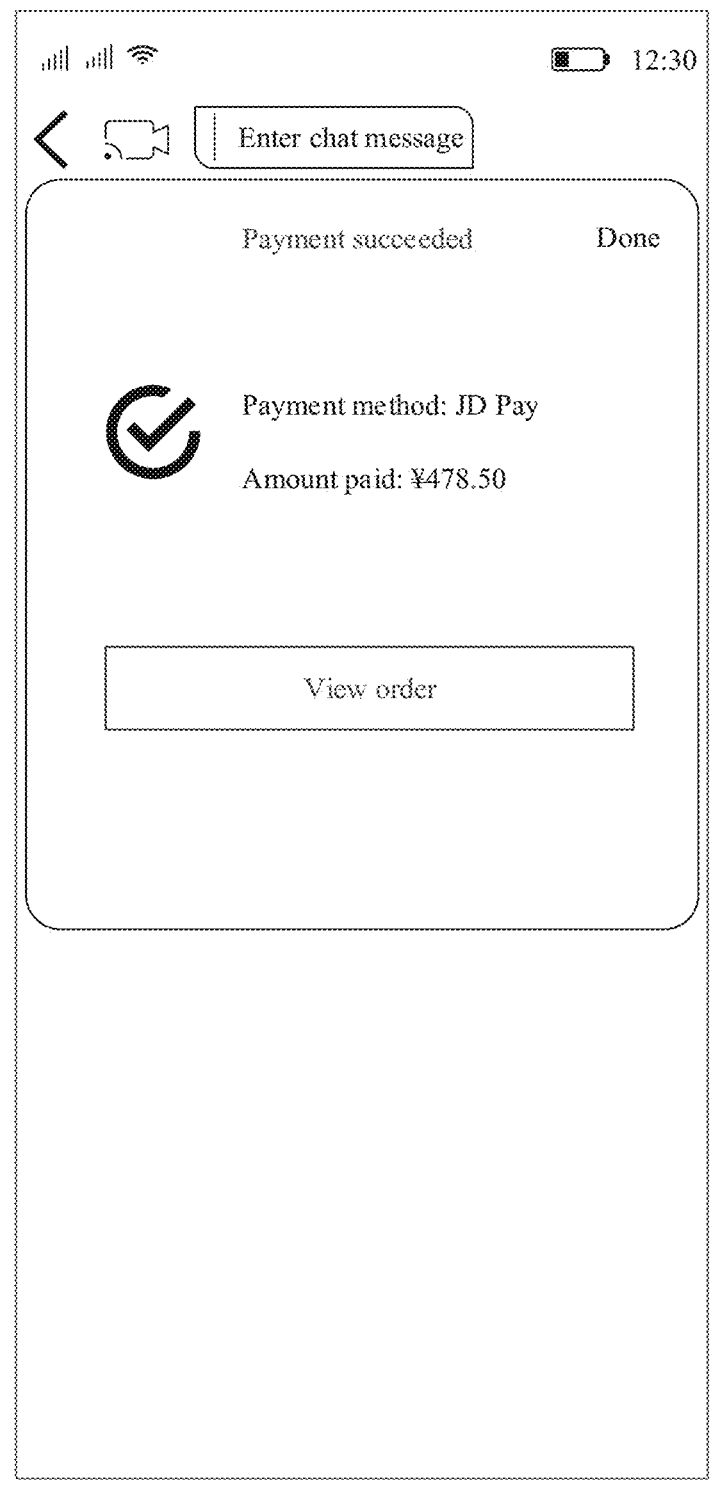
Figure 7K:
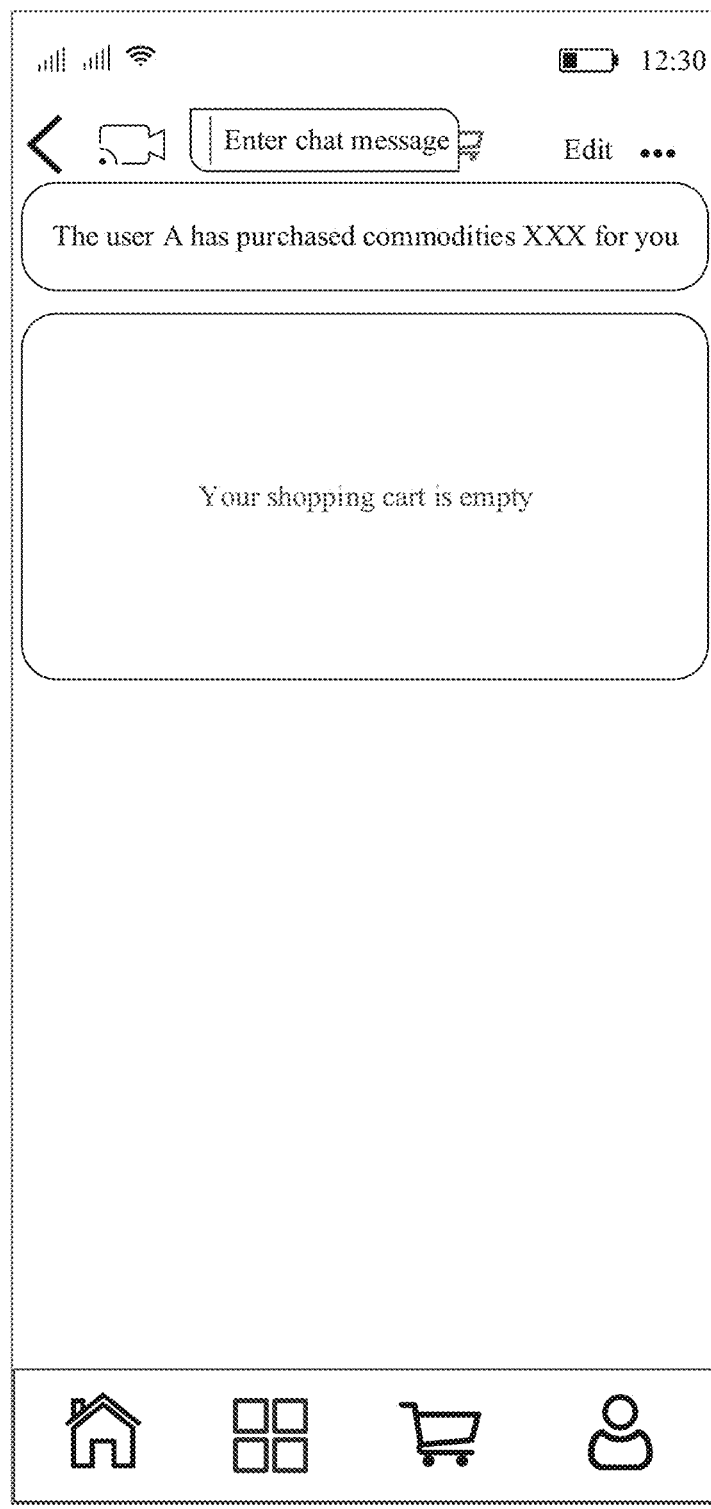

As shown in FIG. 7I-1 to FIG. 7I-3, shopping carts displayed by a shopping application in the mobile phone A include an "All shopping carts" interface 390, a "My shopping cart" interface 391, and a "Shopping cart of B" interface 392. The user clicks the "All", "My", or "Shopping cart of B" icon on the interface to switch a displayed shopping cart interface. The selected icon is underlined to identify the displayed shopping cart interface. The shopping cart interfaces 390 to 392 include the "All" icon, the "My" icon, and the "Shopping cart of B" icon. The "All shopping carts" interface 390 displays all commodities in the shopping carts of the user A and the user B, for example, one band and one game handle. Correspondingly, the "My shopping cart" 391 currently displays commodities in the shopping cart of the user A, for example, one band. The "Shopping cart of B" interface 392 displays commodities in the shopping cart of the user B, for example, one game handle. According to a result negotiated by the user A and the user B, the user A selects a band and a game handle in the shopping cart interface 790, and the shopping cart interface correspondingly refreshes a "total" amount at the bottom of the page, and the user A performs checkout.

In some embodiments, after the user B taps the commodity link card 753 to open the commodity browsing interface in the shopping application, the user B may continue to browse a second commodity, and share a second commodity link with the user A.

Figure 8A:
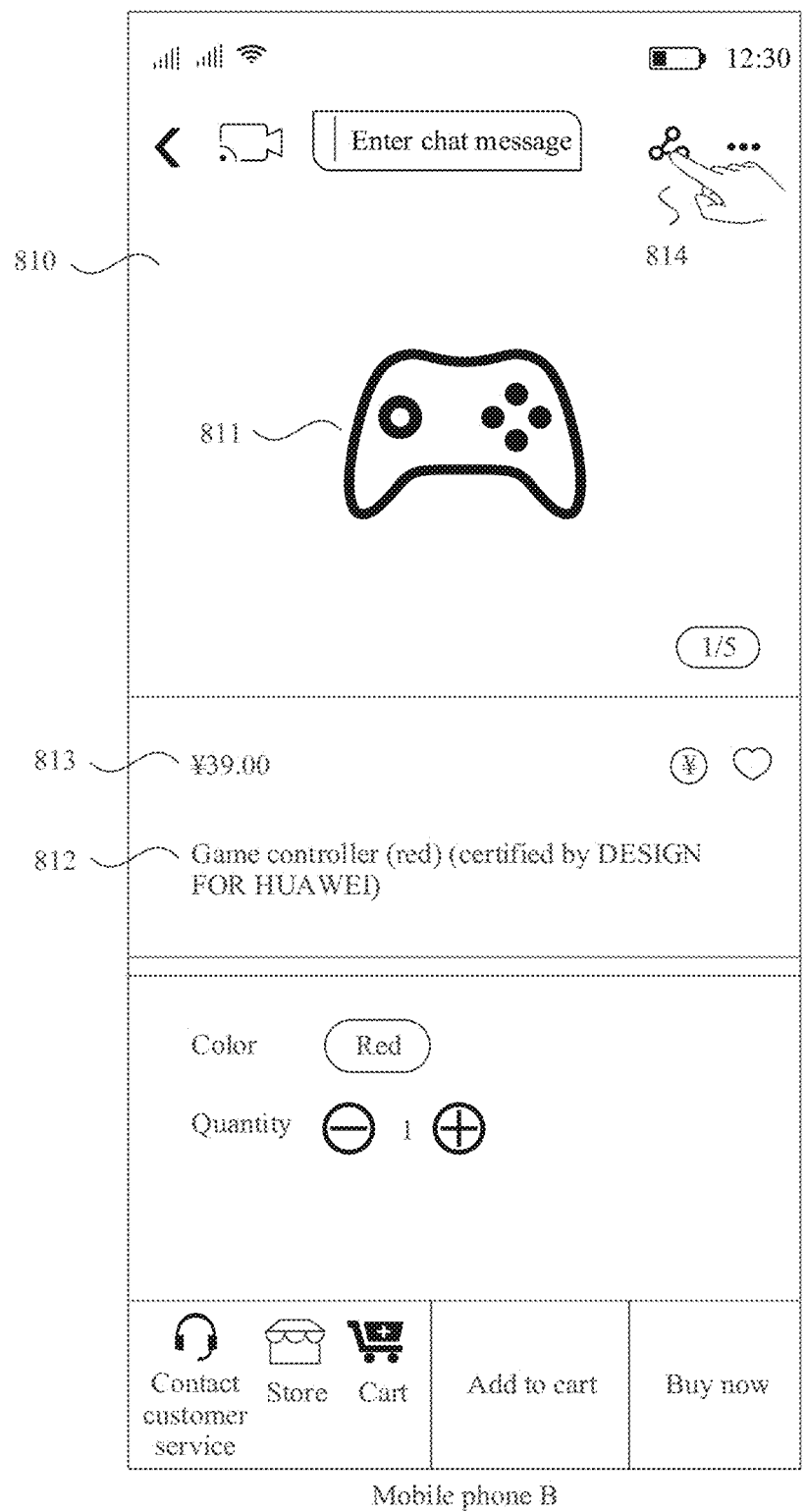
FIG. 8A to FIG. 8D are schematic diagrams of another group of interfaces according to an embodiment of this application.

For example, the device B may receive an input operation (for example, a tap) performed by the user on the commodity link card 753 in FIG. 7E. In response to the input operation, MeeTime of the device B automatically starts the shopping application, and opens a commodity browsing interface 760 shown in FIG. 7F. The user B may continue to browse another commodity, and open a commodity browsing interface 810 shown in FIG. 8A. The commodity browsing interface 810 includes a commodity picture 811, a commodity name 812, a commodity price 813, a share button 814, and the like that are being browsed by the user. There may be one or more commodity pictures 811. Alternatively, the commodity picture 811 may include a commodity introduction video. The commodity name 812 is used to display a commodity brand, a category, a function, and the like, for example, "game controller (red) (certified by DESIGN FOR HUAWEI)". The commodity price 813 may be used to identify a selling price of the commodity, for example, CNY 39 yuan. The share button 814 may be used to trigger opening of a commodity sharing interface 820 in FIG. 8B.

Figure 8B:

As shown in FIG. 8B, the commodity sharing interface includes a share card 821, a Sina Weibo button, a WeChat button, a Moments button, a MeeTime button, a copy link button 822, a more button, and a cancel button. The share card 821 is used to display a plurality of buttons that can be shared and a cancel button. The copy link button 822 may be used to copy a video link to a clipboard. Functions of other buttons are the same as those of the buttons shown in FIG. 7B, and details are not described herein again. The user B clicks the copy link button 822, chooses to paste the click into a message input box control 823, and sends the commodity link to the user A.

Figure 8C:
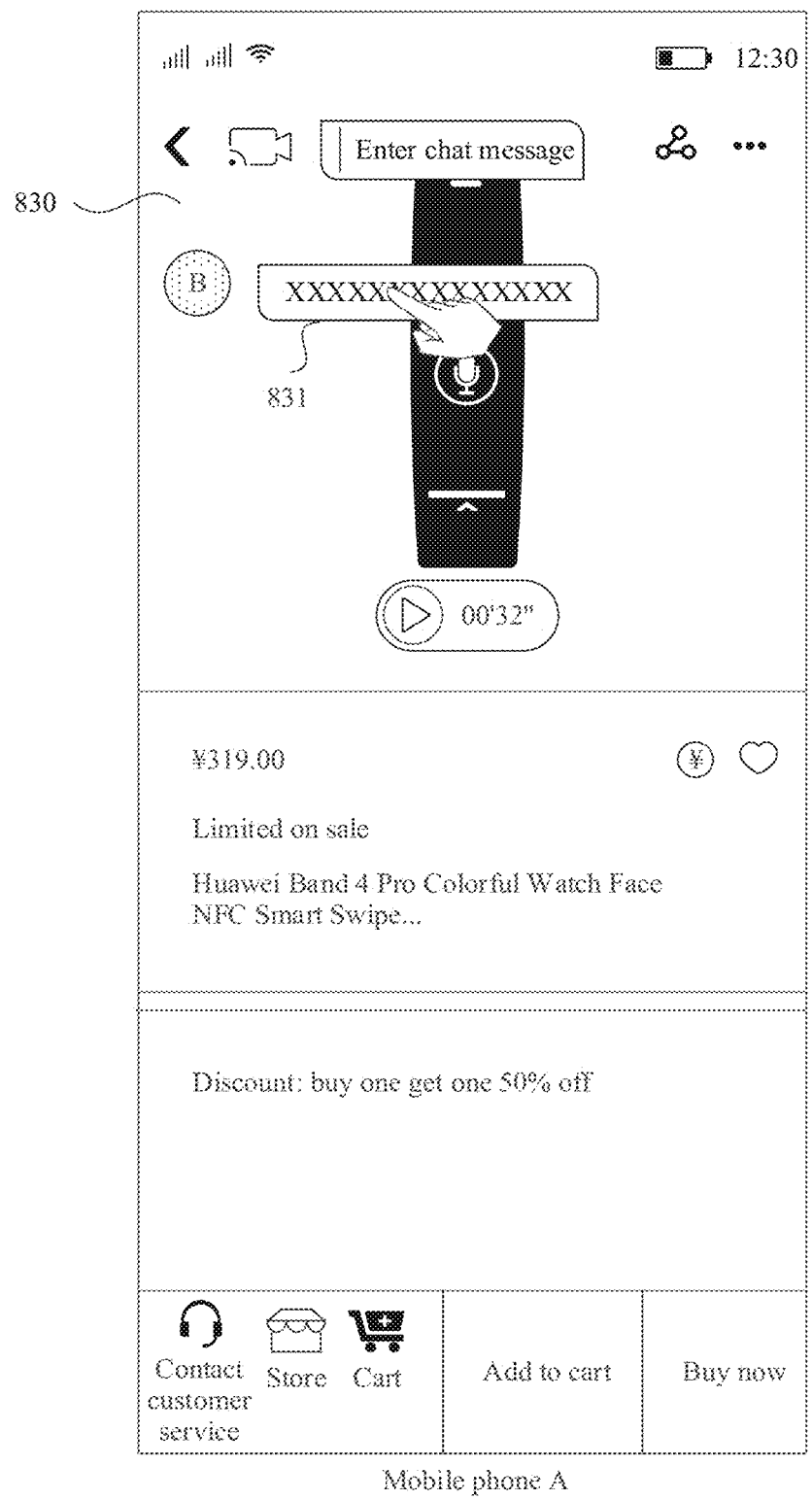
Figure 8D:
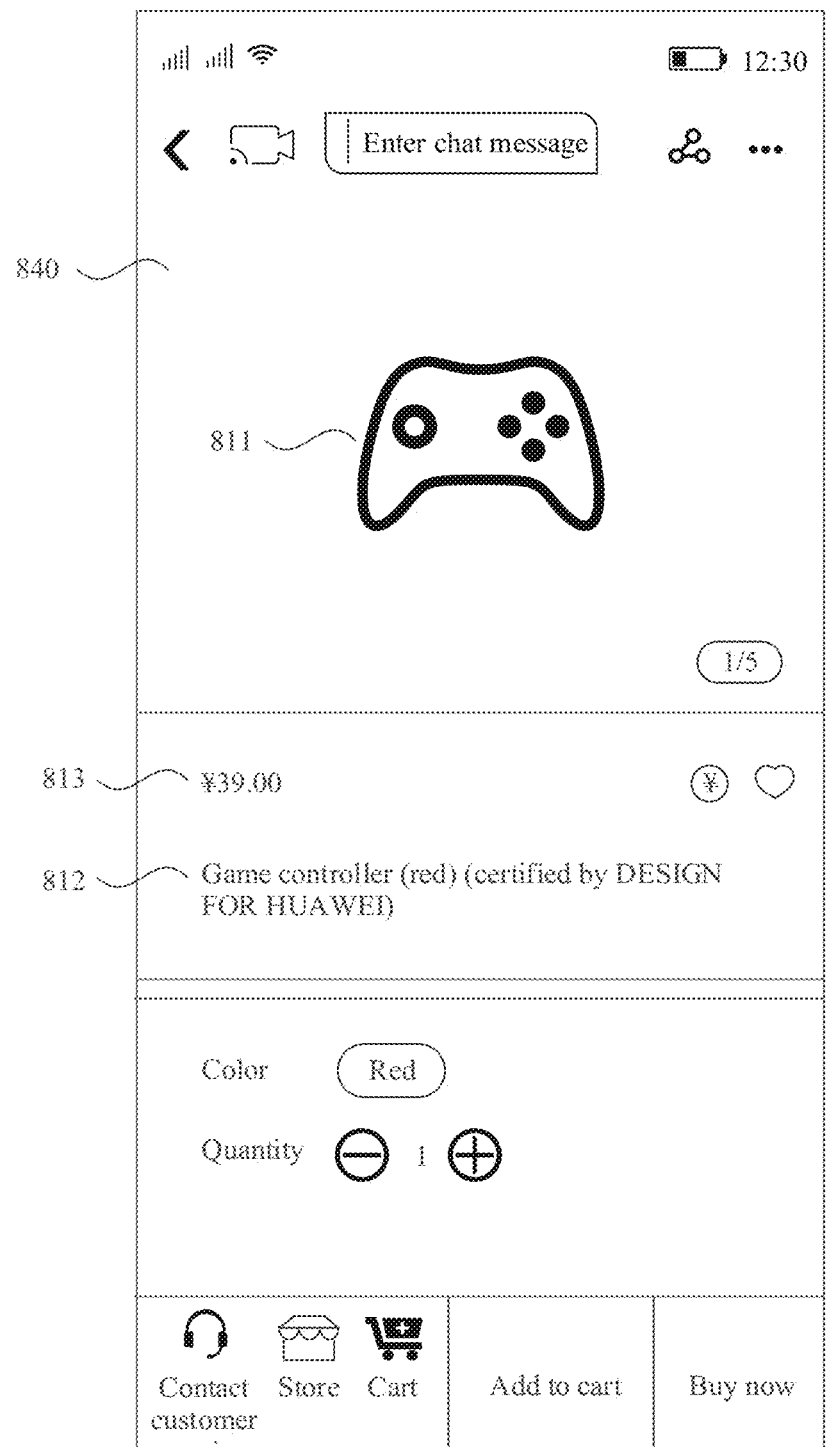

As shown in FIG. 8C, after receiving the second commodity link, the user A displays the profile picture or nickname of the user B and the second commodity link 831 sent by the user B on a browsing interface 830 of a first commodity. The user clicks the second commodity link 831, to enter a second commodity browsing interface 840 shown in FIG. 8D. The interface presents a commodity picture 811, a commodity name 812, a commodity price 813, and the like that are the same as those shown in FIG. 8A.

The following describes a specific operation sequence diagram with reference to an application scenario of commodity sharing.

Figure 9:
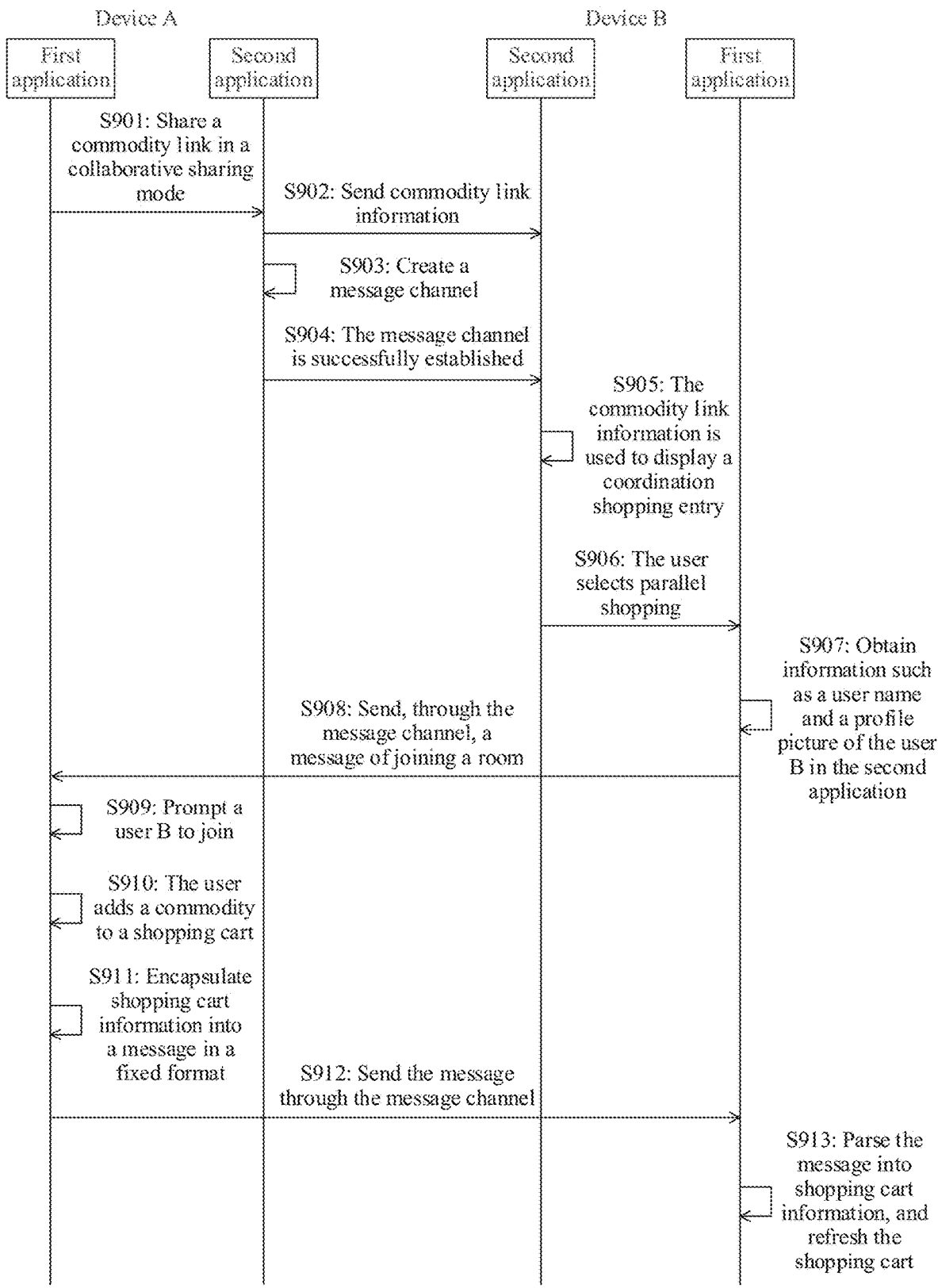
FIG. 9A and FIG. 9B are an operation sequence diagram of commodity sharing according to an embodiment of the present disclosure.

Refer to FIG. 9A and FIG. 9B. FIG. 9A and FIG. 9B show an operation sequence diagram of commodity sharing. Devices involved in the method flowchart include a device A and a device B interacting with the device A. The device A interacts with the device B through the communications network shown in FIG. 1. For example, for the device A and the device B, refer to the software system architectures shown in FIG. 2C and FIG. 2D.

As shown in FIG. 9A and FIG. 9B, the method includes the following steps.

S901: Share a commodity link in a parallel sharing mode.

For example, to-be-shared content is a commodity object in a shopping application. The device A may receive an input operation (for example, tapping a share button) of sharing the content by a user. In response to the input operation, the device A displays a content sharing interface. For the content sharing interface, refer to the commodity sharing interface 720 shown in FIG. 7B. The content sharing interface may display an icon and a name of a second application. For example, as shown in FIG. 7B, the second application icon is displayed as a MeeTime button 725, and the name of the second application may be MeeTime.

In a possible implementation, alternatively, the user may tap a copy link button 726 in the commodity sharing interface 720 shown in FIG. 7B to copy the commodity link to a clipboard, open MeeTime, select the user B, paste the commodity link, and send the commodity link to the user A.

The shopping application program invokes a parallel sharing API by using an integrated open SDK. By invoking the parallel sharing API, the shopping application sends filled targetScene (targetScene), HwCaasShareInfo (HwCaasShareInfo), and HwParallelShareChannel (HwParallelShareChannel) to the second application.

S902: Send commodity link information.

After receiving message content shared by the shopping application by invoking a sharing API, a Message Service component of the second application in the device A parses the message content, and determines, based on the mParallelShare field, whether the parallel sharing mode is used. In addition, other message content in HwCaasShareInfo (HwCaasShareInfo) is encapsulated into a card, and the card is displayed in a chat window of a MessageUI module. The second application sends the message to the device B by using a basic message component. After receiving the foregoing message, the device B may display a card in a second application, for example, a commodity link card 743 shown in FIG. 7D.

S903: Create a message channel.

If the second application in the device A determines that the parallel sharing mode is used, the second application in the device A creates a cross-process message channel between the second application and the shopping application in the device A.

S904: The message channel is successfully established.

After establishment of the cross-process message channel between the second application and the first application in the device A is completed, the second application sends a channel establishment message to the second application in the device B by using the basic message component.

S905: The commodity link information displays a coordination shopping entry.

The second application of the device B receives the channel establishment message, and a MessageUI module refreshes the message card to display a parallel sharing entry, for example, the collaborative shopping control 751 shown in FIG. 7E.

S906: The user selects collaborative shopping.

For example, the user taps the collaborative shopping entry, and the MessageUI module of the device B automatically opens a corresponding shopping application by using mAppUrl information.

S907: Obtain information such as a user name and a profile picture of the user B in the second application.

For example, after the shopping application is started, mParallelShare and mExtraInfo are obtained through parsing.

First, whether a sharing mode is a parallel sharing mode is determined. If the sharing mode is a parallel sharing mode, an object HwParallelShareChannel is set to a second application through an API of an open SDK. The second application establishes a message channel between the second application and a shopping application by using the HwParallelShareChannel object, and records a correspondence between the message channel and a chat window threadID.

Second, information in mExtraInfo is parsed, where the information is filled by the shopping application of the device A and parsed by the shopping application of the device B, and format content of the information is defined by the shopping application.

S908: Send, through the message channel, a message of joining a room.

The device B sends, by using a sendAppMessage method of a HwParallelShareChannel (HwParallelShareChannel) object, the message of joining a room. A message content mMessageInfo format is defined by the shopping application, and may be defined as the following format for reference: JoinRoom: 1. The message is sent to the Message Service component of the second application. The message service component determines that the message is Appmessage (AppMessage), and forwards the message to the device A by using a basic message component. After receiving the message, the second application of the device A determines that the message is AppMessage, and forwards the message to the corresponding shopping application by using onAppMessageReceive of HwParallelShareChannel (HwParallelShareChannel).

S909: Prompt a user B to join.

After receiving the message, the shopping application of the device A parses mMessageInfo as a joining room message, refreshes a commodity browsing page, and reminds a user xx to join in collaborative shopping, for example, the message notification 771 shown in FIG. 7G.

S910: The user adds a commodity to a shopping cart.

S911: Encapsulate shopping cart information into a message in a fixed format.

S912: Send the message through the message channel.

After receiving the message, the second application of the device A determines that the message is AppMessage, and forwards the message to the device B by using the basic message component. After receiving the message, the second application of the device B determines that the message is AppMessage, and forwards the message to the corresponding shopping application by using the onAppMessageReceive method of the HwParallelShareChannel object.

S913: Parse the message into shopping cart information, and refresh the shopping cart.

After receiving the message, the shopping application of the device B parses the AppMessage and refreshes the shopping cart.

In the foregoing embodiment of shopping sharing, providing the API interface by the second application supports all shopping applications in constructing instant messaging capabilities thereof through the message channel. Through an instant message channel, the shopping application allows the user to send chat information, to implement an instant chat function of the shopping application. The shopping application may also send service information of the shopping application such as shopping cart information through the message channel. The service information is encapsulated in a certain format and then sent through the message channel, and is received by a shopping application of a receiving party and parsed into the service information. In this way, after the sharing shopping offering connection is implemented, commodities that have been added to the shopping cart by a friend can be sent and received through a background message channel, and the same shopping cart can be shared, implementing the scenario of shopping together and order sharing.

A process of content sharing in a related technology of this application is described by using an example in which a first application is a map application, a second application is MeeTime, and navigation information is shared in the map application through MeeTime.

Users A, B, and C form a team to travel to a destination "Badaling Great Wall". The user A shares navigation information provided by the map application in a group of MeeTime on a mobile phone A.

Figure 10A:
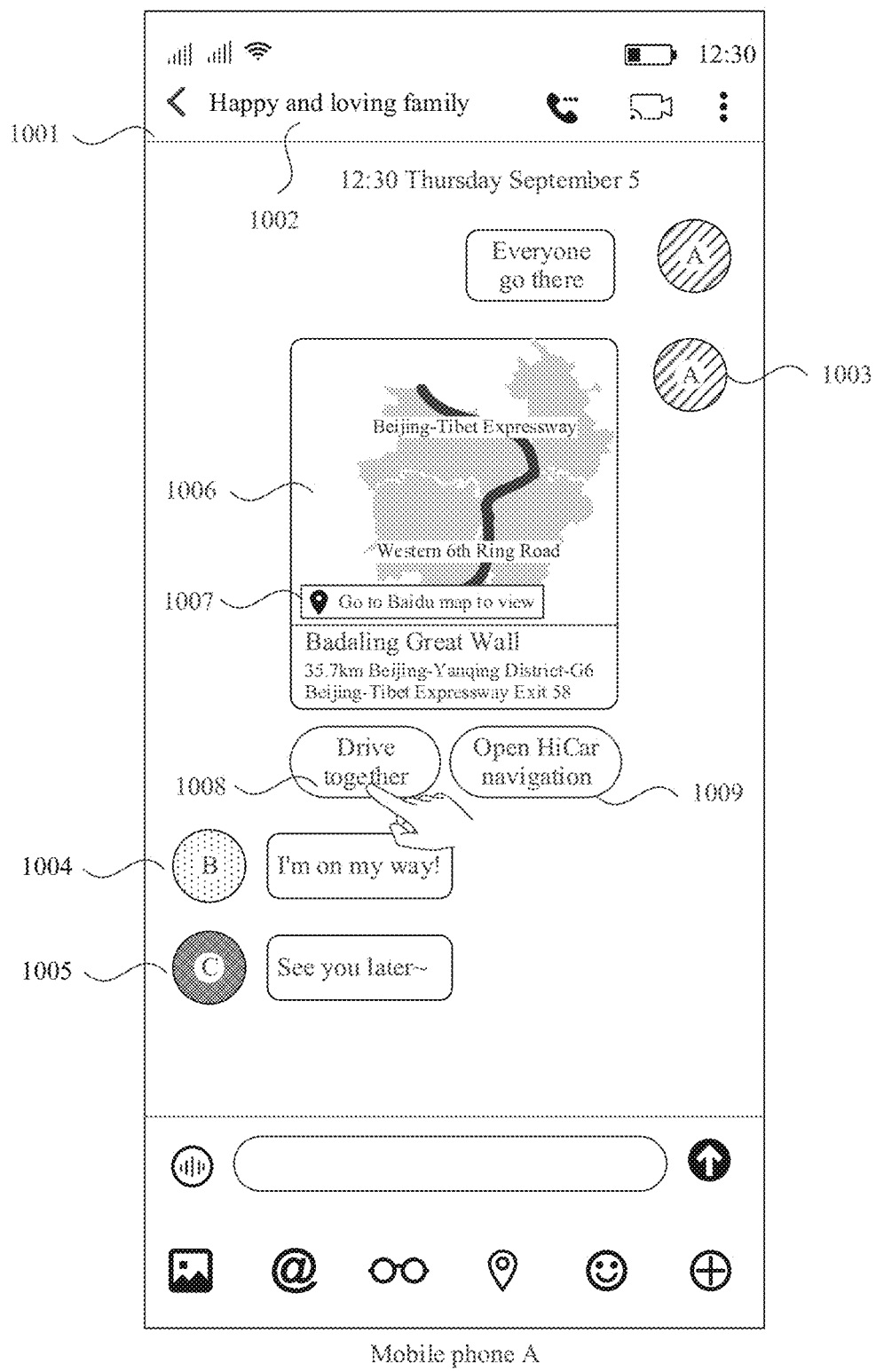
FIG. 10A to FIG. 10G are schematic diagrams of another group of interfaces according to an embodiment of the present disclosure.

For example, FIG. 10A shows a group chat interface 1001 of MeeTime displayed on the mobile phone A. Users can share texts, images, and stickers with friends through MeeTime. In addition, MeeTime supports services such as group chatting, voice, videoconferencing, (one-to-many) message broadcasting, photo/video sharing, location sharing, message exchange, and games.

The group chat interface 1001 of MeeTime includes a group name 1002, a profile picture button 1003 of the user A, a profile picture button 1004 of the user B, a profile picture button 1005 of the user C, a navigation information card 1006, a call button, a MeeTime button, a more button, a voice input button, a map application link 1007, and a collaborative navigation entry 1008. Optionally, the interface 1001 may further include a HiCar navigation portal 1009. The group name 1002 may be used to identify a name of a group, for example, "Happy and loving family" shown in FIG. 10A. The profile picture button 1003 of the user A, the profile picture button 1004 of the user B, and the profile picture button 1005 of the user C may be used to trigger opening of user information and identify a source of chat information. The navigation information card 1006 may be configured to display navigation information shared by the user in the group, where the navigation information includes a navigation destination, a navigation road map, navigation software, and the like. The map application link 1007 may be used to trigger starting of the map application, so that the user can view detailed navigation information. The collaborative navigation entry 1008 may be used by a user in the group to select a collaborative navigation mode, for example, a "Drive together" icon shown in FIG. 10A. HiCar navigation is a map application developed by Huawei for in-vehicle navigation. The HiCar navigation portal 1009 may be used to trigger displaying of a navigation interface on the vehicle-mounted display.

Optionally, the user A taps the map application link 1007 of the mobile phone A, and receives an input operation (for example, a tap) performed by the user on the map application link 1007 in FIG. 10A. In response to the input operation, the mobile phone A may display a map navigation interface 1010 shown in FIG. 10B.

The map navigation interface 1010 includes a start speed 1011, an end point 1012, a navigation route map 1013, a scenic spot introduction button 1014, an exit button 1015, navigation mileage time information 1016, an exit overview button 1017, and a more button 1018. The start speed 1011 may be used to indicate that a speed at a start location is 0 km/h, and the user is ready to drive the vehicle to leave. The end point 1012 may be used to display a navigation destination, for example, as shown in FIG. 10A, which may be identified by "End". The navigation route map 1013 may be used to indicate a complete route from the start location to the destination, and is displayed on a map proportionally according to a scale. The scenic spot introduction button 1014 may be used to trigger watching of a video whose introduction destination is a scenic spot. The exit button 1015 may be used to trigger closing of this navigation. The navigation mileage time information 1016 may be used to display a remaining mileage, an estimated travel time, a time of arrival at a destination, and the like in this navigation. The exit overview button 1017 may be used to switch a map display mode, to switch from a currently displayed complete navigation route map to another map display mode. The more button 1018 may be used to trigger enabling of more functions related to navigation.

Figure 10B:
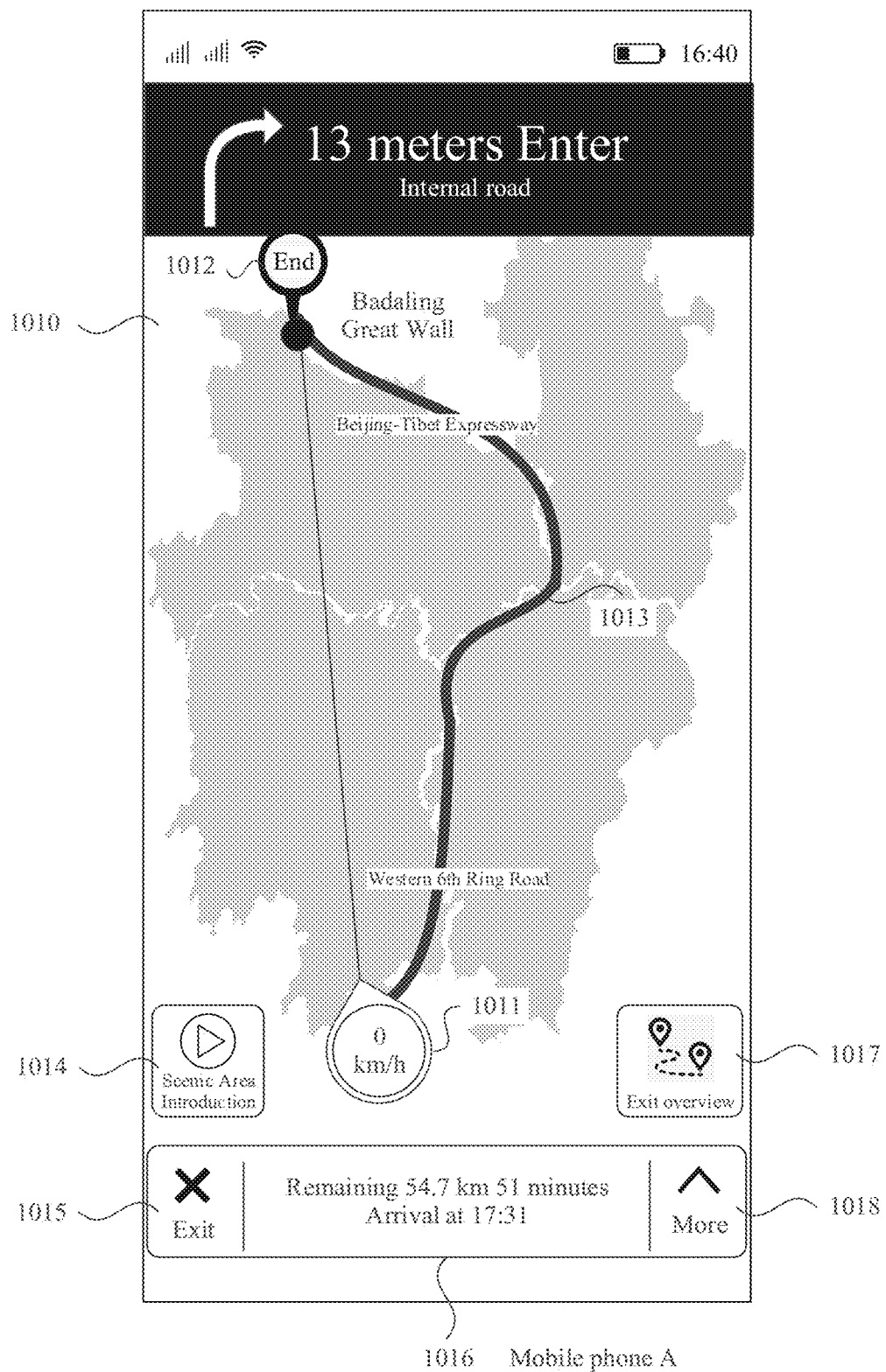
Figure 10C:
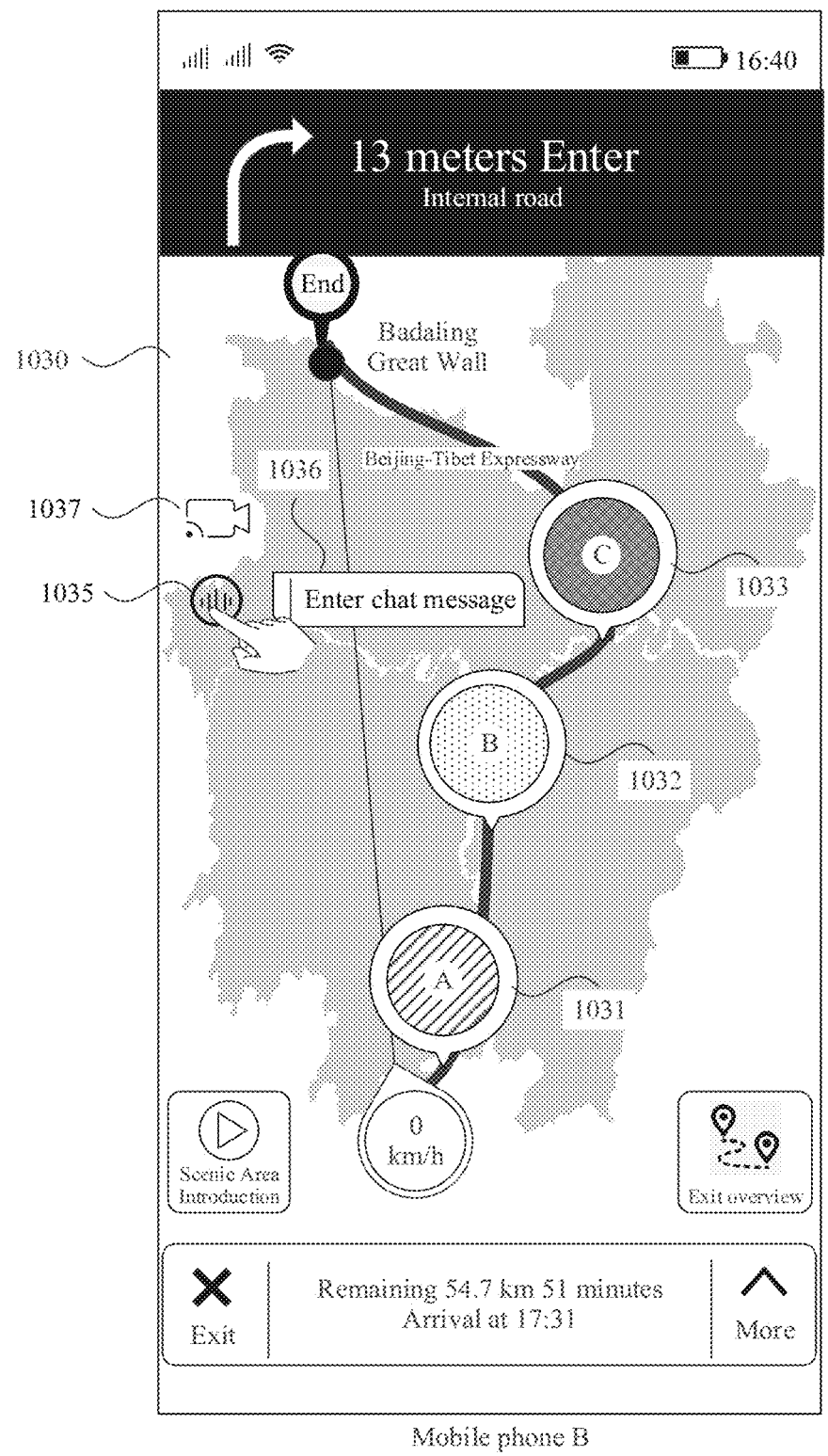

If the user B taps a "Drive together" icon in MeeTime of the mobile phone B, the mobile phone B may display a map navigation interface 1030 shown in FIG. 10C. Correspondingly, the user A and the user C tap the "Drive together" icon in MeeTime of the mobile phone of the user A and the user C, and the mobile phone A/C may also display a map navigation interface similar to that shown in FIG. 10C.

Compared with the navigation interface in FIG. 10B, the map navigation interface 1030 adds location information 1031 of the mobile phone A, location information 1032 of the mobile phone B, and location information 1033 of the mobile phone C. The location information of each device may display the profile picture or nickname of the user and the current location. For example, as shown in FIG. 10C, the location information 1033 of the mobile phone C indicates a location of the user C on a route map for navigating to the Great Wall scenic spot in Badaling, and displays a profile picture identity of the user C. The map navigation interface 1030 further displays a voice input message control 1035, a text input message control 1036, and a MeeTime button 1037. The user may input a voice message by using the voice input message control 1035. For example, the user B inputs a voice message "There is a service area in front. Go there for a rest." On the navigation interface of the mobile phone A, the user A taps the corresponding text input message control and inputs a text message "OK". On the navigation interface displayed on mobile phone C, the user C taps the corresponding voice input message control and inputs a voice message "OK". Optionally, the user A, the user B, and the user C are all driving, and may also tap the MeeTime button to start a voice call, to perform a real-time voice call.

Internal implementation of a device for sharing navigation information may be as follows: The map application of the mobile phone A shares navigation information with a user in a group by using a parallel sharing API provided by MeeTime, selects a parallel sharing mode, and adds information such as a current navigation destination and a route map to mExtraInfo. After receiving the navigation information, MeeTime of the mobile phone A establishes a message channel to the map application. When the user of the mobile phone B chooses to drive together, the map application of the mobile phone B is started, and a message channel from the map application to MeeTime is established. After being started, the map application of the mobile phone B parses navigation information in mExtraInfo and starts navigation. At the same time, the mobile phone B sends the location information (sendAppMessage) to mobile phone A in real time through the message channel. The mobile phone A receives location information (onAppMessageReceive) of mobile phone B/C, draws the profile pictures and locations of the users of the mobile phone B/C, and updates the map in real time. At the same time, the mobile phone A sends the location information to the mobile phone B/C in real time through the message channel.

In some embodiments, if no map application is installed on the mobile phone B, the user may be prompted, through a UI interface, whether to allow MeeTime to obtain a location and synchronize the location to another user. After consent of the user is obtained, MeeTime may obtain a current location, send the current location to the another user, and provide a map UI to refresh the location in real time.

Figure 10D:
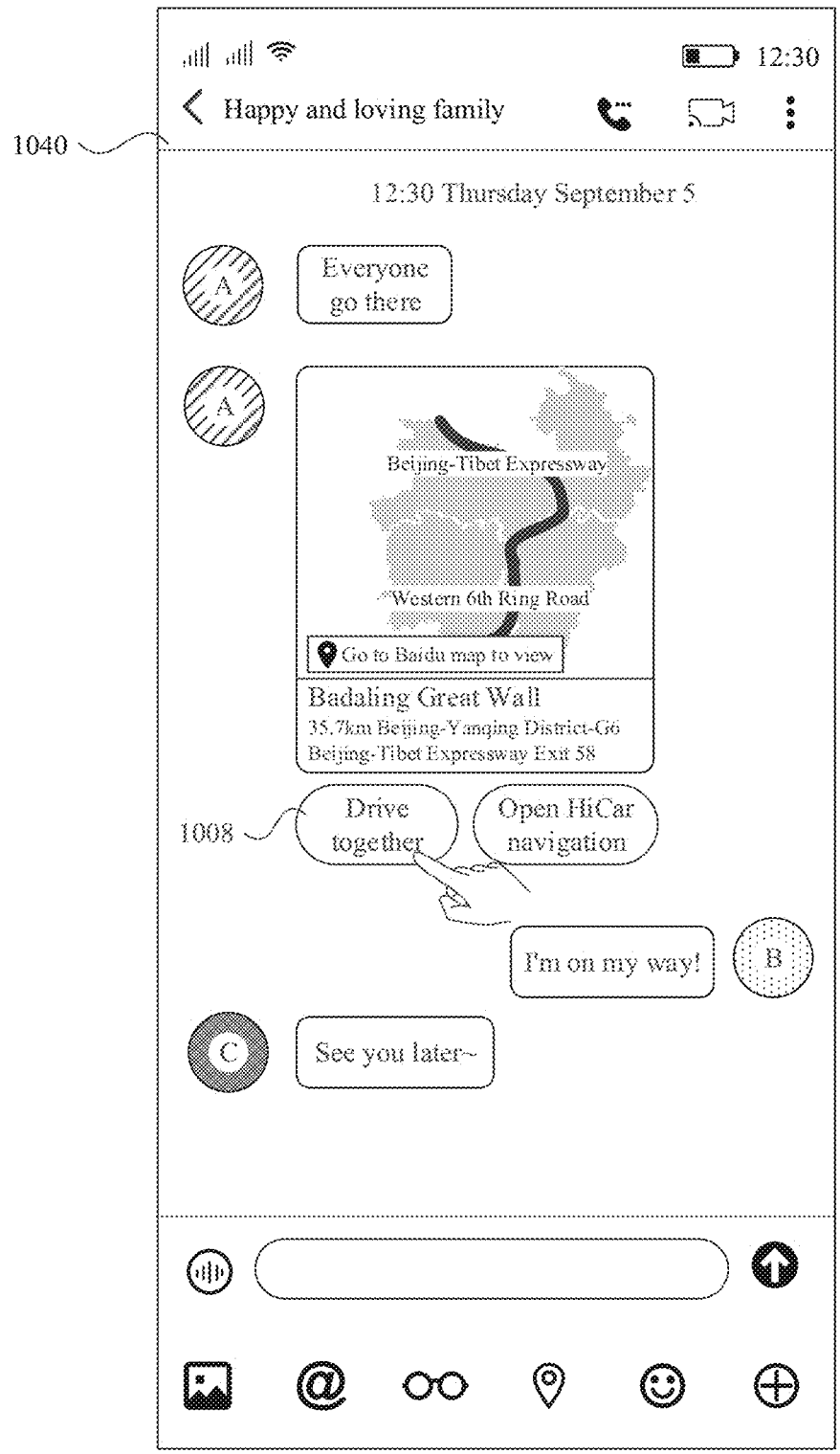
Figure 10E:
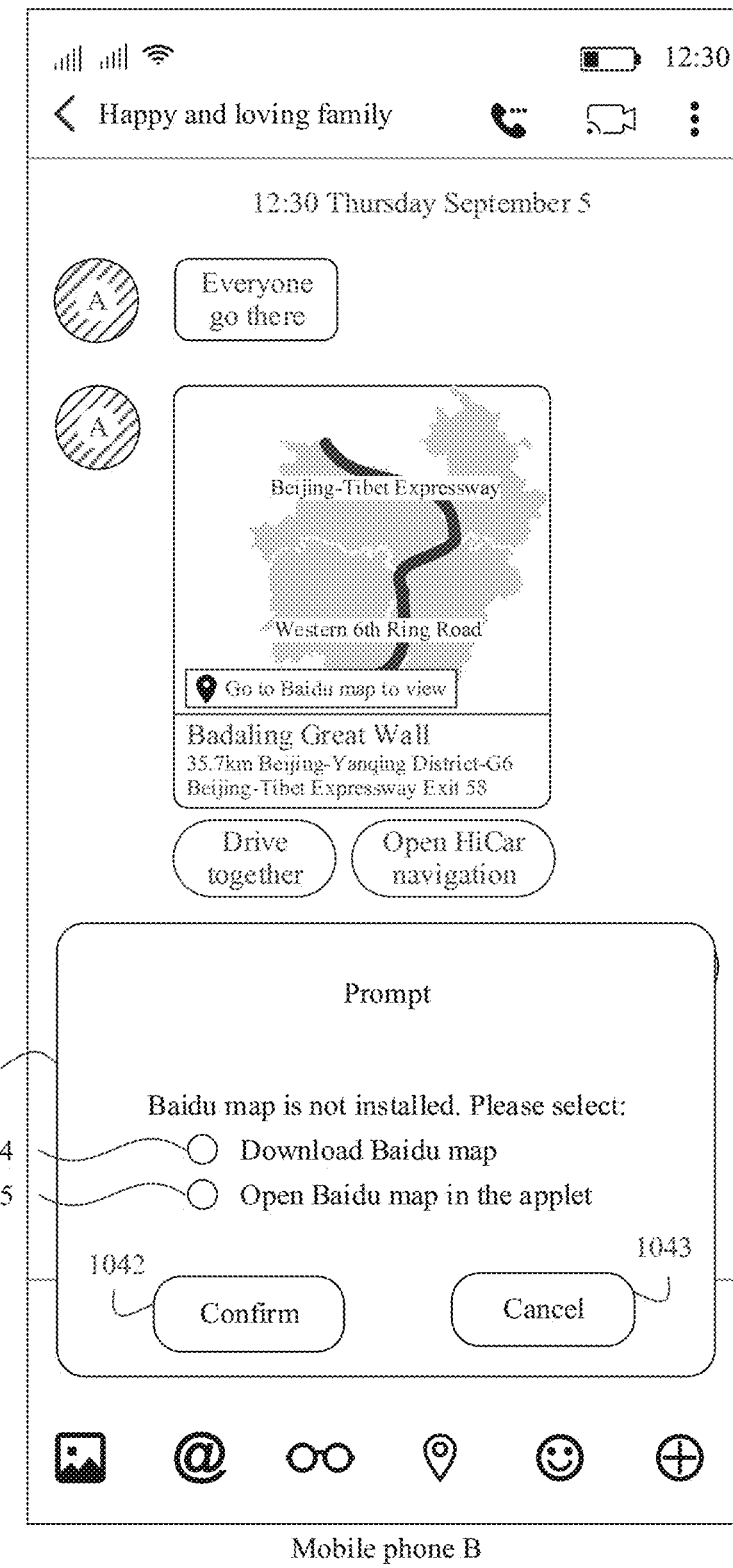
Figure 10F:
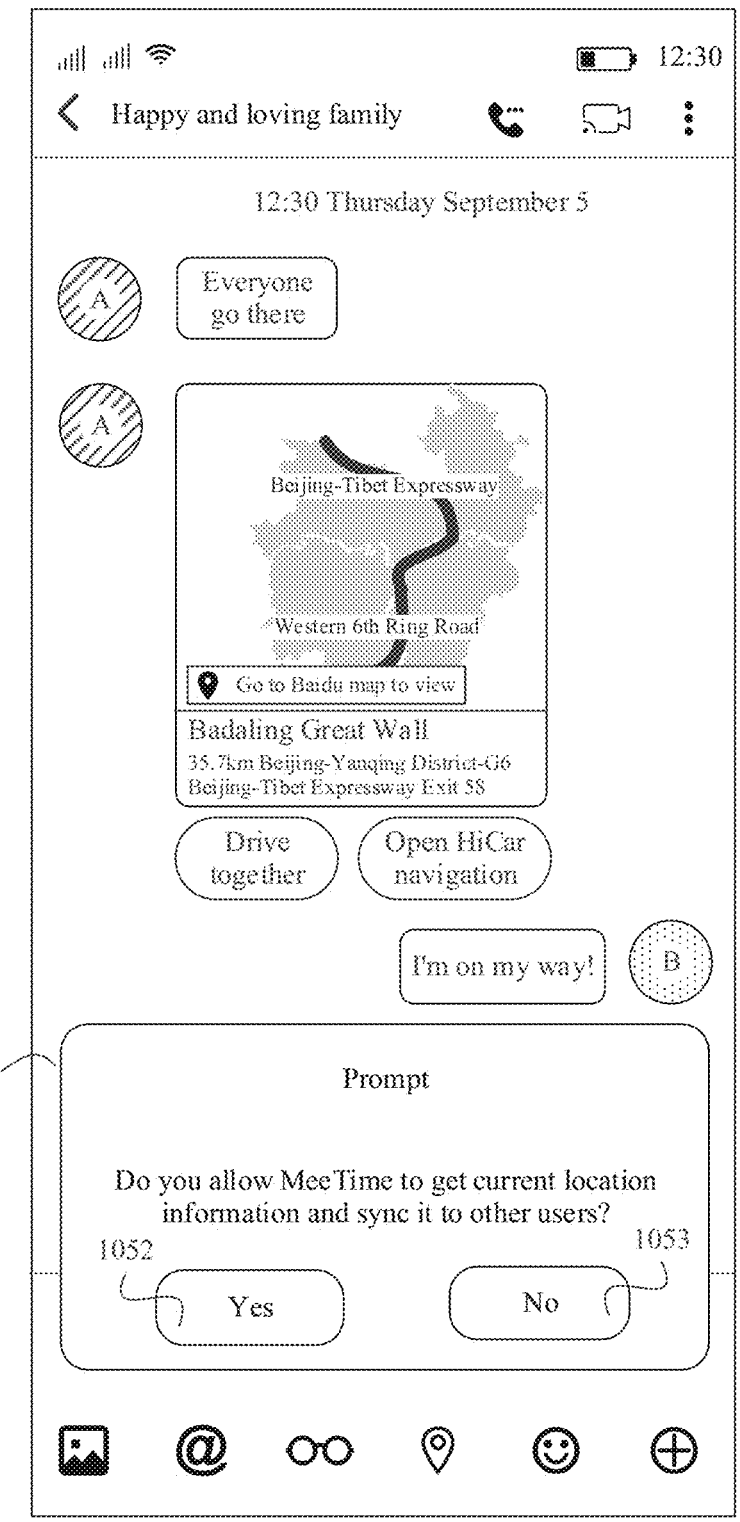

For example, as shown in FIG. 10D, the mobile phone B displays a group chat interface 1040 of MeeTime. An input operation (for example, a tap) performed by the user on the collaborative navigation entry 1008 in FIG. 10D is received. In response to the input operation, MeeTime of the mobile phone B cannot find the map application, and a prompt card 1041 shown in FIG. 10E pops up. The prompt card 1041 includes prompt information "Baidu map is not installed. Please select", a confirm button 1042, a cancel button 1043, a control 1044, and a control 1045. The control 1044 may be used to display an option for downloading Baidu map. After selecting the option, the user taps the confirm button 1042 to enter an interface for downloading the Baidu map. The control 1045 may be used to display opening Baidu map in the applet. After selecting the option, the user taps the confirm button 1042 to start the Baidu map applet.

The user taps the cancel button 1043, and a prompt card 1051 is displayed on the interface. The prompt card 1051 includes reminding information "Do you allow MeeTime to get current location information and sync it to other users?" For the button 1052, and the button 1053, the button 1052 may be used to authorize MeeTime to invoke a GPS geographical location positioning interface of the mobile phone B, and send the obtained geographical location information to another user, for example, is "Yes" identified in FIG. 10E. On the contrary, the button 1053 may be used to forbid MeeTime from invoking a GPS geographical location positioning interface of the mobile phone B and send geographical location information to another user, for example, is "No" identified in FIG. 10E. The user taps the button 1052, for example, "Yes" in FIG. 10E. In this case, MeeTime of the mobile phone B invokes a GPS geographical location positioning interface to obtain current geographical location information of the mobile phone, and automatically sends the information to MeeTime of the mobile phone A/C, MeeTime of the mobile phone A/C provides the received information for the map application, so that the map navigation interface refreshes a real-time location of the user B, and displays the location as location information 1032 of the mobile phone B shown in FIG. 10C.

Figure 10G:
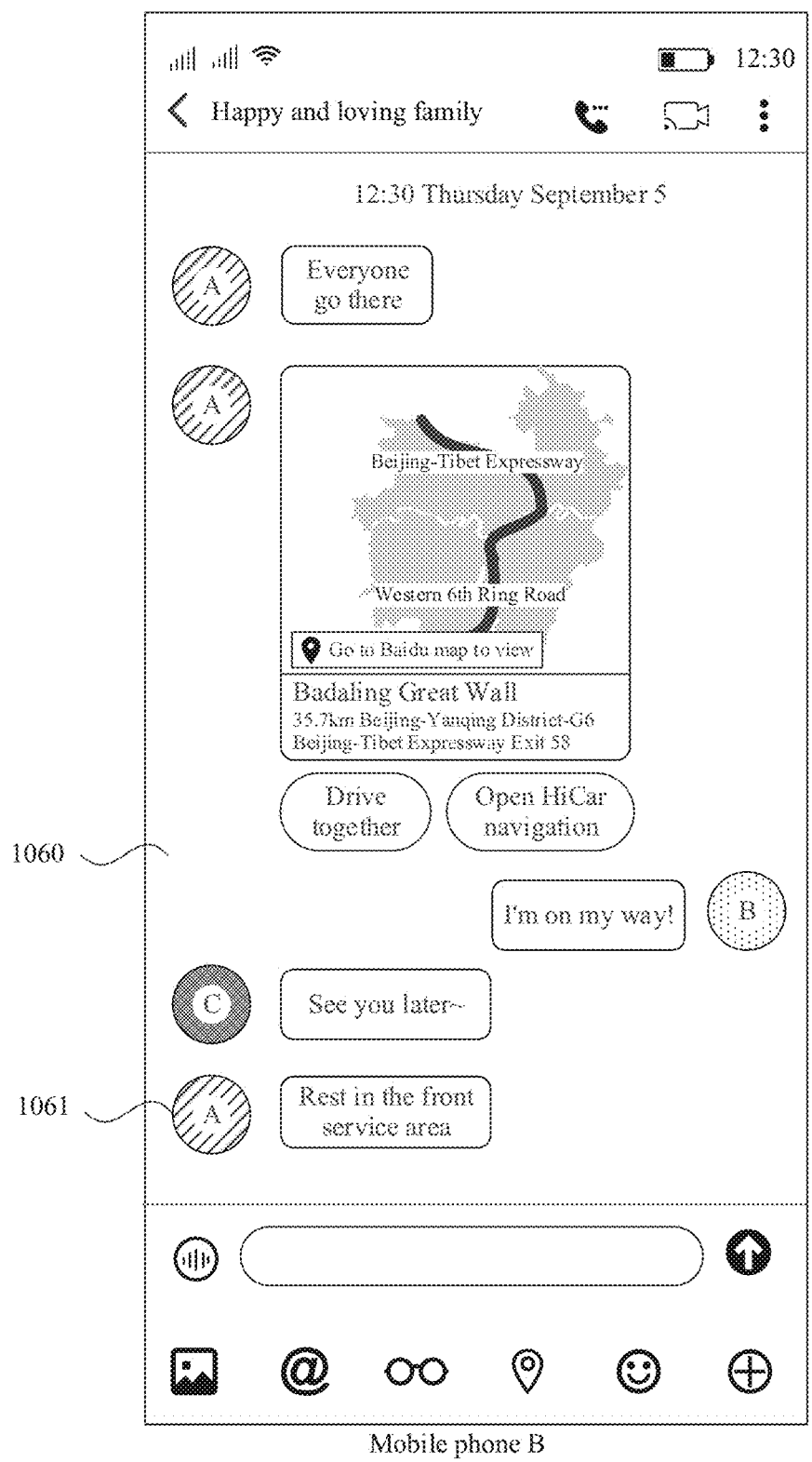

In a possible implementation, because the map application is not started on the mobile phone B for navigation, the mobile phone B still displays a MeeTime interface. When the mobile phone A and the mobile phone C perform navigation by using the map application, messages input by the user A and the user C by using the voice input message control and the text input message control may be displayed on the MeeTime interface of the mobile phone B. As shown in FIG. 10G, the user A inputs "Rest in the front service area", and the user B can view, in a MeeTime interface 1060 of the mobile phone B, a text message "Rest in the front service area" corresponding to a profile picture 1061 of the user A.

In the foregoing embodiment of collaborative navigation, providing an API interface by the second application supports all map applications in constructing instant messaging capabilities thereof through the message channel. The collaborative navigation function of multiple friends is implemented through one sharing. After the navigation information is shared, the user can navigate with other users, share the navigation information, and synchronize the locations of multiple users in real time. At the same time, if a voice call is directly initiated when the navigation information is shared, that is, it is specified in ShareInfo when the parallel sharing API is invoked that a voice call is started, the voice call and a floating user interface may be started at the same time, and a call flag is sent to the other party. After the other party parses the flag, the floating call UI is synchronously displayed. The preceding design can implement voice while navigation.

The foregoing operation sequence diagram of sharing navigation information is similar to the operation sequence diagram of commodity sharing, and the geographical location information of the device is encapsulated into a message in a fixed format and sent to the peer device.

The following describes a flowchart of an instant messaging method according to an embodiment of the present disclosure.

Figure 11:
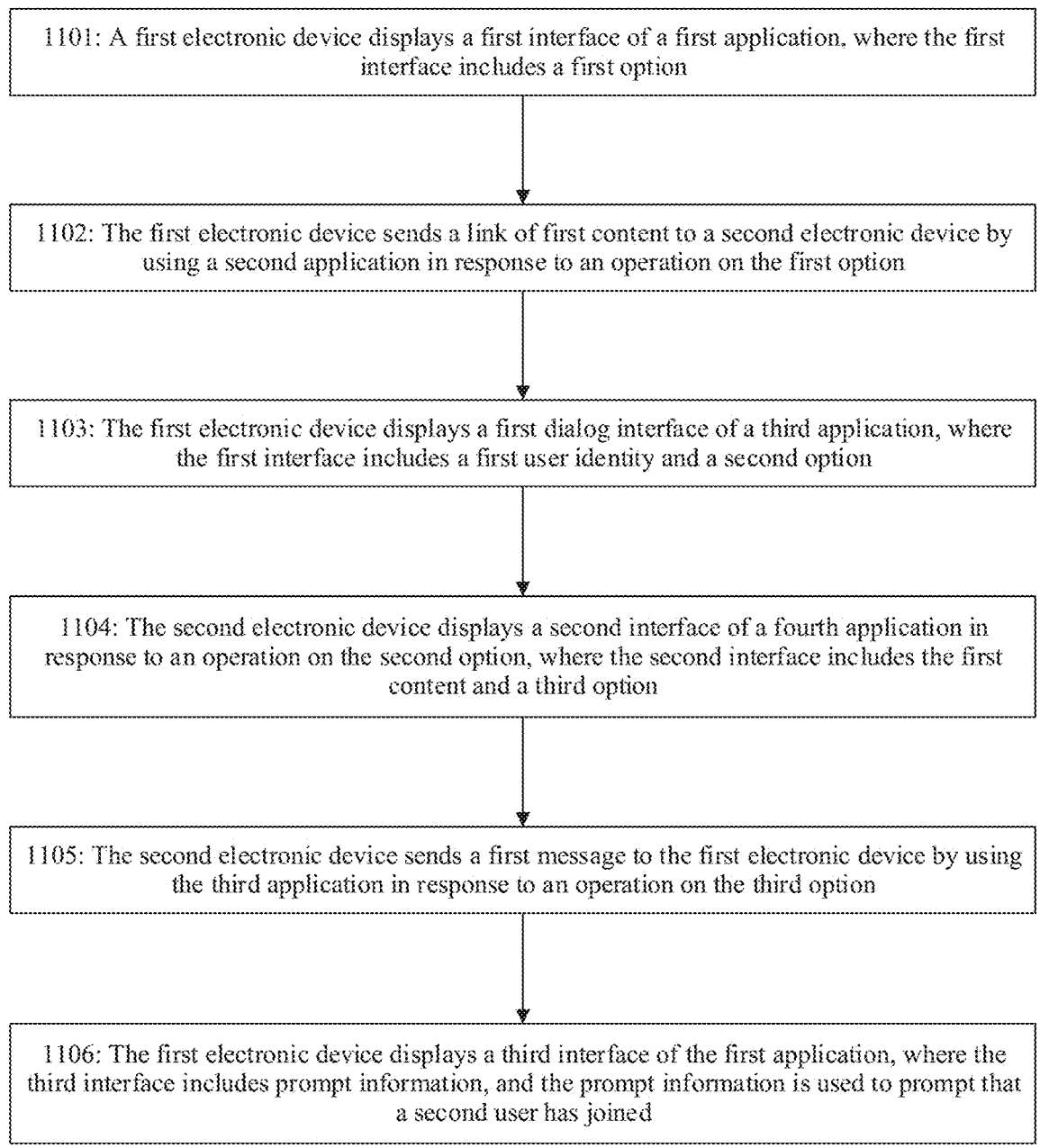
FIG. 11 is a flowchart of an instant messaging method according to an embodiment of the present disclosure.

Refer to FIG. 11. FIG. 11 is a flowchart of an instant messaging method. The method is applied to a first electronic device and a second electronic device that have a display each. The first electronic device and the second electronic device may be electronic devices in the communications system 200 shown in FIG. 2A, and are interconnected through a communications network. Hardware structures of the first electronic device and the second electronic device may be that of the electronic device 100 shown in FIG. 2B, and software system architectures may be software structures of the device A and the device B shown in FIG. 2C or FIG. 2D.

As shown in FIG. 11, the method includes the following steps.

1101: The first electronic device displays a first interface of a first application, where the first interface includes a first option.

For example, the first electronic device is the mobile phone A. As shown in FIG. 3A, the first application is a video application, the first interface is the user interface 310 of the video application displayed on the mobile phone A, and the first option is the share button 314.

For example, as shown in FIG. 7A, the first application is a shopping application, the first interface is the user interface 710 of the shopping application displayed on the mobile phone A, and the first option is the share button 714.

1102: The first electronic device sends a link of first content to the second electronic device by using a second application in response to an operation on the first option, where the first content is content provided by the first application.

For example, as shown in FIG. 3B and FIG. 3C, the second application is MeeTime, the first content is the video content 311 provided by the video application, and the mobile phone A sends a link of the video content 311 to the user B through MeeTime.

For example, as shown in FIG. 7B and FIG. 7C, the second application is MeeTime, the first content is a commodity shown in the commodity picture 711 provided by the shopping application, and the mobile phone A sends a link of the commodity to the user B through MeeTime.

In a possible implementation, that the first electronic device sends a link of first content to the second electronic device by using a second application in response to an operation on the first option includes: The first electronic device opens a fourth interface of the second application in response to the operation on the first option, where the fourth interface includes a second user identity, and the second user identity is used to identify a user operating the second electronic device; and the first electronic device sends the link of the first content to the second electronic device in response to an operation on the second user identity. For example, the fourth interface is an interface 332 of MeeTime of the mobile phone A, the second user identity is the profile picture button 333 of the user B and the nickname button 334 of the user B. If the profile picture button 333 of the user B or the nickname button 334 of the user B is tapped, the mobile phone A sends the link of the video content 311 to the mobile phone B.

1103: The second electronic device displays a first dialog interface of a third application, where the first dialog interface includes a first user identity and a second option, the second option is associated with the link of the first content, the first user identity is used to identify a user operating the first electronic device, and the third application corresponds to the second application.

For example, the second electronic device is the mobile phone B. As shown in FIG. 3D, the third application is MeeTime, and the first dialog interface is the MeeTime chat interface 340 of the video application displayed on the mobile phone A. The first user identity is the profile picture button 342 of the user A, and the user A is a user operating the mobile phone A. The second option is the play button 348, and the play button is used to play the video content 311 provided by the video link card 343.

The third application and the second application are a same application installed on two electronic devices. For example, the third application is MeeTime installed on the mobile phone B, and the second application is MeeTime installed on the mobile phone A, the version of MeeTime installed on the mobile phone B may be different from that of MeeTime installed on the mobile phone A. Alternatively, the first electronic device is a mobile phone, the second electronic device is a tablet computer, and the third application and the second application are different versions of applications opened by a same application for the mobile phone or the tablet computer.

In a possible implementation, that the second option is associated with the link of the first content includes: The second option is a card or a control including the link of the first content. For example, the second option is the video link card 343 or the play button 348 shown in FIG. 3D, or the control 351 shown in FIG. 3E-1. For another example, the second option is the commodity link card 753 shown in FIG. 7E, or the navigation information card 1006 shown in FIG. 10A, or the collaborative navigation entry 1008.

1104: The second electronic device displays a second interface of a fourth application in response to an operation on the second option, where the second interface includes the first content and a third option, and the fourth application corresponds to the first application.

For example, as shown in FIG. 3F, the fourth application is a video application, the second interface is the video playing interface 360 of the video application displayed on the mobile phone B, and the first content is the video content 311 provided by the video application, the third option is any one, two, or three of the MeeTime button 364, the voice input button 367, and the message input box control 365.

For example, the second electronic device is the mobile phone B or the mobile phone C. As shown in FIG. 10C, the fourth application is a map application, the second interface is the map navigation interface 1030 of the map application displayed on the mobile phone B or the mobile phone C, and the first content is navigation information provided by the map application, the third option is any one, two, or three of the MeeTime button 1037, the voice input message control 1035, and the text input message control 1036.

The fourth application and the first application are a same application installed on two electronic devices. For example, the fourth application is a Huawei Video application installed on the mobile phone B, and the first application is a Huawei Video application installed on the mobile phone A. The version of the HUAWEI Video application installed on the mobile phone B may be different from that installed on the mobile phone A. Alternatively, the first electronic device is a mobile phone, the second electronic device is a tablet computer, and the fourth application and the first application are different versions of applications opened by a same application for the mobile phone or the tablet computer.

In a possible implementation, the first application is a video application or an audio application, and the first content is a video or audio. When the first electronic device sends the link of the first content to the second electronic device by using the second application in response to the operation on the first option, a playing time point of the video or the audio is a first time point. When the second electronic device displays the second interface of the fourth application in response to the operation on the second option, a playing time point of the video or the audio is a second time point. The first time point is the same as the second time point. For example, the video application is Huawei Video. As shown in FIG. 3B, when the mobile phone A sends the video content 311 to the mobile phone B through MeeTime, the video content 311 is played at 20 minutes and 00 seconds (namely, the first time point). Refer to FIG. 3F. When the mobile phone B displays the video playing interface 360 of HUAWEI Video, the video content is also played at 20 minutes and 00 seconds (namely, the second time point, where the second time point is the same as the first time point).

In a possible implementation, the first electronic device displays a fifth interface of the first application, where the fifth interface includes the first content, a playing time point of the first content is a third time point, and the third time point is different from the first time point. The second electronic device displays a sixth interface of the fourth application, where the sixth interface includes the first content, a playing time point of the first content is a fourth time point, and the fourth time point is the same as the third time point. For example, the video application is Huawei Video. As shown in FIG. 3L, the mobile phone A displays the video playing interface 394 of the HUAWEI Video application. In this case, the video is rewound by the user to 18 minutes and 30 seconds (namely, the third time point, where the third time point is different from the first time point). Refer to FIG. 3M, when the mobile phone B displays the video playing interface of HUAWEI Video, the video content is also rewound to 18 minutes and 30 seconds (namely, the fourth time point, where the fourth time point is the same as the third time point).

In a possible implementation, the first application is a shopping application, the first content is a commodity, and the second interface further includes a fourth option. The second electronic device displays a first shopping cart and a second shopping cart in the fourth application in response to an operation on the fourth option, where the first shopping cart corresponds to a first user, the second shopping cart corresponds to a second user, and the first user is different from the second user. For example, the first application is a shopping application, for example, Huawei Vmall, and the first content is a commodity, for example, a Huawei band. After the user A and the user B respectively add the commodity shown in FIG. 7A to the shopping cart, the mobile phone A displays the shopping cart interface shown in FIG. 7H-1 to FIG. 7H-3. As shown in FIG. 7H-1 to FIG. 7H-3, the shopping cart displayed by the shopping application in the mobile phone A includes the "All shopping carts" interface 380, the "My shopping cart" interface 381, and the "Shopping cart of B" interface 382. "My shopping cart" (namely, the first shopping cart) corresponds to the user A, and the "Shopping cart of B" (namely, the second shopping cart) corresponds to the user B.

In a possible implementation, that the second electronic device displays a first shopping cart and a second shopping cart in the fourth application in response to an operation on the fourth option includes: The second electronic device further displays a third shopping cart in the fourth application, where commodities in the third shopping cart are a sum of the commodity in the first shopping cart and the commodity in the second shopping cart. For example, as shown in FIG. 7I-1 to FIG. 7I-3, all commodities in the shopping cart (namely, the third shopping cart) are a sum of commodities in the shopping cart (namely, the first shopping cart) of the user A and commodities in the shopping cart (namely, the second shopping cart) of the user B.

In a possible implementation, the first application is a map application, and the first content is navigation information; and the second interface of the fourth application further includes the first user identity and a second user identity, the second user identity is used to identify a user operating the second electronic device, the first user identity is further used to indicate a geographical location of the first electronic device, and the second user identity is further used to indicate a geographical location of the second electronic device. For example, the map navigation interface 1030 shown in FIG. 10C includes the profile picture of the user A and the profile picture of the user B, and the profile pictures respectively indicate the location information 1031 of the mobile phone A and the location information 1032 of the mobile phone B.

1105: The second electronic device sends a first message to the first electronic device by using the third application in response to an operation on the third option.

For example, as shown in FIG. 3I, the user performs a tap operation on the message input box control 365, inputs a message "Playback to watch the goal" on the message input interface 390 shown in FIG. 3J, and taps to send the message. The mobile phone B sends the message (namely, the first message) to the mobile phone A through MeeTime. Refer to FIG. 3K, the message is displayed on the video playing interface 393 of the mobile phone A.

In a possible implementation, the first message is a text message, a voice message, a voice call request, or a video call request. For example, as shown in FIG. 4E, the first message received by the mobile phone A is a voice call request.

1106: The first electronic device displays a third interface of the first application, the third interface includes prompt information, and the prompt information is used to prompt that the second user has joined.

For example, the mobile phone A displays a video playing interface 370 of the video application. As shown in FIG. 3G, the interface includes the message prompt 371 indicating that "The user B has entered the projection hall".

In a possible implementation, the third interface further includes a second user identity and the first message, the second user identity is used to identify the second user, and the second user is a user operating the second electronic device. For example, the mobile phone A displays the voice call interface 440 of the video application. As shown in FIG. 4E, the interface includes the profile picture 441 of the user B and the voice call request sent by the mobile phone B.

In the instant messaging method provided in this application, the first electronic device sends the link of the first content provided by the first application to the second electronic device by using the second application, the second electronic device can display the second option associated with the link of the first content in the third application corresponding to the second application, and then the second electronic device can display the first content and the third option in the fourth application corresponding to the first application in response to the operation on the second option. Then, the second electronic device sends the first message to the first electronic device by using the third application in response to the operation on the third option. In this way, after receiving shared content, a user can perform instant communication on an interface displaying the first content with a user sharing the content, without returning to an interface of an instant messaging application. This provides convenience for the user.

It can be understood that, to implement the foregoing functions, the electronic device includes a corresponding hardware structure and/or software module for performing each function. A person of ordinary skill in the art should easily be aware that, in combination with the examples described in the algorithms and steps of embodiments disclosed in this specification, the disclosure may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present disclosure.

In embodiments of the present disclosure, the electronic device may be divided into function modules based on the example in the foregoing method. For example, each function module corresponding to each function may be obtained through division, or two or more functions may be integrated into one processing module. The integrated module may be implemented in a form of hardware, or may be implemented in a form of a software function module. It should be noted that, in embodiments of the present disclosure, module division is an example, and is merely a logical function division. During actual implementation, another division manner may be used.

Embodiments of the present disclosure disclose an electronic device, including a processor, and a memory, an input device, and an output device that are connected to the processor. The input device and the output device may be integrated into one device. For example, a touch sensor may be used as an input device, a display may be used as an output device, and the touch sensor and the display may be integrated into a touchscreen.

Figure 12:
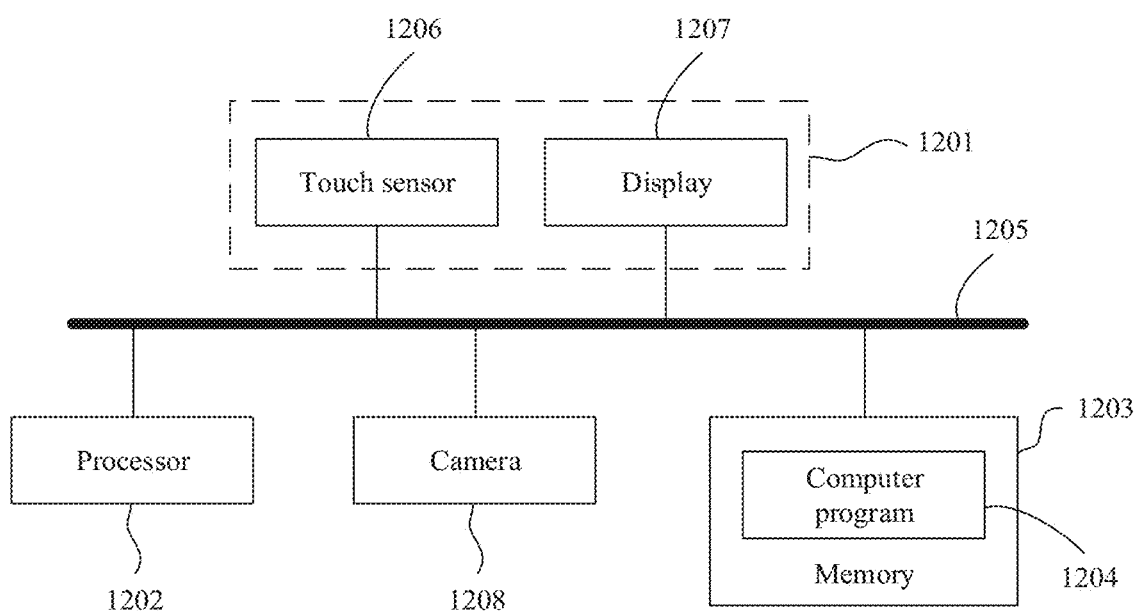
FIG. 12 is a schematic diagram of a structure of another electronic device according to an embodiment of the present disclosure.

In this case, as shown in FIG. 12, the electronic device may include: a touchscreen 1201, where the touchscreen 1201 includes a touch sensor 1206 and a display 1207; one or more processors 1202; one or more cameras 1208; a memory 1203; one or more applications (not shown); and one or more computer programs 1204. The foregoing components may be connected through one or more communications buses 1205. The one or more computer programs 1204 are stored in the memory 1203 and are configured to be executed by the one or more processors 1202. The one or more computer programs 1204 include instructions. The instructions may be used to perform each step in corresponding embodiments. All related content of the steps in the foregoing method embodiments may be cited in function descriptions of corresponding physical components. Details are not described herein again.

For example, the processor 1202 may be specifically the processor 110 shown in FIG. 1, the memory 1203 may be specifically the internal memory 116 and/or the external memory 120 shown in FIG. 1, the camera 1208 may be specifically the camera 193 shown in FIG. 2B, the display 1207 may be specifically the display 194 shown in FIG. 1, and the touch sensor 1206 may be specifically the touch sensor 180K in the sensor module 180 shown in FIG. 1. This is not limited in embodiments of the present disclosure.

Embodiments of the present disclosure further provide a computer storage medium. The computer storage medium stores computer instructions. When the computer instructions are run on an electronic device, the electronic device performs the related method steps, to implement the method in the foregoing embodiments.

Embodiments of the present disclosure further provide a computer program product. When the computer program product is run on a computer, the computer performs the foregoing related method steps, to implement the method in the foregoing embodiments.

In addition, embodiments of the present disclosure further provide an apparatus. The apparatus may be specifically a chip, a component, or a module. The apparatus may include a processor and a memory that are connected. The memory is configured to store computer-executable instructions, and when the apparatus runs, the processor may execute the computer-executable instructions stored in the memory, so that the chip performs the shooting method in the foregoing method embodiments.

The electronic device, the computer storage medium, the computer program product, or the chip provided in embodiments of the present disclosure is configured to perform the corresponding method provided above. Therefore, for beneficial effects that can be achieved, refer to the beneficial effects in the corresponding method provided above. Details are not described herein again.

Based on descriptions of the foregoing implementations, a person skilled in the art may understand that, for the purpose of convenient and brief descriptions, division into the foregoing function modules is merely used as an example for description. In actual application, the foregoing functions can be allocated to different function modules and implemented according to a requirement, that is, an inner structure of an apparatus is divided into different function modules to implement all or some of the functions described above.

In the several embodiments provided in the present disclosure, it should be understood that the disclosed apparatus and method may be implemented in other manners. For example, the described apparatus embodiment is only an example. For example, the module or division into the units is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of embodiments.

In addition, functional units in embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in a form of a software functional unit and sold or used as an independent product, the integrated unit may be stored in a readable storage medium. Based on such an understanding, the technical solutions of embodiments of the present disclosure essentially, or the part contributing to the conventional technology, or all or some of the technical solutions may be implemented in the form of a software product. The software product is stored in a storage medium and includes several instructions for instructing a device (which may be a single-chip microcomputer, a chip or the like) or a processor to perform all or some of the steps of the methods described in embodiments of the present disclosure. The storage medium includes any medium that can store program code, such as a USB flash drive, a removable hard disk, a read-only memory (ROM), a random access memory (RAM), a magnetic disk, or a compact disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A communications system, comprising:
   a first electronic device; and
   a second electronic device,
   wherein the first electronic device is configured to:
      play a first content of a first application,
      display a first interface of the first application, wherein the first interface comprises a first option, the first application is a video application or an audio application, and the first content is a video or audio; and send a link of the first content to the second electronic device by using a second application in response to an operation on the first option, wherein the second application is an instant messaging application;

wherein the second electronic device is configured to:
display a first dialog interface of a third application, wherein the first dialog interface comprises a first user identity and a second option, the second option is associated with the link of the first content, the first user identity is used to identify a first user operating the first electronic device, and the third application corresponds to the second application;
start a fourth application,
automatically adjust a playing progress of the video or audio on the second electronic device to be consistent with a playing progress of the video or audio on the first electronic device,
display a second interface of the fourth application in response to an operation on the second option, wherein the second interface comprises the first content and a third option, and the fourth application corresponds to the first application; and
send a first message, input by a second user operating the second electronic device, to the first electronic device by using the third application in response to an operation on the third option, wherein the first message is a text message, a voice message, a voice call request, or a video call request;

wherein the first electronic device is configured to:
adjust, in accordance with input by the first user, the playing progress of the video or audio on the first electronic device after displaying the first message; and
send first information indicating adjusting the playing progress of the video or audio on the first electronic device through the first application to the third application of the second electronic device; and wherein the second electronic device is configured to:
send the first information through the third application to the fourth application; and
automatically adjust the playing progress of the video or audio on the second electronic device to be consistent with the adjusted playing progress of the video or audio on the first electronic device in response to the first information.

2. The communications system according to claim 1, wherein the first electronic device is configured to display a third interface of the first application, wherein the third interface comprises a second message, and wherein the second message is used to indicate the second user operating the second electronic device has chosen to synchronously watch the video or audio shared by the first user operating the first electronic device.

3. The communications system according to claim 2, wherein the third interface further comprises a second user identity and the first message, the second user identity is used to identify the second user operating the second electronic device.

4. The communications system according to claim 1, wherein that the first electronic device is configured to send the link of the first content to the second electronic device by using the second application in response to the operation on the first option comprises:
the first electronic device is configured to open, a fourth interface of the second application in response to the operation on the first option, wherein the fourth interface comprises a second user identity, and the second user identity is used to identify the second user operating the second electronic device; and
the first electronic device is configured to send, the link of the first content to the second electronic device in response to an operation on the second user identity.

5. The communications system according to claim 1, wherein
that the second option is associated with the link of the first content comprises that the second option is one of a card or a control comprising the link of the first content.

6. The communications system according to claim 1, wherein that the second electronic device is configured to send the first message to the first electronic device by using the third application in response to the operation on the third option comprises:
the second electronic device is configured to display a message input interface in response to the operation on the third option;
the second electronic device is configured to send the first message to the first electronic device by using the third application in response to an operation on the message input interface.

7. An instant messaging method, applied to a second electronic device having a display, wherein the method comprises:
displaying, by the second electronic device, a first dialog interface of a third application, wherein the first dialog interface comprises a first user identity and a second option, the second option is associated with a link of first content, the first user identity is used to identify a first user operating a first electronic device, wherein:
the first content is content provided by a first application for the first electronic device,
the first application is a video application or an audio application,
the first content is a video or audio,
the link of the first content is sent by the first electronic device to the second electronic device by using a second application,
the second application is an instant messaging application, and
the third application corresponds to the second application;
starting, by the second electronic device, a fourth application;
automatically adjusting, by the second electronic device, a playing progress of the video or audio on the second electronic device to be consistent with a playing progress of the video or audio on the first electronic device;
displaying, by the second electronic device, a second interface of the fourth application in response to an operation on the second option, wherein the second interface comprises the first content and a third option, and the fourth application corresponds to the first application;
sending, by the second electronic device, a first message, input by a second user operating the second electronic device, to the first electronic device by using the third application in response to an operation on the third option, wherein the first message is a text message, a voice message, a voice call request, or a video call request;
receiving, by the third application of the second electronic device, first information indicating adjusting, in accordance with input by the first user, the playing progress of the video or audio on the first electronic device from the first application of the first electronic device, wherein the playing progress of the video or audio on the first electronic device is adjusted;

sending, by the third application of the second electronic device, the first information to the fourth application of the second electronic device; and automatically adjusting, by the second electronic device, the playing progress of the video or audio on the second electronic device to be consistent with the adjusted playing progress of the video or audio on the first electronic device in response to the first information.

8. The instant messaging method according to claim 7, wherein that the second option is associated with the link of the first content comprises that the second option is one of a card or a control comprising the link of the first content.

9. The instant messaging method according to claim 7, wherein the sending, by the second electronic device, the first message to the first electronic device by using the third application in response to the operation on the third option comprises:

displaying, by the second electronic device, a message input interface in response to the operation on the third option;

sending, by the second electronic device, the first message to the first electronic device by using the third application in response to an operation on the message input interface.

10. A second electronic device, comprising:
one or more processors; and
a non-transitory memory that stores executable code that, when-executed by the one or more processors of the second electronic device, enables the second electronic device to perform an instant messaging method comprising:

displaying, by the second electronic device, a first dialog interface of a third application, wherein:
the first dialog interface comprises a first user identity and a second option,
the second option is associated with a link of first content,
the first user identity is used to identify a first user operating a first electronic device,
the first content is content provided by a first application for the first electronic device,
the first application is a video application or an audio application,
the first content is a video or audio,
the link of the first content is sent by the first electronic device to the second electronic device by using a second application,
the second application is an instant messaging application, and
the third application corresponds to the second application;

starting, by the second electronic device, a fourth application;

automatically adjusting, by the second electronic device, a playing progress of the video or audio on the second electronic device to be consistent with a playing progress of the video or audio on the first electronic device;

displaying, by the second electronic device, a second interface of the fourth application in response to an operation on the second option, wherein the second interface comprises the first content and a third option, and the fourth application corresponds to the first application;

sending, by the second electronic device, a first message, input by a second user operating the second electronic device, to the first electronic device by using the third application in response to an operation on the third option, wherein the first message is a text message, a voice message, a voice call request, or a video call request;

receiving, by the third application of the second electronic device, first information indicating adjusting, in accordance with input by the first user, the playing progress of the video or audio on the first electronic device from the first application of the first electronic device, wherein the playing progress of the video or audio on the first electronic device is adjusted;

sending, by the third application of the second electronic device, the first information to the fourth application of the second electronic device; and automatically adjusting, by the second electronic device, the playing progress of the video or audio on the second electronic device to be consistent with the adjusted playing progress of the video or audio on the first electronic device in response to the first information.

\* \* \* \* \*

UNITED STATES PATENT AND TRADEMARK OFFICE
CERTIFICATE OF CORRECTION

PATENT NO. : 12,355,710 B2
APPLICATION NO. : 17/927643
DATED : July 8, 2025
INVENTOR(S) : Tao et al.

Page 1 of 1

It is certified that error appears in the above-identified patent and that said Letters Patent is hereby corrected as shown below:

In the Claims

Claim 1: Column 43, Line 23: "send a first message, input by a second user operating" should read as -- send a first message input by a second user operating --.

Claim 1: Column 43, Line 24: "the second electronic device, to the first electronic" should read as -- the second electronic device to the first electronic --.

Claim 3: Column 43, Line 57: "used to identify the second user operating the second elec-" should read as -- used to identify the second user, operating the second elec- --.

Claim 7: Column 44, Line 57: "sending, by the second electronic device, a first message," should read as -- sending, by the second electronic device, a first message --.

Signed and Sealed this
Tenth Day of February, 2026

John A. Squires
*Director of the United States Patent and Trademark Office*